United States Patent
Miyasaka

(10) Patent No.: US 7,668,383 B2
(45) Date of Patent: Feb. 23, 2010

(54) IMAGE PROCESSING, COMPRESSING, DECOMPRESSING, TRANSMITTING, SENDING AND RECEIVING DEVICES AND METHODS, PROGRAMS THEREOF AND DISPLAYING DEVICE

(75) Inventor: Daigo Miyasaka, Tokyo (JP)

(73) Assignee: NEC Corporation, Tokyo (JP)

( * ) Notice: Subject to any disclaimer, the term of this patent is extended or adjusted under 35 U.S.C. 154(b) by 862 days.

(21) Appl. No.: 11/391,385

(22) Filed: Mar. 29, 2006

(65) Prior Publication Data

US 2006/0220984 A1  Oct. 5, 2006

(30) Foreign Application Priority Data

Mar. 30, 2005  (JP) .............................. 2005-098105
Aug. 2, 2005  (JP) .............................. 2005-224089

(51) Int. Cl.
*G06K 9/36* (2006.01)
(52) U.S. Cl. .................................................... 382/232
(58) Field of Classification Search ......... 382/232–233, 382/236–237, 244, 251–252, 166; 358/1.2, 358/1.9, 3.13–3.22, 521, 539, 426.01–42.16; 375/240.01–240.25
See application file for complete search history.

(56) References Cited

U.S. PATENT DOCUMENTS 6,256,349 B1 * 7/2001 Suzuki et al. .......... 375/240.18
7,236,269 B2 * 6/2007 Donovan et al. ........... 358/3.22
7,483,574 B2 * 1/2009 Sasaki ........................ 382/232
2009/0129685 A1 * 5/2009 Miyasaka ................... 382/232

FOREIGN PATENT DOCUMENTS

| JP | 9-200532 A | 7/1997 |
| JP | 9-238345 A | 9/1997 |
| JP | 10-66072 A | 3/1998 |
| JP | 2003-162272 A | 6/2003 |

OTHER PUBLICATIONS

"Image Electronics Handbook," Corona Publishing Co., Ltd., 1993.

* cited by examiner

*Primary Examiner*—Sherali Ishrat
(74) *Attorney, Agent, or Firm*—Sughrue Mion, PLLC

(57) ABSTRACT

Image processing, compressing, decompressing, transmitting, sending and receiving devices and methods, their programs and a displaying device, in which a bit plane number is increased again after the bit plane number is first reduced to enable it to largely improve or remove granular quality deterioration in a mild gradation area and a plain gradation area within an image. For data compression, a first image processor includes a block coder for executing a reversible compression of image data of pixels of a raster image and a bit plane compressor for conducting an irreversible compression of the image data. For data decompression, a second image processor includes a bit plane decompressor for carrying out an irreversible decompression of the compressed data and a block decoder for executing a reversible decoding of the compressed data, to output decompressed image data to a display for displaying a reproduced raster image. The compressed data is once stored in a memory.

25 Claims, 48 Drawing Sheets

FIG. 3
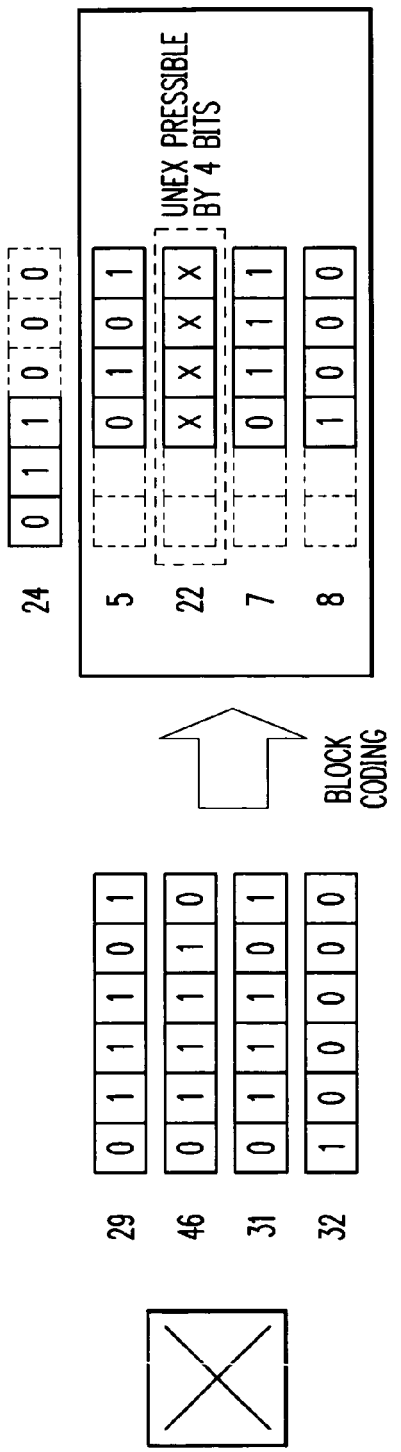
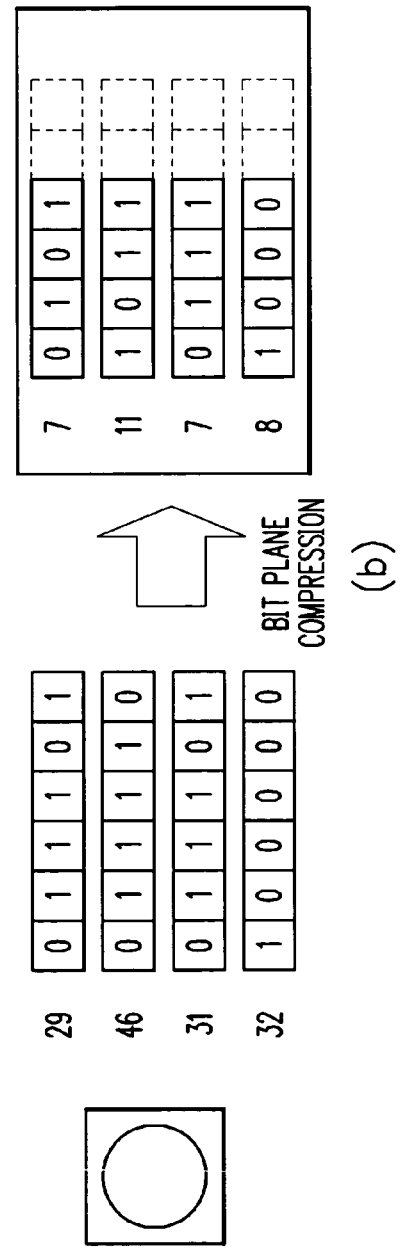

F I G. 4
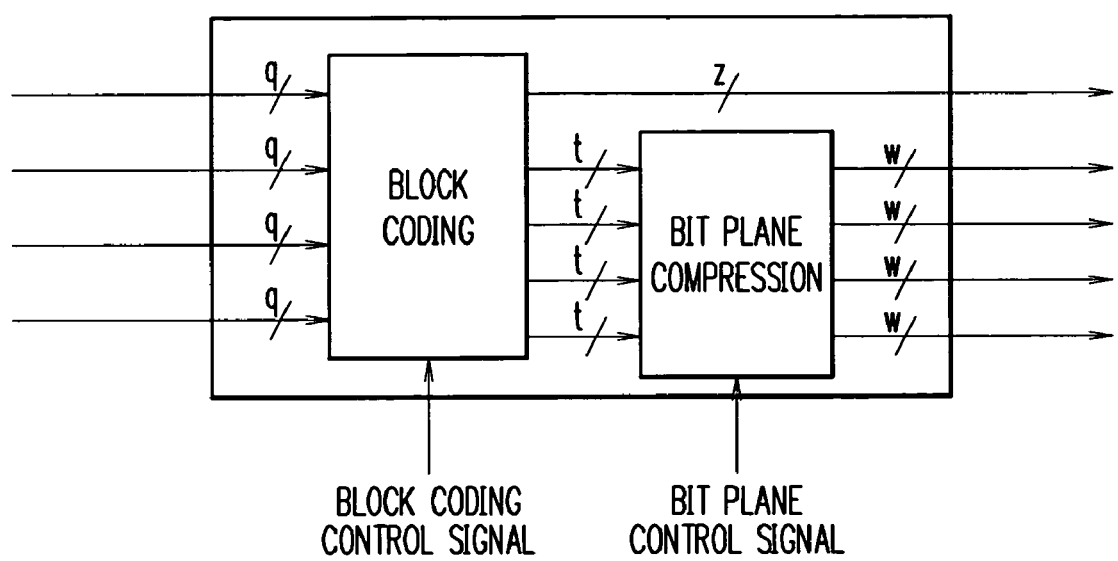

FIG. 9

THRESHOLD VALUE FOR COMPRESSION

| Y mod 2 | Out a | Out b | Out c | Out d |
|---|---|---|---|---|
| 0 | −1 | 0 | −1 | 0 |
| 1 | 0 | 1 | 0 | 1 |

THRESHOLD VALUE FOR DECOMPRESSION

| Y mod 2 | Out a | Out b | Out c | Out d |
|---|---|---|---|---|
| 0 | 0 | 1 | 0 | 1 |
| 1 | 0 | 1 | 0 | 1 |

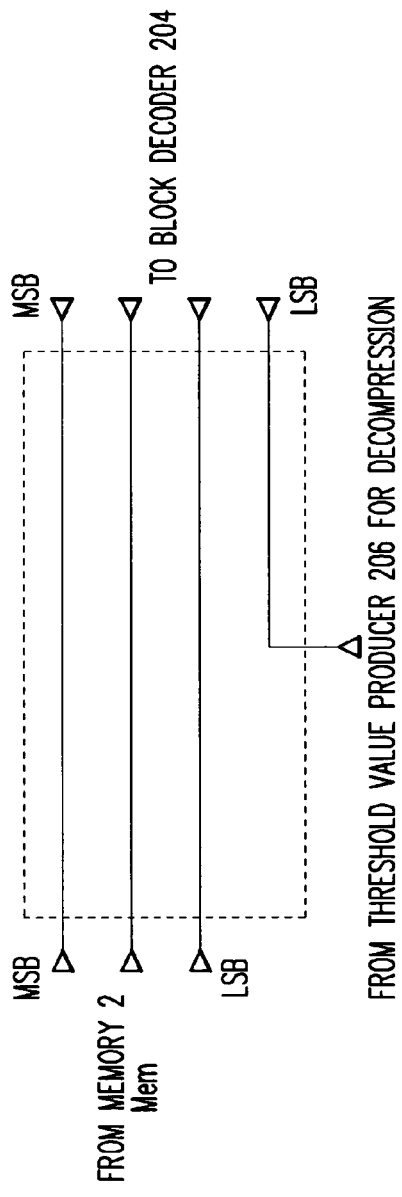
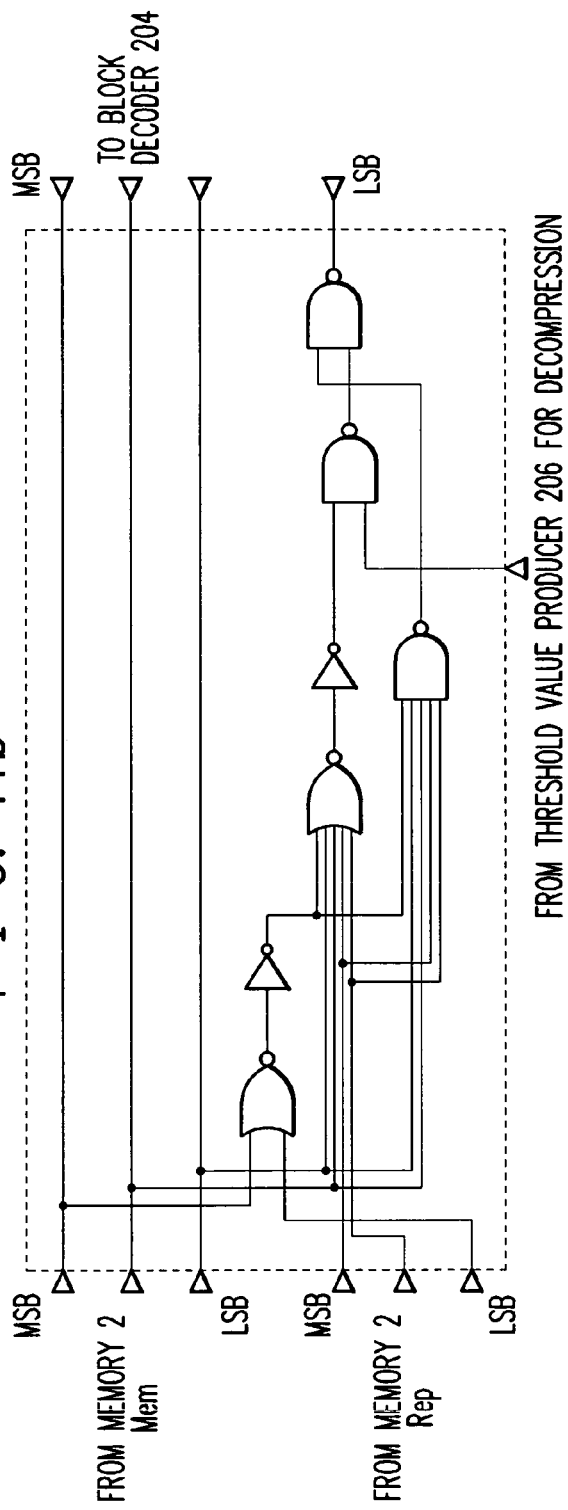

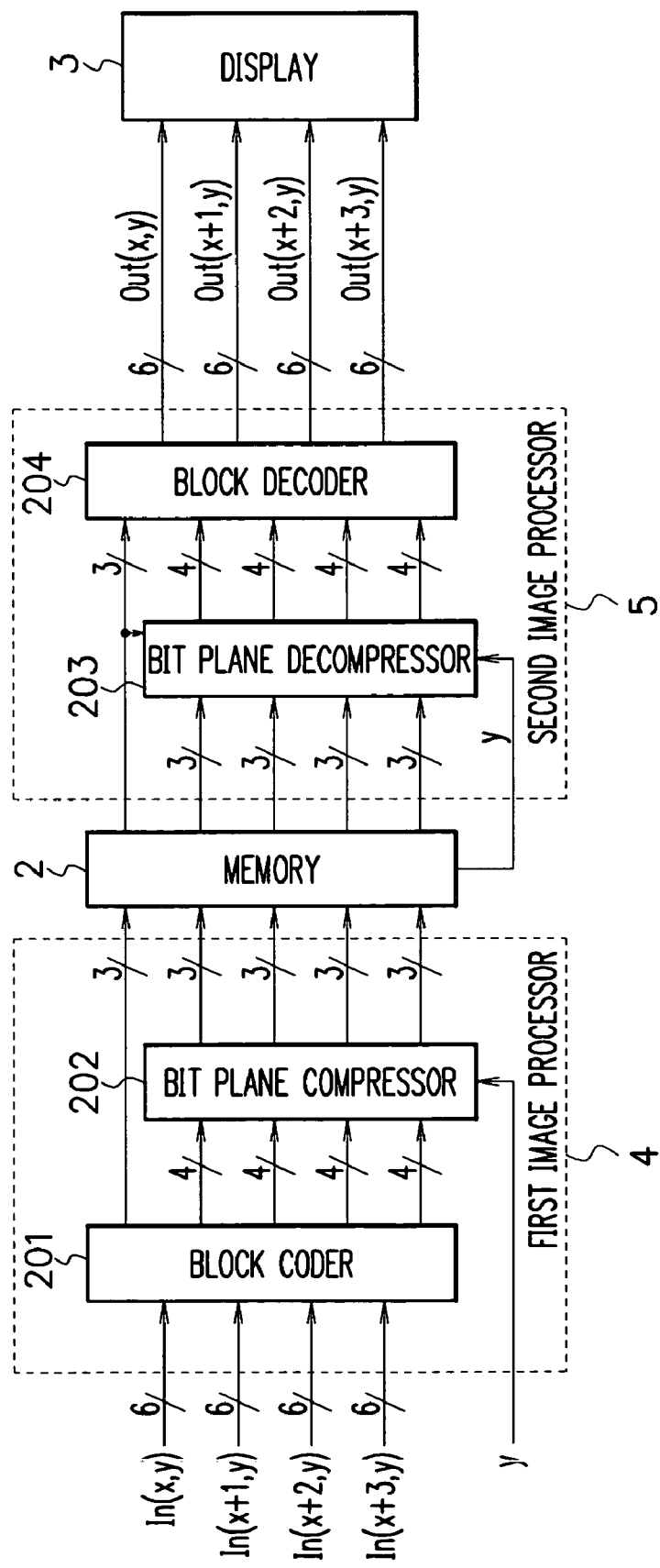
F I G. 12

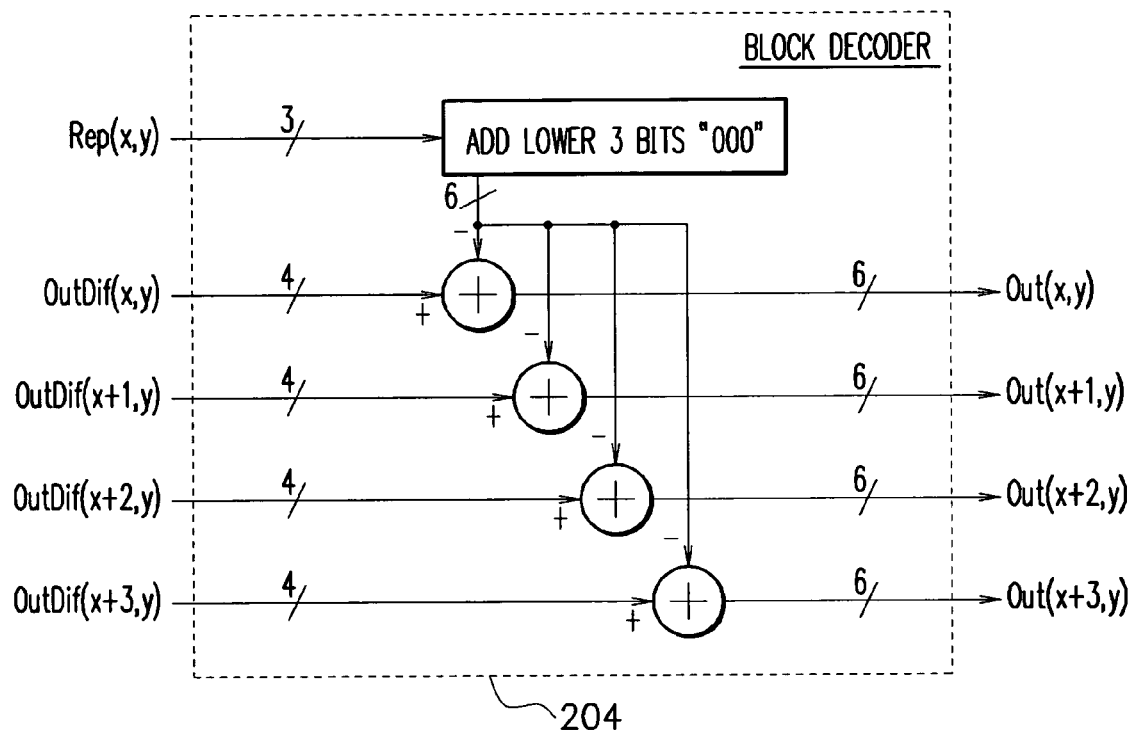
F I G. 13

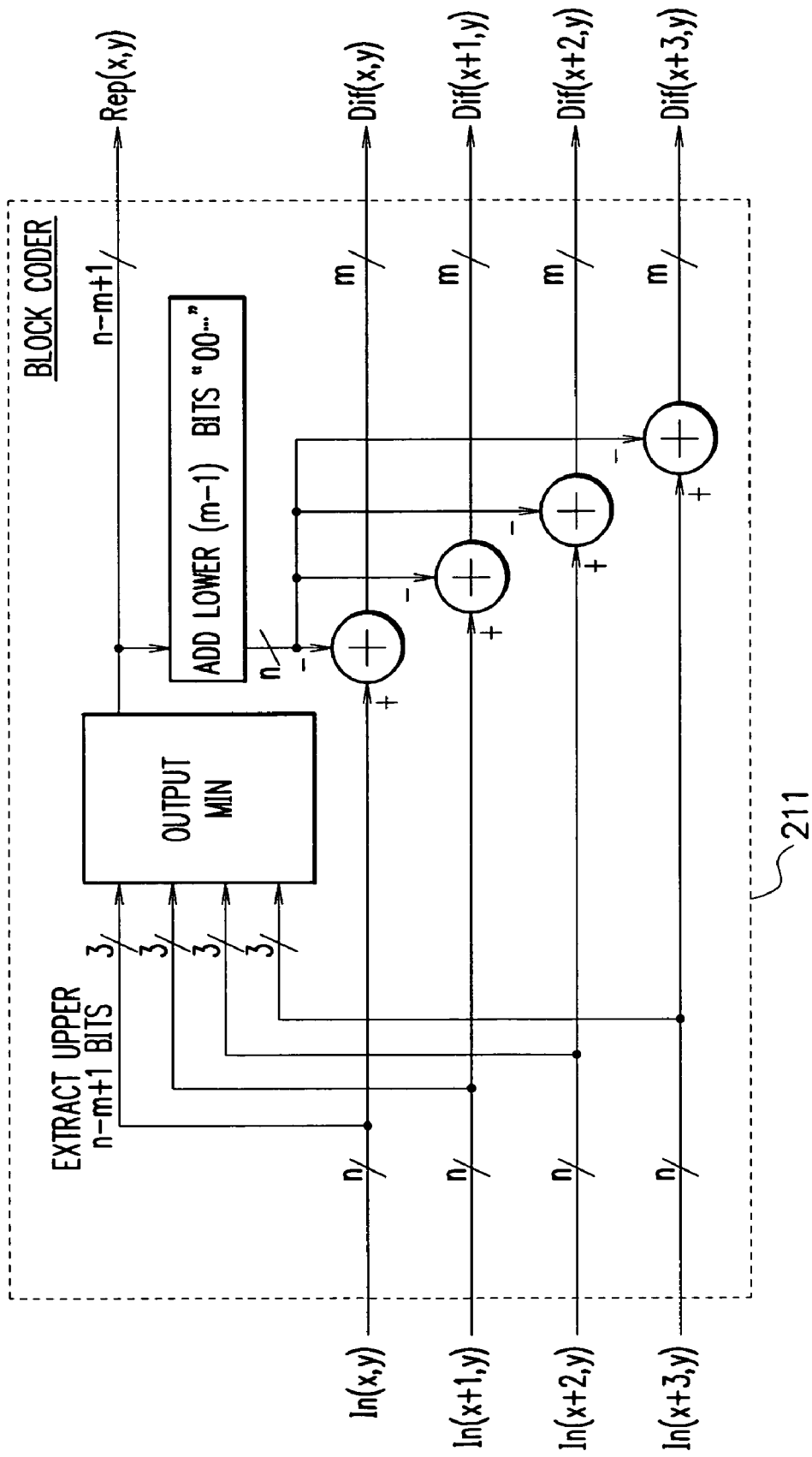
F I G. 16

F I G. 19
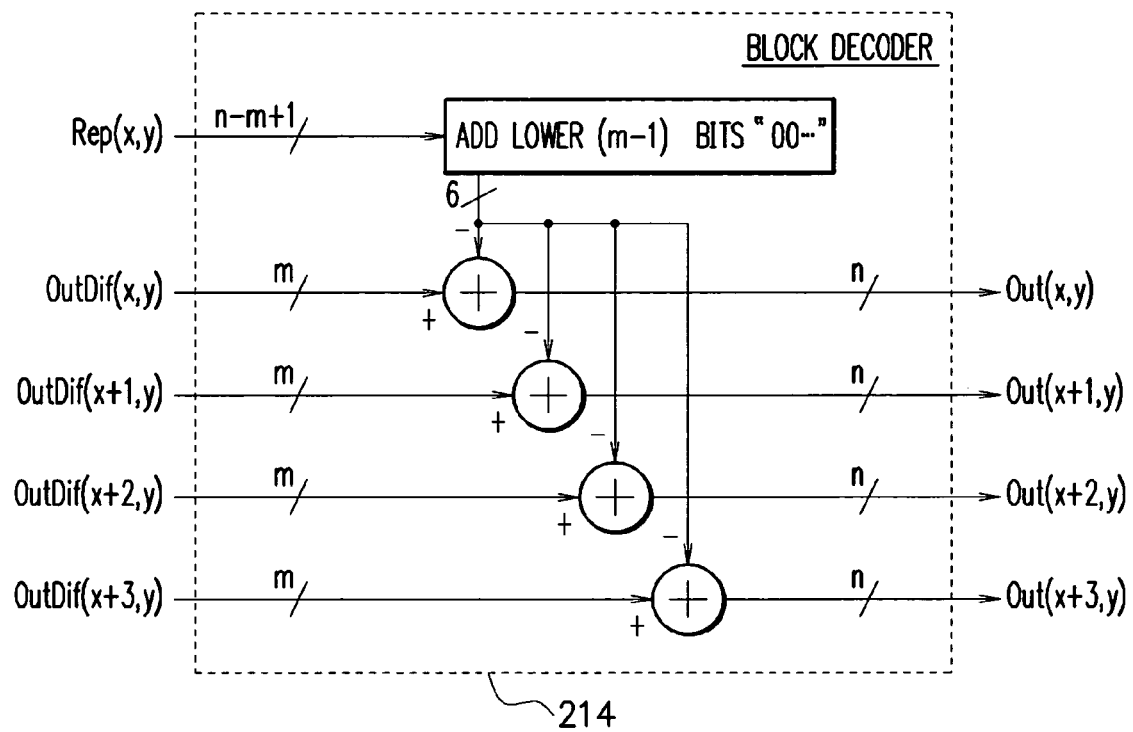

F I G. 21

(a)

| flag | m | k |
|---|---|---|
| n | n | cn |
| n-1 | n-1 | cn-1/2 |
| n-2 | n-2 | cn-5/4 |
| n-3 | n-3 | cn-2 |
| ⋮ | ⋮ | ⋮ |
| 1 | 1 | cn-3n/4+1 |

(b)

n=6, c=1/3

| flag | m | k |
|---|---|---|
| 110 | 6 | 2 |
| 101 | 5 | 2 |
| 100 | 4 | 1 |
| 011 | 3 | 0 |
| 010 | 2 | 0 |
| 001 | 1 | 0 |

F I G. 22

(a) k=2

THRESHOLD VALUES FOR COMPRESSION

| Y mod 4 | Out a | Out b | Out c | Out d |
|---|---|---|---|---|
| 0 0 | -2 | 0 | 2 | 0 |
| 0 1 | 1 | -1 | 1 | -1 |
| 1 0 | 2 | 0 | -2 | 0 |
| 1 1 | 1 | -1 | 1 | -1 |

THRESHOLD VALUES FOR DECOMPRESSION

| Y mod 4 | Out a | Out b | Out c | Out d |
|---|---|---|---|---|
| 0 0 | 0 | 2 | 3 | 1 |
| 0 1 | 3 | 1 | 2 | 0 |
| 1 0 | 3 | 1 | 0 | 2 |
| 1 1 | 2 | 0 | 3 | 1 |

(b) k=3

THRESHOLD VALUES FOR COMPRESSION

| Y mod 4 | Out a | Out b | Out c | Out d |
|---|---|---|---|---|
| 0 0 | -4 | 2 | -3 | 3 |
| 0 1 | 0 | -2 | 1 | -1 |
| 1 0 | -3 | 3 | 4 | 2 |
| 1 1 | 1 | -1 | 0 | -2 |

THRESHOLD VALUES FOR DECOMPRESSION

| Y mod 4 | Out a | Out b | Out c | Out d |
|---|---|---|---|---|
| 0 0 | 0 | 5 | 1 | 6 |
| 0 1 | 3 | 2 | 4 | 3 |
| 1 0 | 0 | 7 | 7 | 6 |
| 1 1 | 5 | 2 | 4 | 1 |

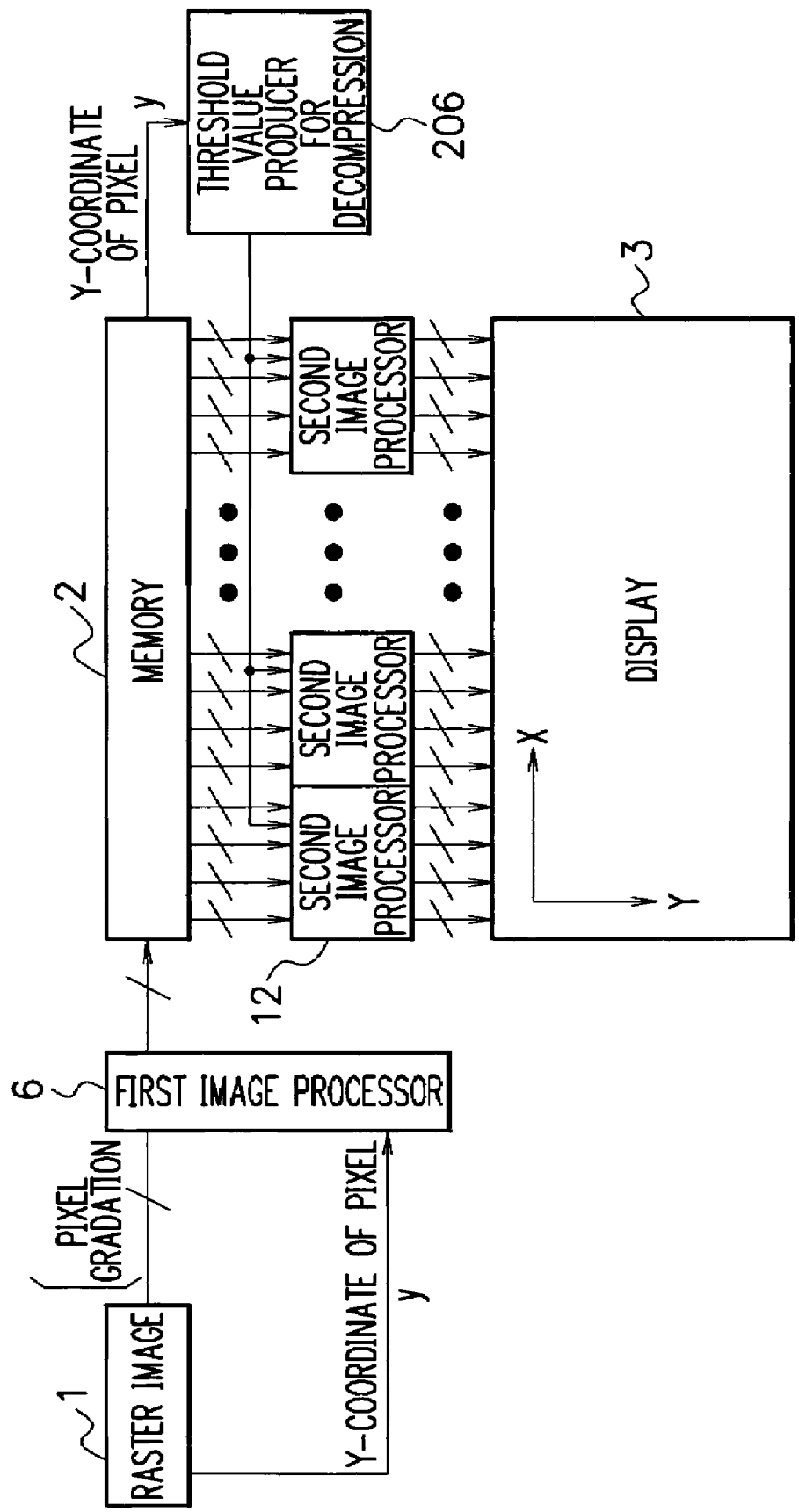
F I G. 29

F I G. 30
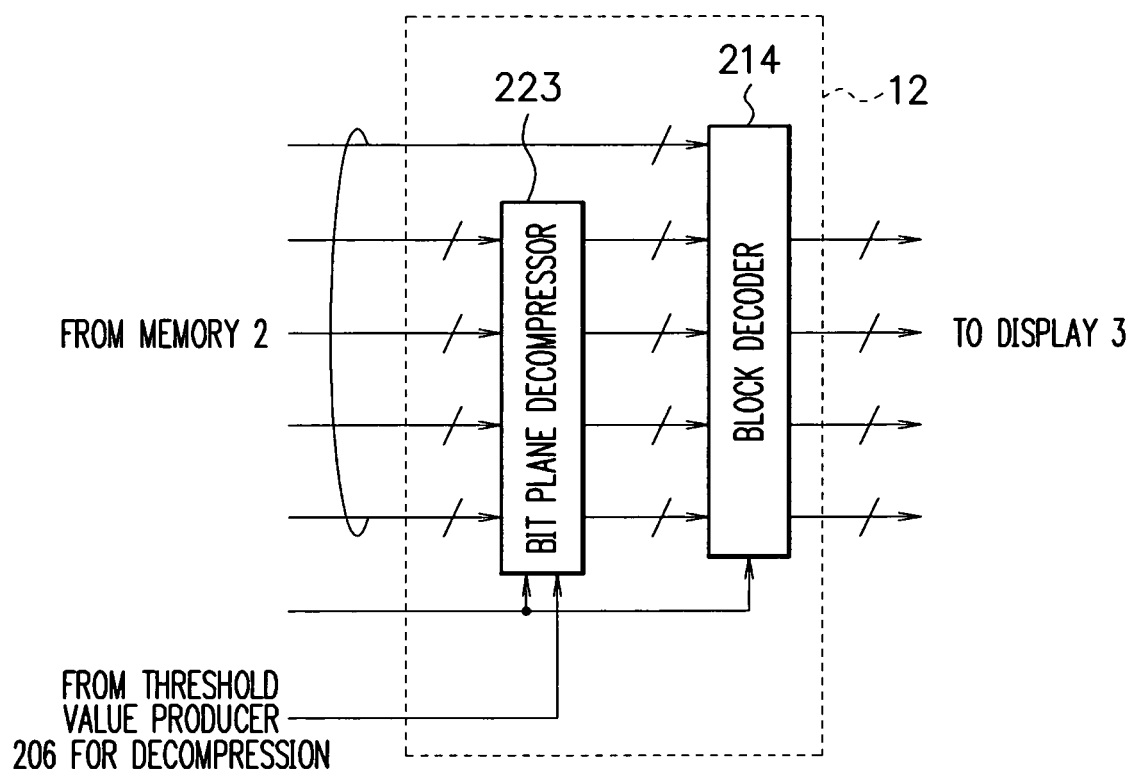

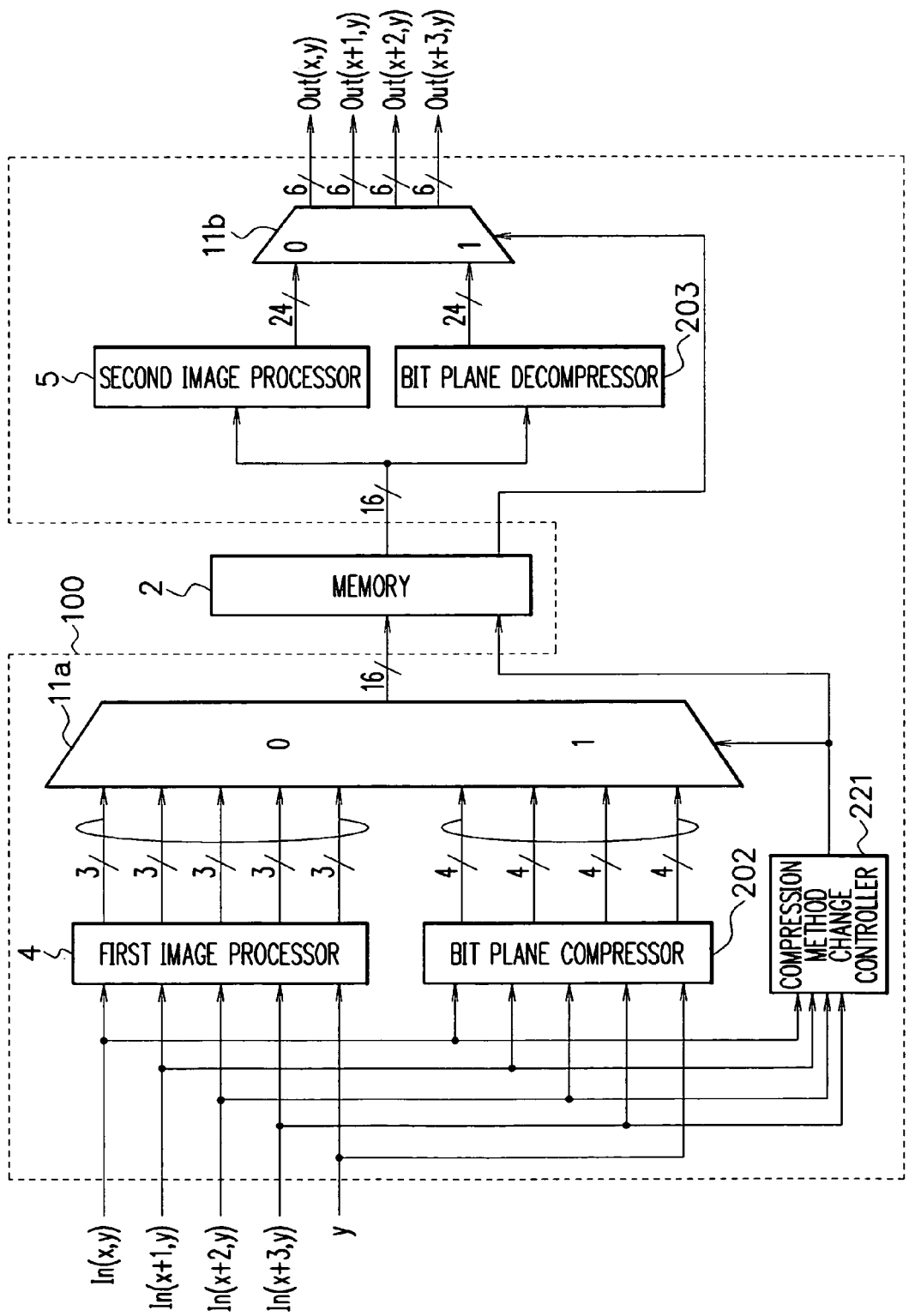
F I G. 32

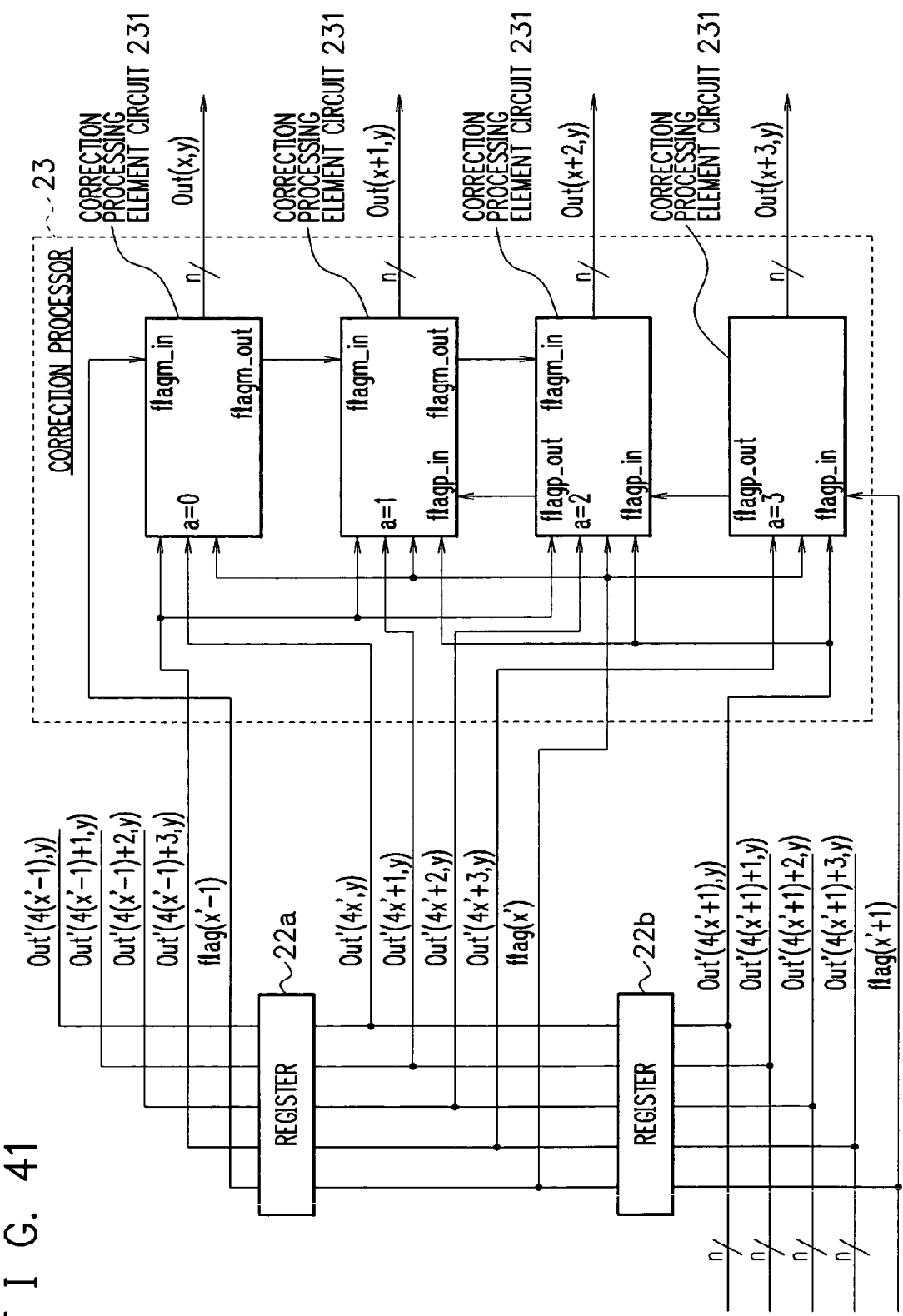
F I G. 41

F I G. 46
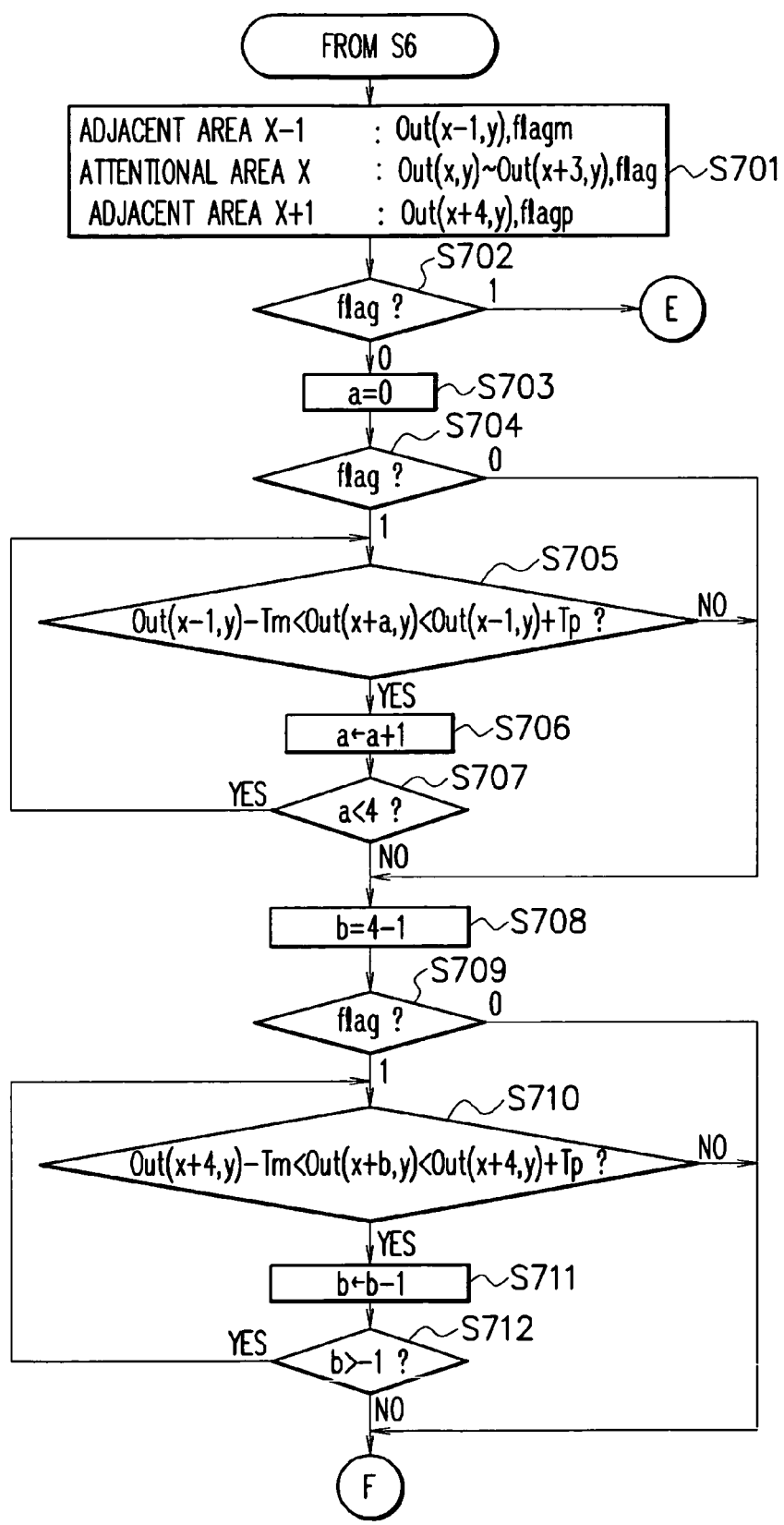

IMAGE PROCESSING, COMPRESSING, DECOMPRESSING, TRANSMITTING, SENDING AND RECEIVING DEVICES AND METHODS, PROGRAMS THEREOF AND DISPLAYING DEVICE

BACKGROUND OF THE INVENTION

The present invention relates to image processing, compressing, decompressing, transmitting, sending and receiving devices and methods, programs thereof and a displaying device, and more particularly to an image processing device, an image compressing device, an image decompressing device, an image transmitting device, an image sending device, an image receiving device, a displaying device, an image processing method, an image compressing method, an image decompressing method, an image transmitting method, an image sending method, an image receiving method and programs thereof for use in achieving high image quality, largely improving image quality and largely improving or removing granular quality deterioration in image compression and decompression processing in conformity to memory capacity of a display having a memory for storing a raster image, and improving efficiency for transmitting the raster image from a computer to the display.

At present, a method for transmitting raster images together with their frame frequencies is used as an image transmission method from a computer to a display. In this method, image data is not compressed and a data transmission amount becomes large.

Moreover, recently one screen of raster images is stored in memory not only at a computer side but also at a display side.

In this case, the image data is not compressed and the memory capacity becomes large. To produce images with higher definition and more gradations, the data transmission amount and the memory capacity increase and technical difficulties and costs further enlarge.

In the case of a superimposed image displaying, for instance, overlaying a screen image on another screen image, plural screen images such as images and characters must be prepared as input images to increase the data capacity of the input images. As a result, it becomes difficult to store the input images into a memory and to transmit their image data via a path having a limited bus width.

Furthermore, in a display of a mobile terminal or the like, having a low maximum resolution of its surface screen, when a large image such as a map or the like is displayed, scrolling is required. Although this scrolling display is a simple operation at first glance, the image data is frequently rewritten in a display memory with the result that its power consumption increases.

In order to meet not only the high definition and the multiple gradations of images without increasing the data transmission amount and the memory capacity but also multi-functions such as the image superimposition and the image scrolling, the images may be compressed in a file type such as JPEG (Joint Photographic Experts Group) or GIF (Graphics Interchange Format) to transmit the compressed image files.

However, since compression and decompression processing at every frame requires a high-speed processor, cost increases. Further, image quality varies considerably with features of images and it is difficult to obtain the same level of image quality for all images.

Another method for compressing image data called a BTC (Block Truncation Coding) capable of performing an operation relatively simpler than the aforementioned method has been developed. In the BTC, image data is divided into square blocks with a predetermined number of pixels and average value data for each block is calculated in the same bit number as the original image data. A difference between gradation data and the average value data for each pixel is calculated, and quantized difference data and the average value data are held.

In the related art, an image data compression by the BTC is disclosed in Japanese Patent Application Laid-Open No. Hei 10-66072, "Image Coding Device and Image Coding-Decoding Method" (Patent Document 1).

However, in an image data compression and decompression by the BTC, the average value data is different at every block and the difference data is quantized. Hence, a block noise occurs at the boundary between blocks to cause a false outline. When gradation values of pixels within a block are largely dispersed (a difference between the minimum and maximum gradation values within the block is large), a compression rate of the difference data at the quantization goes up and image deterioration increases. In this method, the image quality varies depending on the features of the images as well and it is difficult to obtain the same level of image quality for all images.

In this case, when blocks are small, the effect of the compression can be hardly obtained and a circuit designed for a certain size of block is required, which increases a circuit scale.

This is because line memory for holding the pixel data is needed since pixel data within a block extending to the sub-scanning direction must be processed in a batch when this method is applied to a display. A raster image is one-dimensional data and when a block is extending to the sub-scanning direction, the image data must be held until the next line of the image data is input after a preceding line was input.

That is, in the image data compression and decompression by the BTC, although the image compression is carried out to reduce the memory capacity, line memory is required to weaken the effect of the memory capacity reduction. As described above, larger blocks are preferable to heighten the effect of data compression. However, larger the blocks are, the more line memory is required (if the image data is not stored in the line memory until all the pixel data within the block is obtained, the processing cannot be executed). This problem becomes further noticeable.

As described above, the image quality largely varies depending on the features of images in these conventional methods. In order to reduce the variation of image quality, a reduction of a bit plane number of a raster image can be considered. A bit plane number represents a bit number n of data that expresses gradations of a digital image quantized in $2^n$ gradations. A plurality of methods for reducing the bit plane number such as a multi-valued dither method, a fixed threshold value method, and the like are disclosed in "Image Electronics Handbook", 1993, Corona Publishing Co., Ltd. (Nonpatent Document 1).

In the multi-valued dither method or fixed threshold value method, different from the image compression method using JPEG files, GIF files or the BTC, there is no need to decompress the compressed images.

However, in the conventional multi-valued dither method or fixed threshold value method, the bit plane number reduction causes a false outline, false colors and a grainy feeling or granular quality deterioration such as low (coarse) granular quality of the image to deteriorate the image quality.

In order to solve these problems, a conventional image processing system has been proposed as disclosed in Japanese Patent Application Laid-Open No. 2003-162272, "Image Processing Device, Image Transmission Device, Image Receiving Device and Image Processing Method" (Patent Document 2). FIG. 1 shows an image processing device disclosed in Patent Document 2. In this case, a dither processing is applied to an input image based on its XY coordinates and the processed image is quantized to store the obtained image data into a memory. The image data read out of the memory is inversely quantized and the same dither matrix as used in the dither processing of the input image is added to the image data to send the resulted image data to a display.

In the processing of Patent Document 2, image quality is steadily obtained for any images. Moreover, a circuit scale enlarged by applying the processing of Patent Document 2 to the image is smaller than a reduced scale of a circuit having a memory capacity obtained by compressing a relatively small image, and hence this processing can be also applied to a mobile phone as a frame memory capacity reduction method.

However, in the conventional system disclosed in Patent Document 2, the granular quality deterioration in the image can be slightly observed. In particular, the low granular quality is conspicuous in a mild gradation image (a gradation change is mild or small in a certain area of the image) and a plain gradation image (gradation is fixed in a certain area).

SUMMARY OF THE INVENTION

It is therefore an object of the present invention to provide an image processing device, an image compressing device, an image decompressing device, an image transmitting device, an image sending device, an image receiving device and a displaying device in view of the aforementioned problems of the prior art, which are capable of largely improving or removing granular quality deterioration and improving image quality in a mild gradation area and a plain gradation area within an image, in which a bit plane number is increased again after the bit plane number is once reduced.

It is another object of the present invention to provide an image processing method, an image compressing method, an image decompressing method, an image transmitting method, an image sending method, an image receiving method and their programs which are capable of largely improving or removing granular quality deterioration and improving image quality in a mild gradation area and a plain gradation area within an image, in which a bit plane number is increased again after the bit plane number is once reduced.

In accordance with one aspect of the present invention, there is provided an image processing device comprising a first image processor for compressing data capacity of input image data of a raster image to output compressed data of the raster image, a memory for storing the compressed data, and a second image processor for decompressing compressed data read out of the memory to output decompressed output image data, the first image processor including: a reversible coder for dividing the input image data into a plurality of areas including a plurality of pixels and representing the input image data by representative value data as a gradation component of a common part of the pixels within each area and difference data as a difference between input gradation data of each pixel and the representative value data to execute a data conversion; and a bit plane compressor for executing a multi-valued dither processing of the difference data on the basis of a two-dimensional dither matrix to reduce a bit plane number of the difference data to obtain compressed difference data, the second image processor including: bit plane decompressor for executing a bit addition processing of the compressed difference data read out of the memory on the basis of the two-dimensional dither matrix to obtain output difference data; and a reversible decoder for adding the representative value data to the output difference data to execute a data conversion to output output image data, the compressed data including the representative value data and the compressed difference data.

An image processing device can further comprise a compression method change controller for determining a compression rate in the reversible coder and a compression rate in the bit plane compressor on the basis of the input image data, the image processing device storing a flag signal as an output signal of the compression method change controller into the memory and determining an image processing of the second image processor on the basis of the flag signal read out of the memory.

In accordance with another aspect of the present invention, there is provided an image processing comprising a plurality of first image processors for compressing data capacity of input image data of a raster image to output compressed data of the raster image, a memory for storing the compressed data, and a plurality of second image processors for decompressing compressed data read out of the memory to output decompressed output image data, at least one of the first image processors including: a reversible coder for dividing the input image data into a plurality of areas including a plurality of pixels and representing the input image data by representative value data as a gradation component of a common part of the pixels within each area and difference data as a difference between input gradation data of each pixel and the representative value data to execute a data conversion; and a bit plane compressor for executing a multi-valued dither processing of the difference data on the basis of a two-dimensional dither matrix to reduce a bit plane number of the difference data to obtain compressed difference data, at least one of the second image processors including: a bit plane decompressor for executing a bit addition processing of the compressed difference data read out of the memory on the basis of the two-dimensional dither matrix to obtain output difference data; and a reversible decoder for adding the representative value data to the output difference data to execute a data conversion to output image data, the compressed data including the representative value data and the compressed difference data, the image processing device further comprising: a compression method change controller for determining a compression rate in the reversible coder and a compression rate in the bit plane compressor on the basis of the input image data; a first selector for selecting the compressed data of one first image processor, determined by the compression method change controller, including the reversible coder executing the data compression at the determined compression rate and the bit plane compressor executing the data compression at the determined compression rate, to output the selected compressed data; first means for storing the compressed data selected by the first selector into the memory; second means for storing a flag signal as an output signal of the compression method change controller into the memory; and a second selector for selecting the output image data of one second image processor selected on the basis of the flag signal read out of the memory to output the selected output image data.

An image processing device can further comprise a third image processor for executing a correction processing of the output image data of the second image processor on the basis of the output image data and the flag signal read out of the memory to output corrected output image data, the third image processor including: a correction determiner for determining whether or not the correction processing of the output image data of an target area is executed on the basis of the output image data of the target area and its flag signal and output image data of adjacent areas adjoining the target area and their flag signals; and a correction processor for executing the correction processing of the output image data of the target area on the basis of a determination result of the correction determiner to output the corrected output image data, the correction determiner determining the execution of the correction processing when available errors of the output image data of the target area is larger than available errors of the output image data of each adjacent area and a difference between the output image data of the target area and the output image data of each adjacent area is within a certain range.

In an image processing device, the bit plane decompressor can add an offset value to the compressed difference data.

In accordance with another aspect of the present invention, there is provided an image transmitting device comprising a first processing unit including a first image processor for compressing data capacity of input image data of a raster image to transmit compressed data of the raster image from the first processing unit and a second processing unit including a second image processor for decompressing transmitted compressed data to output decompressed output image data, the first image processor including: a reversible coder for dividing the input image data into a plurality of areas including a plurality of pixels and representing the input image data by representative value data as a gradation component of a common part of the pixels within each area and difference data as a difference between input gradation data of each pixel and the representative value data to execute a data conversion; and a bit plane compressor for executing a multi-valued dither processing of the difference data on the basis of a two-dimensional dither matrix to reduce a bit plane number of the difference data to obtain compressed difference data, the second image processor including: a bit plane decompressor for executing a bit addition processing of the compressed difference data of the compressed data transmitted from the first processing unit on the basis of the two-dimensional dither matrix to obtain output difference data; and a reversible decoder for adding the representative value data to the output difference data to execute a data conversion to output image data, the compressed data including the representative value data and the compressed difference data.

In an image transmitting device, the first processing unit further includes a compression method change controller for determining a compression rate in the reversible coder and a compression rate in the bit plane compressor on the basis of the input image data. A flag signal as an output signal of the compression method change controller is transmitted from the first processing unit to the second processing unit, and the second processing unit determines an image processing of the second image processor on the basis of the flag signal transmitted from the first processing unit.

In an image transmitting device, the first processing unit further includes a third image processor for executing a correction processing of the output image data of the second image processor on the basis of the output image data and the flag signal transmitted from the first processing unit to output corrected output image data. The third image processor includes a correction determiner for determining whether or not the correction processing of the output image data of an target area is executed on the basis of the output image data of the target area and its flag signal and output image data of adjacent areas adjoining the target area and their flag signals; and a correction processor for executing the correction processing of the output image data of the target area on the basis of a determination result of the correction determiner to output the corrected output image data. The correction determiner determines the execution of the correction processing when available errors of the output image data of the target area is larger than available errors of the output image data of each adjacent area and a difference between the output image data of the target area and the output image data of each adjacent area is within a certain range.

In an image transmitting device, the bit plane decompressor can add an offset value to the compressed difference data.

In accordance with another aspect of the present invention, there is provided a displaying device comprising a first image processor for compressing data capacity of input image data of a raster image to output compressed data of the raster image, a memory for storing the compressed data, a second image processor for decompressing compressed data read out of the memory to output decompressed output image data, and a display for displaying an image according to the image data produced by the second image processor, the first image processor including: a reversible coder for dividing the input image data into a plurality of areas including a plurality of pixels and representing the input image data by representative value data as a gradation component of a common part of the pixels within each area and difference data as a difference between input gradation data of each pixel and the representative value data to execute a data conversion; and a bit plane compressor for executing a multi-valued dither processing of the difference data on the basis of a two-dimensional dither matrix to reduce a bit plane number of the difference data to obtain compressed difference data, the second image processor including: a bit plane decompressor for executing a bit addition processing of the compressed difference data read out of the memory on the basis of the two-dimensional dither matrix to obtain output difference data; and a reversible decoder for adding the representative value data to the output difference data to execute a data conversion to output image data, the compressed data including the representative value data and the compressed difference data.

A displaying device can further comprise a compression method change controller for determining a compression rate in the reversible coder and a compression rate in the bit plane compressor on the basis of the input image data, the displaying device storing a flag signal as an output signal of the compression method change controller into the memory and determining an image processing of the second image processor on the basis of the flag signal read out of the memory.

A displaying device can further comprise a third image processor for executing a correction processing of the output image data of the second image processor on the basis of the output image data and the flag signal read out of the memory to output corrected output image data, the third image processor including: a correction determiner for determining whether or not the correction processing of the output image data of an target area is executed on the basis of the output image data of the target area and its flag signal and output image data of adjacent areas adjoining the target area and their flag signals; and a correction processor for executing the correction processing of the output image data of the target area on the basis of a determination result of the correction determiner to output the corrected output image data, the correction determiner determining the execution of the correction processing when available errors of the output image data of the target area is larger than available errors of the output image data of each adjacent area and a difference between the output image data of the target area and the output image data of each adjacent area is within a certain range, the display displaying an image according to the image data produced by the second image processor.

In a displaying device, the bit plane decompressor can add an offset value to the compressed difference data.

In a displaying device, the second image processors are arranged every one line of areas in a main-scanning direction of the display, and one line of the image data in the main-scanning direction of the display is sent as one set from the memory to the second image processors corresponding to pixels. A displaying device can further comprise a threshold value producer for decompression for producing threshold values to be used for the bit addition processing of all the second image processors and for sending the threshold values to the respective second image processors.

In accordance with another aspect of the present invention, there is provided an image processing method comprising a first image processing step for compressing data capacity of input image data of a raster image to output compressed data of the raster image, a storing step for storing the compressed data into a memory, and a second image processing step for decompressing compressed data read out of the memory to output decompressed output image data, the first image processing step for data compression including: a reversible coding process for dividing the input image data into a plurality of areas including a plurality of pixels and representing the input image data by representative value data as a gradation component of a common part of the pixels within each area and difference data as a difference between input gradation data of each pixel and the representative value data to execute a data conversion; and a bit plane compressing process for executing a multi-valued dither processing of the difference data on the basis of a two-dimensional dither matrix to reduce a bit plane number of the difference data to obtain compressed difference data, the second image processing step for data decompression including: a bit plane decompressing process for executing a bit addition processing of the compressed difference data read out of the memory on the basis of the two-dimensional dither matrix to obtain output difference data; and a reversible decoding process for adding the representative value data to the output difference data to execute a data conversion to output image data, the compressed data including the representative value data and the compressed difference data.

An image processing method can further comprise a compression method change controlling step for determining a compression rate in the reversible coding process and a compression rate in the bit plane compressing process on the basis of the input image data. A flag signal as an output signal of the compression method change controlling step is stored into the memory and an image processing of the second image processing step is determined on the basis of the flag signal read out of the memory.

An image processing method can further comprise a third image processing step for executing a correction processing of the output image data of the second image processing step on the basis of the output image data and the flag signal read out of the memory to output corrected output image data, the third image processing step including: a correction determining process for determining whether or not the correction processing of the output image data of an target area is executed on the basis of the output image data of the target area and its flag signal and output image data of adjacent areas adjoining the target area and their flag signals; and a correction process for obtaining the corrected output image data on the basis of a determination result of the correction determining process. The execution of the correction processing is determined in the correction determining process when available errors of the output image data of the target area is larger than available errors of the output image data of each adjacent area and a difference between the output image data of the target area and the output image data of each adjacent area is within a certain range.

In an image processing method, an offset value can be added to the compressed difference data in the bit plane decompressing process.

In accordance with another aspect of the present invention, there is provided an image transmitting method comprising a first image processing step for compressing data capacity of input image data of a raster image, a transmitting step for transmitting compressed data of the raster image from a first processing unit to a second processing unit and a second image processing step for decompressing transmitted compressed data to output decompressed output image data, the first image processing step for data compression including: a reversible coding process for dividing the input image data into a plurality of areas including a plurality of pixels and representing the input image data by representative value data as a gradation component of a common part of the pixels within each area and difference data as a difference between input gradation data of each pixel and the representative value data to execute a data conversion; and a bit plane compressing process for executing a multi-valued dither processing of the difference data on the basis of a two-dimensional dither matrix to reduce a bit plane number of the difference data to obtain compressed difference data, the second image processing step for data decompression including: a bit plane decompressing process for executing a bit addition processing of the compressed difference data of the compressed data transmitted from the first processing unit on the basis of the two-dimensional dither matrix to obtain output difference data; and a reversible decoding process for adding the representative value data to the output difference data to execute a data conversion to output output image data, the compressed data including the representative value data and the compressed difference data.

An image transmitting method can further comprise a compression method change controlling step for determining a compression rate in the reversible coding process and a compression rate in the bit plane compressing process on the basis of the input image data. A flag signal as an output signal of the compression method change controlling step is transmitted from the first processing unit to the second processing unit, and the second processing unit determines an image processing of the second image processing step on the basis of the flag signal transmitted from the first processing unit.

An image transmitting methods can further comprising a third image processing step for executing a correction processing of the output image data of the second image processing step on the basis of the output image data and the flag signal transmitted from the first processing unit to output corrected output image data, the third image processing step including: a correction determining process for determining whether or not the correction processing of the output image data of an target area is executed on the basis of the output image data of the target area and its flag signal and output image data of adjacent areas adjoining the target area and their flag signals; and a correction process for obtaining the corrected output image data on the basis of a determination result of the correction determining process. The execution of the correction process is determined in the correction determining process when available errors of the output image data of the target area is larger than available errors of the output image data of each adjacent area and a difference between the output image data of the target area and the output image data of each adjacent area is within a certain range.

In an image transmitting method, an offset value can be added to the compressed difference data in the bit plane decompressing process.

In the aforementioned devices and methods of the present invention, a decompression rate of a bit plane decompressor and a decompression rate of a reversible decoder can be determined on the basis of information representing compression processing of a raster image in a first image processor.

Moreover, in at least one of a plurality of first image processors, a compression rate of image data in a reversible coder can be preferably determined to be 0, and in addition, a compression rate of the image data in a bit plane compressor can be preferably determined to be 0.

Further, in at least one of a plurality of second image processors, a decompression rate of the image data in an irreversible decoder can be preferably determined to be 0, and in addition, a decompression rate of the image data in a bit plane decompressor can be preferably determined to be 0.

When a color raster image of RGB colors is processed in different image processing units for RGB color components, a flag signal for one color component can be used as a representative flag signal in common for all color components. The representative flag signal is preferably stored in memory in place of flag signals. Further, a data decompression in the RGB areas can be preferably executed in common on the basis of the representative flag signal read out of the memory.

Furthermore, according to the present invention, the above-described image processing methods can be executed by an image processing program using a computer. The above-described image compressing methods can be executed by an image compressing program using a computer. The above-described image decompressing methods can be executed by an image decompressing program using a computer. The above-described image transmitting methods can be executed by an image transmitting program using a computer. The above-described image sending methods can be executed by an image sending program using a computer. The above-described image receiving methods can be executed by an image receiving program using a computer.

According to the present invention, in a mild gradation image or a plane gradation image, a gradation difference between image data within one area is not large and hence a reversible compression in a block coding can be carried out. Hence, when a total compression rate ($\Delta$ d/D=(reduced data amount)/(original data amount)) is equal, a compression rate of an irreversible compression in a bit plane compressor can be reduced by the reversible compression in the block coding. As a result, granular quality deterioration caused by the bit plane compression and decompression processing can be largely improved or removed, and memory capacity and transmission capacity can be reduced. Accordingly, a high quality image can be reproduced with no inferior image quality compared with the original image.

In the present invention, when a raster image of 6 bits for each color (total 18 bits) is transmitted between two devices via a transmission path having a bus width of only 16 bits for receiving the image, on the transmitting side, a block coding and a bit plane compression are executed for the image data of the raster image to reduce the data amount and the compressed image data of the raster image is transmitted via the transmission path. On the receiving side, the received compressed image data of the raster image is decompressed to obtain the raster image. In this instance, the image data of the color components can be transmitted in parallel to enable it to reproduce the image with no inferior image quality compared with the original image.

According to the present invention, a compression and decompression processing of a bitmapped image to be sent to a display can be implemented with a less logic number and hence memory capacity and transmission capacity can be reduced.

Moreover, as to an image reproduced using a bit addition processing, errors compared with the original image become less than errors caused in a conventional image processing method and granular quality deterioration occurring in the case of large errors in an image can be largely improved or removed with the result of a high quality image displaying.

According to the present invention, image processing, compressing, decompressing, transmitting, sending and receiving devices and methods, their programs and a displaying device which are capable of largely improving or removing granular quality deterioration and improving image quality in a mild gradation area and a plain gradation area within an image, in which a bit plane number is increased again after the bit plane number is first reduced can be performed.

BRIEF DESCRIPTION OF THE DRAWINGS

The objects, features and advantages of the present invention will become more apparent from the consideration of the following detailed description, taken in conjunction with the accompanying drawings, in which:

FIG. 3 is a schematic diagram showing an image processing, in which a combination of a block coding and a bit plane compression cannot be carried out;

FIG. 4 is a schematic block diagram of an image compressor executing a block coding with a variable compression rate and a bit plane compression with a variable compression rate;

FIG. 9 is a tabular diagram showing the relationship between input and output values of threshold values for compression and decompression for use in the image processing device shown in FIG. 6;

FIG. 11a is a schematic diagram of a first embodiment of the bit adder and FIG. 11b is a second embodiment of the bit adder shown in FIG. 10;

FIG. 12 is a schematic block diagram of an image processing device including the bit adder shown in FIG. 11b according to the first embodiment;

FIG. 13 is a schematic block diagram of one embodiment of a block decoder shown in FIG. 6;

FIG. 16 is a schematic block diagram of one embodiment of a block coder shown in FIG. 15;

FIG. 19 is a schematic block diagram of one embodiment of a block decoder shown in FIG. 15;

FIG. 21 is a tabular diagram showing the relationship among a flag output from a flag producer of the compression method change controller, a bit number m of difference data and a reduction bit number k of the difference data, and one embodiment thereof;

FIG. 22 is a tabular diagram showing the relationship between input and output values of threshold values for compression and decompression for use in the image processing device shown in FIG. 15;

FIG. 29 is a schematic block diagram of a displaying device according to an eighth embodiment;

FIG. 30 is a schematic block diagram of each second image processor shown in FIG. 29;

FIG. 32 is a schematic block diagram of a functional construction corresponding to an image processing device for use in an image processing method according to a ninth embodiment;

FIG. 41 is a schematic block diagram of a third image processor shown in FIG. 39;

FIG. 46 is a flow chart showing a processing of a third image processor for use in the image processing method shown in FIG. 45;

DESCRIPTION OF THE PREFERRED EMBODIMENTS

Figure 1:
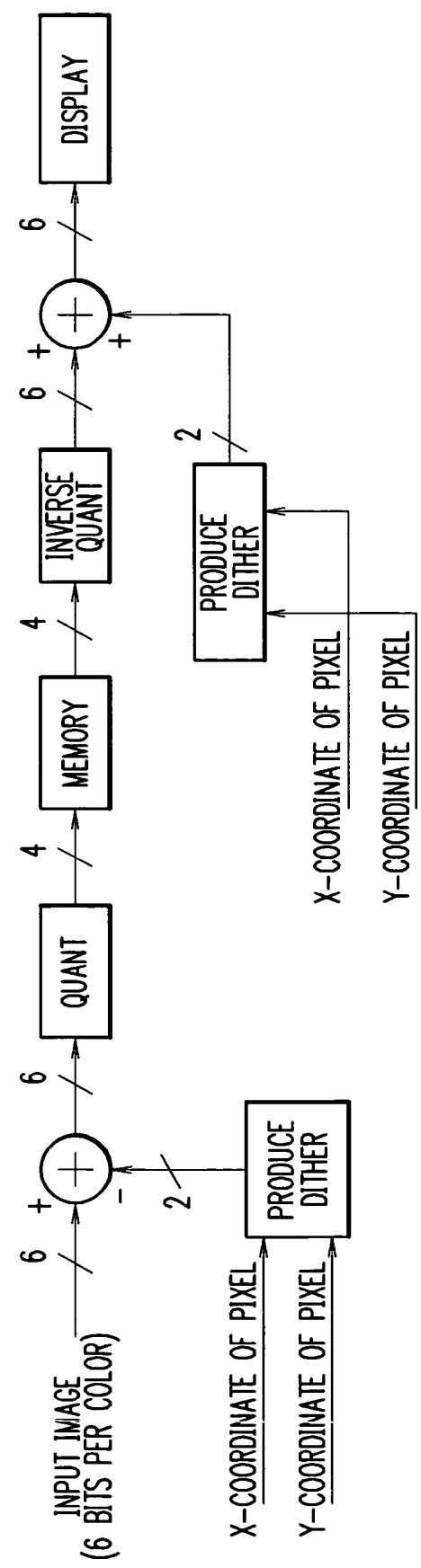
FIG. 1 is a schematic block diagram of a conventional image processing device.

The present invention will now be described in detail in connection with its preferred embodiments with reference to the attached drawings.

In a conventional image processing, a grainy or coarse look of images is caused by errors produced before and after the image processing and the errors involve strong high spatial frequency components. The errors of high spatial frequency components are noticeable in a mild gradation image area and a plain gradation image area, but, on the other hand, unnoticeable in a large gradation change area such as an edge part or a thin line. Further, the errors of the high spatial frequency components become larger when a compression rate becomes higher. In the area where errors are noticeable, a compression rate for reducing a bit plane number is determined to be smaller than a compression rate in the area where errors are unnoticeable, and the compression rate difference between those areas is compensated by another compression method preventing occurrence of granular quality deterioration of the image to largely improve its granular quality and to achieve high (fine) granular quality over the whole image.

Since in the mild gradation image or the plain gradation image, a gradation difference between pixels is not so large, it reduces more amount of data to hold one representative gradation value and difference gradation values between the representative gradation value and a gradation value of each pixel compared with holding of gradation values of each pixel like a raster image. Moreover, this data conversion is reversible and hence no granular quality deterioration occurs.

According to the present invention, data capacity of input image data of a raster image is reduced by (1) a reversible coding which is carried out by dividing input image data into a plurality of pixel areas and representing the input image data by one representative gradation data and difference data between the representative gradation data and each input gradation data to execute a data conversion, and (2) a bit plane compression which is performed by conducting a multivalued dither processing of the difference data on the basis of a two-dimensional dither matrix to reduce a bit plane number to obtain compressed difference data, to prevent occurrence of granular quality deterioration in a mild gradation image or a plain gradation image.

In the present invention, the reversible coding is different from a BTC (Block Truncation Coding) in its processing method and applying forms. Though the problems of the BTC have been described in the background of the invention, problems of a combination of the BTC and a bit plane compression will be further described.

For instance, in the case of a simple combination of the BTC and the bit plane compression, an average value of data within a block is subtracted from gradation data of each pixel within the block by the BTC (offset removal), and after quantization of this difference data, a bit plane compression of the quantized data is carried out. In this case, image degradation due to the quantization cannot be prevented. Hence, the quantization is replaced with a bit plane compression. However, in this instance, when a compression bit number is large in the bit plane compression, a block noise becomes still noticeable. For improving compression rate by the BTC, it is necessary to enlarge a block size and to increase a compression bit number. When the block size is enlarged, a difference between the maximum and minimum gradation values within the block is statistically increased and the bit number of the difference data is enlarged. This forces increase of the compression bit number. When the compression bit number is increased, the image deterioration is remarkably observed. This result does not meet the purpose of the present invention for improving and minimizing image deterioration of all images.

Therefore, according to the present invention, the reversible coding is adopted and, when the reversible coding cannot be employed, no reversible coding is performed. That is, (1) the reversible coding is used and (2) the reversible coding can be selectively carried out. As a result, the block noise and the image deterioration depending on images, as seen in the BTC, can be minimized according to the present invention.

The BTC, which quantizes the difference data, is basically irreversible. Hence, it is unnecessary for the irreversible BTC to select whether to execute the coding or not. In other words, to be able to select whether to carry out the coding or not is a new concept of the present invention different from the related art.

Figure 2:
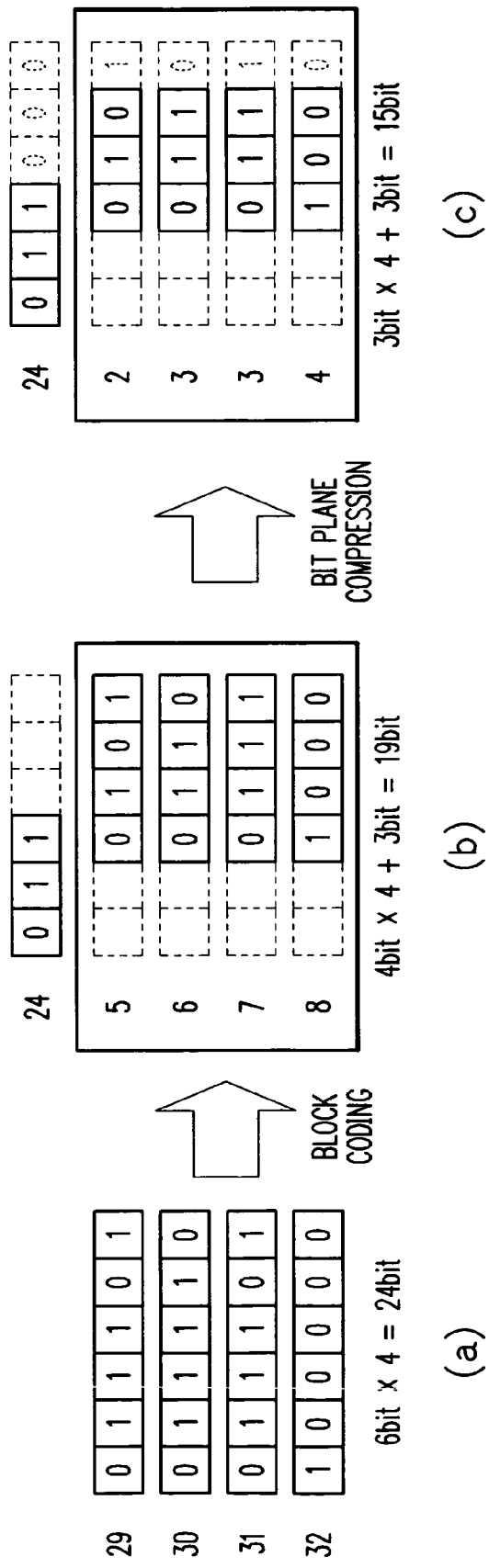
FIG. 2 is a schematic diagram showing an image processing including a combination of a block coding and a bit plane compression.

In the present embodiment, a reducing method of data capacity of image data, and an image processing under a combination of a block coding as a reversible compression and a bit plane compression for realizing minimization of image deterioration depending on images will be described with reference to FIG. 2 to FIG. 5. In FIG. 2, there is shown one embodiment of an image processing including a combination of a block coding and a bit plane compression. In FIG. 2, one divided area includes four pixels and input image data of one pixel is represented by 6 bits, showing the input image data of 29, 30, 31 and 32 gradations within one area. This input image data represents a mild gradation image area. As shown in (a) of FIG. 2, the data capacity of the input image data within one area is 4 pixels×6 bits=24 bits.

With the use of a block coding, the input image data is replaced with one representative value data and difference data between the representative value data and each input gradation data to carry out a data conversion. On this occasion, if a bit number of all the representative value data and the difference data is 6 bits, this method could be applied to any kind of image data, but data capacity would become large, and it would be meaningless.

In the present embodiment, low order bits of the representative value data and high order bits of the difference data are omitted. In FIG. 2, the omitted data shown by broken lines is "0".

FIG. 2(b) shows that the representative value data is expressed by the upper 3 bits and each difference data is expressed by the lower 4 bits. The representative value data is composed of the upper 3 bits "011" and the omitted lower 3 bits "000" and indicates "24". Each difference data is a difference between each input image data and "24". In this case, it is sufficient that the sum of the omitted bit number of the representative value data and the omitted bit number of each difference data of one pixel is at most the bit number of the input image data, and the sum of the omitted bit numbers is optimally "the bit number of the input image data—1". This means that all the image data of 6 bits can be desirably expressed by the representative value data and the difference data. When the sum of the omitted bit number of the representative value data and the omitted bit number of each difference data of one pixel is at most the bit number of the input image data, although this step is executable even if the sum of the omitted bit numbers is not "the bit number of the input image data—1", the block coding cannot be conducted in many cases and hence the image quality can be readily lowered.

In the block coding, as shown in (b) of FIG. 2, the data capacity of one area is 4 pixels×4 bits+3 bits=19 bits and a reversible compression of 1.25 bits per one pixel is performed.

Next, a bit plane number reduction processing of the difference data shown in (b) of FIG. 2 is carried out, as shown in (c) of FIG. 2. For the bit plane number reduction, the above-described conventional method can be employed. In this case, one bit of the bit plane number of the difference data is reduced. This bit plane number reduction is not applied to the representative value data. At this time, the data capacity is 4 pixels×3 bits+3 bits=15 bits and hence an irreversible compression of 2.25 bits per one pixel is conducted.

As described above, in the present method, different from a conventional method carrying out an irreversible compression of 2 bits per one pixel using only a bit plane compression, the bit plane number reduction of only 1 bit is performed in the mild gradation image area or the plane gradation image area and the granular quality can be largely improved in the basically noticeable areas such as the mild gradation image area and the plane gradation image area.

In this case, although the data of the upper 3 bits of the input gradations as the representative value data in common for all the pixels within the area and the data of the lower 4 bits of the input gradations as the difference data of each pixel are held, that is, the third bit data from the upper end bit is included in both the representative value data and each difference data (the third bit data from the upper end bit is repeatedly held for the representative value data and each difference data), the present invention is not restricted to this case.

For instance, the data of the upper 4 bits of the input gradations as the representative value data and the data of the lower 4 bits of the input gradations as the difference data of each pixel can be held (in other words, the third and fourth bits of data from the upper end bit is repeatedly held for the representative value data and each difference data), or the data of the upper 3 bits of the input gradations as the representative value data and the data of the lower 5 bits of the input gradations as the difference data of each pixel can be held (in other words, the second and third bits of data from the upper end bit is held in common for the representative value data and each difference data).

In the case that one bit data of the representative value data and each difference data is repeated and the bit number difference between the representative value data and each difference data is one, the image quality and the compression rate are most balanced each other and this case is preferable.

In the aforementioned embodiment, the mild gradation image or the plane gradation image was used as the input image data. In FIG. 3, there is shown another processing for images with steep changes between adjacent gradations. In FIG. 3, (a) illustrates a block coding of input image data with 29, 46, 31 and 32 gradations of four pixels within one area in the same manner as shown in FIG. 2. In this case, when the block coding is executed with the same bit numbers of the representative value data and the difference data as those shown in FIG. 2, the difference data of the pixel for the input image data with 46 gradations is 22 and is not expressed by 4 bits.

In this case, as shown in (b) in FIG. 3, an irreversible compression using only a bit plane number reduction processing is carried out. The data capacity is 4 pixels×4 bits=16 bits and the irreversible compression of 2 bits per one pixel is conducted. In such a large gradation change image area, a reversible compression by a block coding cannot be executed. However, in the large gradation change image area, the granular quality degradation is unnoticeable and hence image quality difference depending on the areas is unnoticeable.

In order to carry out an image processing for any image without causing failure, the functions for executing the above-described two embodiments are required. For the two functions, two kinds of methods can be mainly developed.

First, a compression rate of a block coding and a compression rate of a bit plane compression are designed to be variable and these compression rates are set on the basis of image data in an input area. More specifically, as shown in FIG. 4, a compression rate $((4q-4t-z)/4q)$ of a block coding and a compression rate $((t-w)/t)$ of a bit plane compression are set to be variable. In this instance, when the compression rate of the block compression is determined to be "0" (that is, no compression is conducted in the block coding (q=t, z=0)) to perform the bit plane compression, the processing becomes the same as the above-described second processing. On the other hand, when the two compression rates are set to be larger than "0", respectively, the processing is the same as the above-described first processing. At this time, it is desirable that the entire compression rates are set to be approximately the same (the above-described first case is not the same as the above-described second case in their entire compression rates). If not so, it is preferable to possibly raise the compression rate of the block coding.

Such a setting of the compression rates is carried out in a compression method change controller for determining the compression rates of the block coding and the bit plane compression on the basis of the input image data, and it is desirable to implement the processing of the block coding and the bit plane compression with the determined compression rates by a flag signal as an output signal of this compression method change controller.

Second, the compression rates of the block coding and the bit plane compression are determined to be fixed values in their image processing blocks and a plurality of image processing blocks with the different compression rates are arranged in parallel. The outputs of the image processing blocks are fed to a selector and the output of the selector is selected on the basis of the image processing data in the input area. For covering all images, an image processing block with a compression rate "0" in the block coding is required. Moreover, like the first method, it is desirable that the entire compression rates of the image processing blocks are set to be approximately the same, and if not so, it is preferable to possibly raise the compression rate of the block coding.

The first method and the second method can be selectively employed according to configurations.

Figure 5:
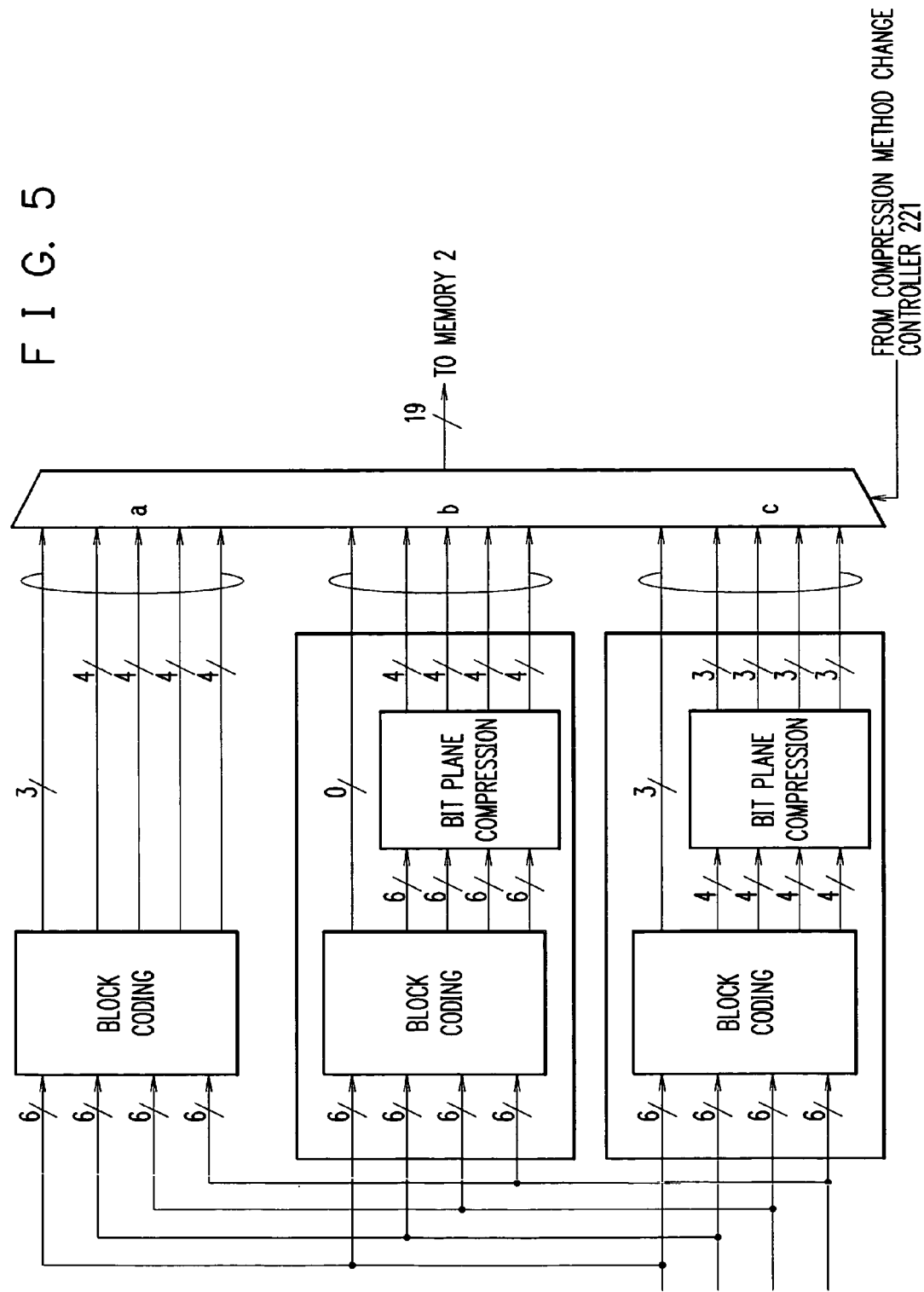
FIG. 5 is a schematic block diagram of an image compressor including parallel image processing blocks carrying out only a block coding and a combination of a block coding with a fixed compression rate and a bit plane compression with a fixed compression rate.

Furthermore, a modified embodiment of the aforementioned second method as another method for executing an image processing of any image without causing failure is developed. As shown in FIG. 5, this embodiment is provided with an image processing block for carrying out only a block coding, and one or more image processing blocks for implementing a block coding and a bit plane compression with their fixed compression rates, and outputs of the image processing blocks are sent to a selector to select outputs on the basis of image processing data in an input image area. In this embodiment, a structure including one image processing block for executing only a block coding and another image processing block for conducting only a bit plane compression in parallel is also included. When the desired compression rate can be achieved by only a block coding as a reversible compression, there is no need to perform a bit plane compression.

Further, in the case of the image data of a color image, the image data of each of RGB (red, green and blue) colors can be processed in the above-described image processing device, that is, the image data of three colors such as the RGB can be separately processed in parallel in the three image processing devices. In this case, an R-pixel, a G-pixel and a B-pixel are not grouped in one area, but it is preferable to group the adjacent same color pixels, for example, only R-pixels in one area. This is because there is a high correlation between the adjacent same color pixels (in the case of similar gradations) than the RGB values within one pixel and hence the compression rate of the image data can be increased. However, of course, the correlation among RGB values may be taken.

Further, it is desirable that the compression rates of the bit plane compressors for the pixels within one area are all set to the same. However, for raising the total compression rate possibly higher, different compression rates among the pixels within one area can be employed. For instance, when one area includes 4 pixels, a two-bit compression is applied to two pixels and a one-bit compression is applied to the other pixels.

In the above-described method, data capacity can be reduced and memory capacity and transmission capacity can be reduced by using the following devices, methods and programs.

Firstly, in an image processing device, image data is compressed by using the aforementioned method before stored into a memory, and compressed image data read out of the memory is decompressed to reproduce a high quality image even when the memory capacity is reduced. At this time, for the image compression processing and the image decompression processing, various devices, programs and methods for carrying out the processing can be selected. Moreover, the image compression processing can be conducted by an image compression program and the image decompression processing can be executed by an image decompression device. In this manner, various modifications of the image processing device include image processing methods, image processing programs, image compression devices for carrying out only the image compression processing, image compression methods, image compression programs, image decompression devices for implementing only the image decompression processing, image decompression methods and image decompression programs.

Secondly, in an image transmission device, the image data is compressed by the above-described method before transmitted via a transmission path, and after the compressed image data is transmitted, the compressed image data is decompressed to reproduce the high quality image even when the image data is transmitted via a transmission path with a limited width or capacity. At this time, for the image transmission processing and the image receiving processing, various devices, programs and methods for carrying out the processing can be selected. For example, the image transmission processing can be performed by an image transmitter and the image receiving processing can be conducted by an image receiving program. Further, the image transmission processing can be implemented by an image transmission program and the image receiving processing can be executed by an image receiving device. In this way, various modification of the image transmission device include image transmission methods, image transmission programs, image transmission devices for carrying out only the image transmission processing, image sending methods, image sending programs, image receiving devices for executing only the image receiving processing, image receiving methods and image receiving programs.

Thirdly, in a display, the image data is compressed by using the above-described method before stored into a memory, and the compressed image data read out of the memory is decompressed to reproduce the high quality image on the display even when the memory capacity is reduced.

Now, the preferred embodiments of the present invention will be described in detail.

Figure 6:
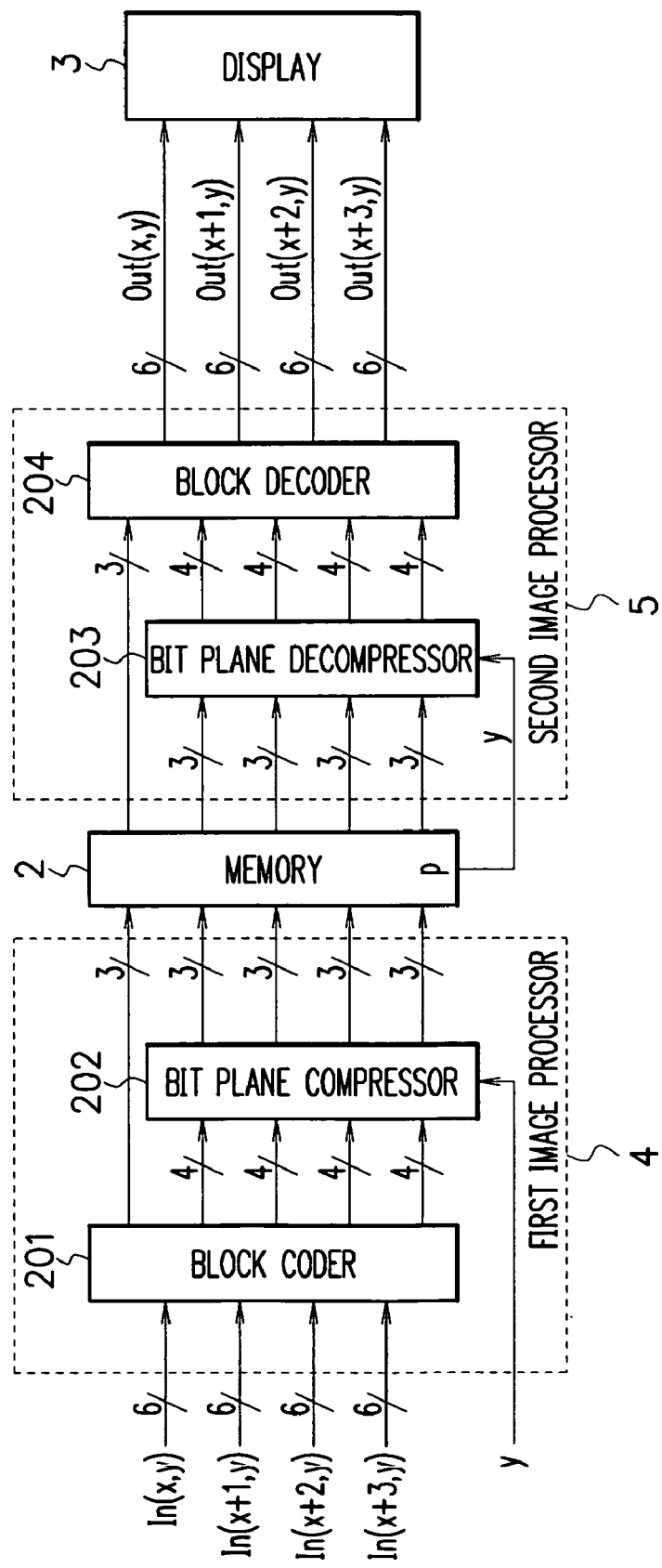
FIG. 6 is a schematic block diagram of an image processing device according to a first embodiment.

A first embodiment of the present invention will be described in detail with reference to FIG. 6 to FIG. 13. In FIG. 6, there is shown an image processing device according to the first embodiment of the present invention, that is, a concrete device for implementing an image processing on the basis of a process shown in FIG. 2.

In this embodiment, input data of a raster image sent out of a computer is divided into a plurality of areas, one area composed of 4 pixels. The input image data per one area is 4 pixels×6 bits=24 bits. The input data is first processed in a first image processor 4 and thereafter is stored in a memory 2 as a raster image of 15 bits per one area. The raster image of 15 bits read out of the memory 2 is converted into 6 bits data per pixel in a second image processor 5 to output the converted 6 bits data to an image display 3 for displaying the raster image.

In FIG. 6, one of the RGB colors is processed in this image processing device. In fact, three image processing devices having the same construction are required in parallel for processing the image data of the three RGB colors, and in this embodiment, only one image processing device is shown and described for brevity. The other preferred embodiments of the present invention will be shown and described hereinafter in the same manner.

Concerning an area determination, when the number of pixels per one area is small, a compression rate of compressing by a block coding does not go up and it is desirable that one area includes at least 3 pixels. In this case, one area includes 4 pixels. There is no limitation in partitioning the areas. For instance, one area can be optionally partitioned by 4 pixels×1 pixel or 2 pixels×2 pixels in X-axis direction (main-scanning direction of an image)×Y-axis direction (sub-scanning direction of the same). In the present invention, considering that two-dimensional data is rearranged in one-dimensional manner for the raster image, one area is partitioned by 4 pixels×1 pixel. However, since it is preferable that the pixels are not separately located, if possible, one area of 2 pixels×2 pixels can be also used.

In this embodiment, assuming that x is a value in the X-axis direction and y is a value in the Y-axis direction of an image, an input image is input as input image data of In(x, y), In(x+1, y), In(x+2, y) and In(x+3, y). In this case, in order to avoid inputting the same data two times or more, the value of x is determined to be multiples of 4 (multiples of a pixel number in the X-axis direction within the area). Similarly, output image data is expressed by Out(x, y) Out(x+1, y), Out(x+2, y) and Out(x+3, y). Further, when the area of 2 pixels×2 pixels is employed, the image data is input similarly as In(x, y), In(x+1, y), In(x, y+1) and In(x+1, y+1) and the values of x and y are determined to be multiples of 2 (multiples of the number of pixels in the X-axis and Y-axis directions within the area). Similarly, the output data is Out(x, y), Out(x+1, y), Out(x, y+1) and Out(x+1, y+1).

In FIG. 6, the first image processor 4 includes a block coder 201 and a bit plane compressor 202. In the block coder 201, the image data of 4 pixels is input and one representative value data of 3 bits and four difference data of 4 bits are produced. In the bit plane compressor 202, the four difference data of 4 pixels and a Y-coordinate value y are input and a compression of the four difference data is processed to output compressed difference data of 3 bits for each pixel.

In the memory 2, the representative value data of 3 bits and the four compressed difference data of 3 bits are stored.

The second image processor 5 includes a bit plane decompressor 203 and a block decoder 204. In the bit plane decompressor 203, the four compressed difference data of 3 bits and the Y-coordinate value y are input from the memory 2 and a decompression of the four compressed difference data is implemented to output four output difference data of 4 bits. In the block decoder 204, the representative value data of 3 bits and the four output difference data of 4 bits for 4 pixels are input from the memory 2 and the bit plane decompressor 203, respectively, and the four output difference data is decoded to output four output image data of 6 bits to the image display 3.

In this embodiment, the image processing will be more specifically described in connection with FIG. 6 to FIG. 13.

Figure 7:
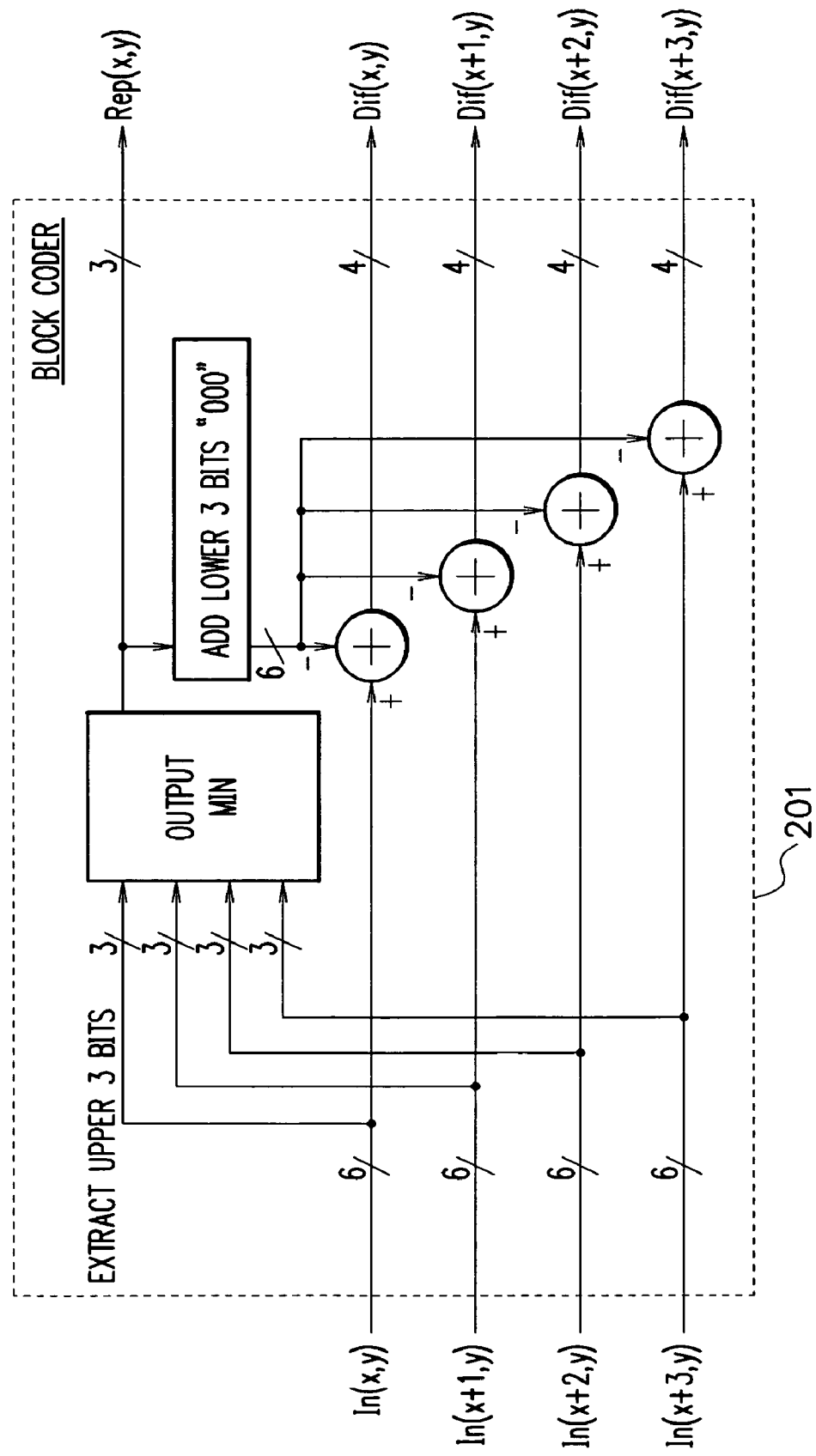
FIG. 7 is a schematic block diagram of one embodiment of a block coder shown in FIG. 6.

As shown in FIG. 6, the image data of 4 pixels is input to the block coder 201 of the first image processor 4. In FIG. 7, there is shown one embodiment of the block coder 201 shown in FIG. 6. Suppose that the representative value data Rep(x, y) is the minimum value of the upper 3 bits of the four input image data In(x, y), In(x+1, y), In(x+2, y) and In(x+3, y) for 4 pixels. Since the difference data Dif is a difference value between each input image data In and the representative value data Rep, the difference data is obtained by an equation Dif=In−(Rep & "000"). In this case, "&" shows a bit coupling and in order to perform an operation for adjusting the bit number to the input image data In of 6 bits, the lower 3 bits of "000" is added to the lower end of the representative value data Rep. As described above, the representative value data and the difference data can be obtained.

When the four image data In(x, y)=011101 (binary code=29 in a decimal number), In(x+1, y)=011110, In(x+2, y)=011111 and In(x+3, y)=100000 is input, the representative value data Rep(x, y) becomes the minimum value 011 of the upper 3 bits of the four image data and the difference data Dif(x, y)=In(x, y)−(Rep(x, y) & 000)=011101−011000=0101. Similarly, Dif(x+1, y)=0110, Dif(x+2, y)=0111 and Dif(x+3, y)=1000 are obtained.

Figure 8:
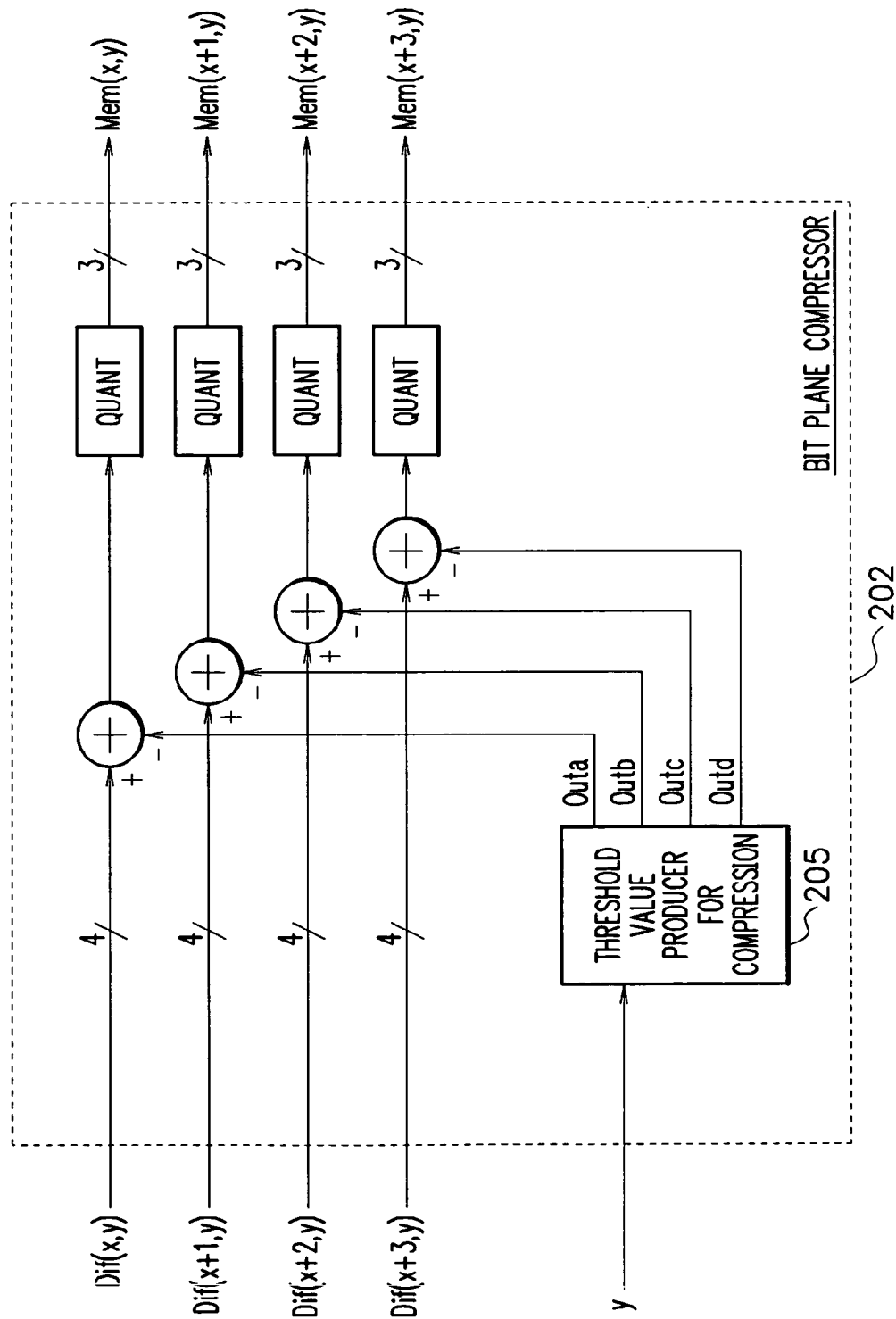
FIG. 8 is a schematic block diagram of one embodiment of a bit plane compressor shown in FIG. 6.

FIG. 8 shows one embodiment of the bit plane compressor 202 shown in FIG. 6. The bit plane compressor 202 includes a threshold value producer 205 for compression, four subtracters and four quantizers. The threshold value producer 205 receives the Y-coordinate value y of a pixel of the difference values and produces threshold values for the four subtracters on the basis of the Y-coordinate value y to output signals Outa, Outb, Outc and Outd to the respective subtracters. Each quantizer removes the lower 1 bit from the input data of 4 bits to output only the upper 3 bits.

FIG. 9 shows a threshold value table for compression, that is, input and output values of the threshold value producer 205. In FIG. 9, [y mod 2] shows the remainder obtained by dividing y by 2. The threshold value producer 205 produces the output values from the result of [y mod 2]. Although threshold values are calculated by using not only a Y-coordinate value y but also an X-coordinate value x of pixels in patent document 1, in the image processing device of this embodiment, when the area of 4 pixels×1 pixel is used, a value obtained by dividing x by 4 is 0 to In(x, y), 1 to In(x+1, y), 2 to In(x+2, y) and 3 to In(x+3, y), that is, always the same values and hence there is no need to input the value x. When

[y mod 2]=0 (this embodiment will be described hereinafter under this condition), Outa=−1, Outb=0, Outc=−1 and Outd=0 are resulted.

Return to the operation in the bit plane compressor 202. The output value of the threshold value producer 205 is subtracted from the difference data Dif and the subtracted difference data is quantized by the quantizer. For example, when Dif(x, y)=0101 and Outa=−1, Dif(x, y)−Outa=0110. This data of 4 bits is quantized into data of 3 bits (remove the lower 1 bit) to obtain compressed difference data as memory data Mem(x, y)=011. Similarly, Mem(x+1, y)=011, Mem(x+2, y)=100 and Mem(x+3, y)=100 are obtained.

The memory 2 stores the arithmetic results in the first image processor 4, that is, Rep(x, y)=011, Mem(x, y)=011, Mem(x+1, y)=011, Mem(x+2, y)=100 and Mem(x+3, y)=100, which is the sum of 15 bits.

The image data stored in the memory 2 is to be converted to the data of 6 bits for each pixel in the second image processor 5. The difference data read out of the memory 2 is input to the bit plane decompressor 203 in the second image processor 5.

Figure 10:
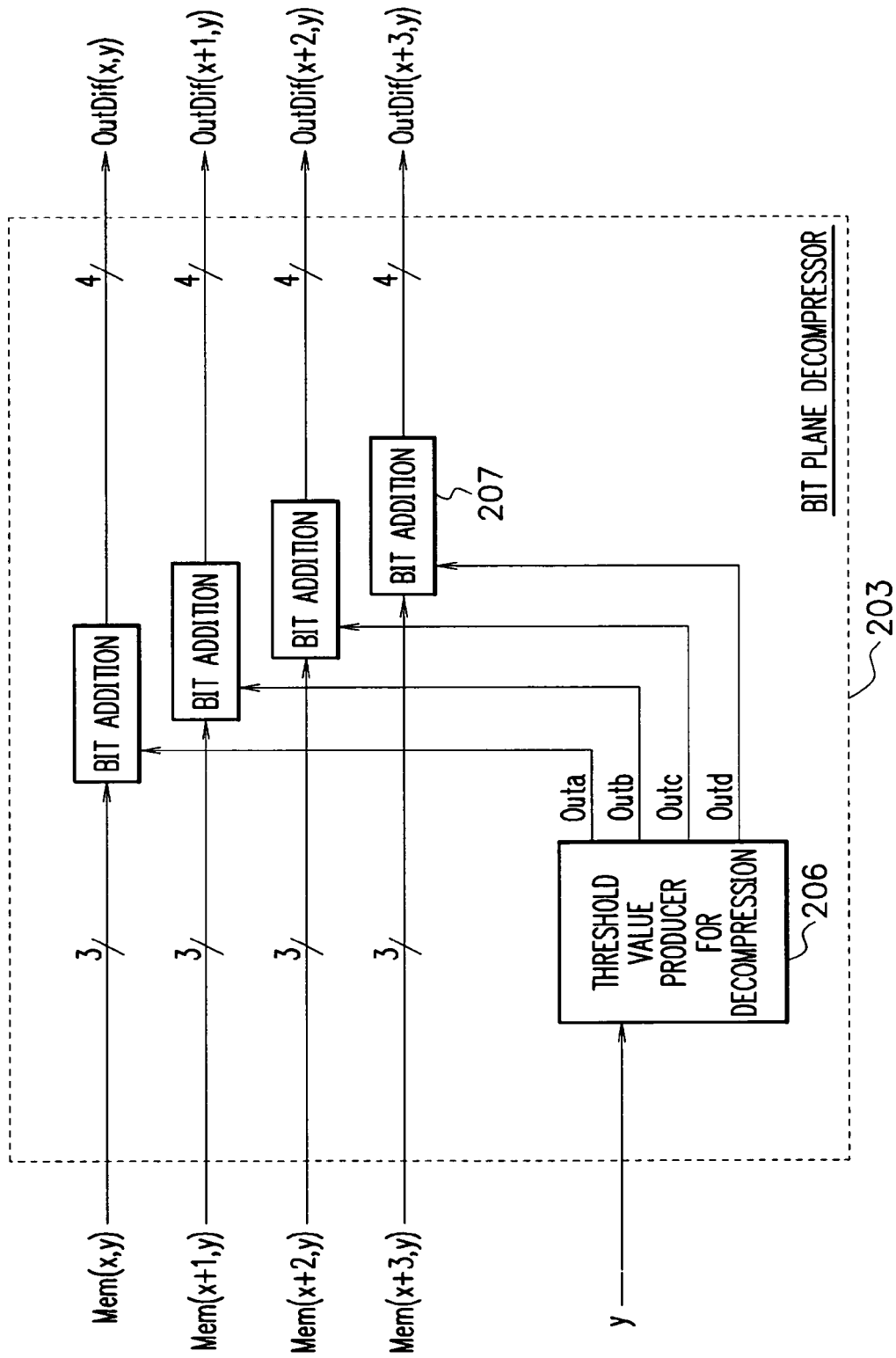
FIG. 10 is a schematic block diagram of one embodiment of a bit plane decompressor shown in FIG. 6.

FIG. 10 shows one embodiment of the bit plane decompressor 203 shown in FIG. 6. The bit plane decompressor 203 includes a threshold value producer 206 for decompression and four bit adders 207. The threshold value producer 206 inputs the Y-coordinate y of the difference values for the pixels and produces threshold values for the four bit adders 207 on the basis of the Y-coordinate value y. As shown in FIG. 9, from a threshold value table for decompression, [y mod 2] is 0 and four output values become Outa=0, Outb=1, Outc=0 and Outd=1. These values are the values of the threshold value producer 205 for compression +1 and it can be seen that an offset is added to reduce an average of differences between the output of the bit plane decompressor 203 and the input of the bit plate compressor 202 as small as possible.

On the other hand, it is found that, when [y mod 2] is 1, the output values of the threshold value producer 206 for decompression are the same as those of the threshold value producer 205 for compression.

Return to the operation of the bit plane decompressor 203. In FIG. 10, each bit adder 207 adds the 1 bit data fed from the threshold value producer 206 as the lower 1 bit to the compressed difference data of the upper 3 bits, output from the memory 2, to send the decompressed output difference data of 4 bits to the block decoder 204. FIG. 11a depicts a first embodiment of the bit adder 207 shown in FIG. 10. With the use of this bit adder 207, when [y mod 2]=0, each bit adder 207 inputs the compressed difference data Mem(x, y)=011, Mem(x+1, y)=011, Mem(x+2, y)=100 or Mem(x+3, y)=100 and sends out the respective output difference data Outdif(x, y)=0110, Outdif(x+1, y)=0111, Outdif(x+2, y)=1000 or Outdif(x+3, y)=1001.

FIG. 11b illustrates a second embodiment of the bit adder 207 shown in FIG. 10. In this case, a correction processing is performed, that is, in the same manner as the block coder 201, the representative value data is added to the compressed difference data while the orders are shifted, and, when the result is all 0 or 1, the LSB (least significant bit) value is set to 0 or 1, respectively. As a result, black float and white sink can be effectively prevented in the bit adders 207.

When the second embodiment of the bit adder 207 shown in FIG. 11b is employed, as shown in FIG. 12 depicting an image processing device similar to that shown in FIG. 6, the representative value data read out of the memory 2 is fed to the bit plane decompressor 203.

The representative value data read out of the memory 2 and the output difference data sent from the bit plane decompressor 203 are input to the block decoder 204. In FIG. 13, there is shown one embodiment of the block decoder 204 shown in FIG. 6. In the block decoder 204, the lower 3 bits of "000" are added to the lower end of the representative value data and the resulted representative value data is added to each output difference data to obtain output image data of 6 bits Out(x, y)=011000+0110=011110, Out(x+1, y)=011111, Out(x+2, y)=100000 or Out(x+3, y)=100001.

In this embodiment, each error of the input and the output of the image processing is within 1. On the other hand, it is sufficient that the error of the whole screen is reduced to at most 1 as an absolute value by adding the offset. When 2 bits compression is executed in the bit plane compressor 202, the maximum error becomes approximately twice.

In this embodiment, as described above, by combining the bit plane compression and the block coding, the compression rate of the irreversible coding can be lowered to minimize the occurrence of the errors. Moreover, the influence to the image quality by the bit plane compression can be minimized to prevent the granular quality deterioration. As a result, the granular quality deterioration in the mild gradation image area and the plain gradation image area can be largely reduced.

In the image processing device according to this embodiment, as described above, the influence to the image quality can be minimized and a chip area reduction and a power consumption reduction can be effectively achieved.

Figure 14:
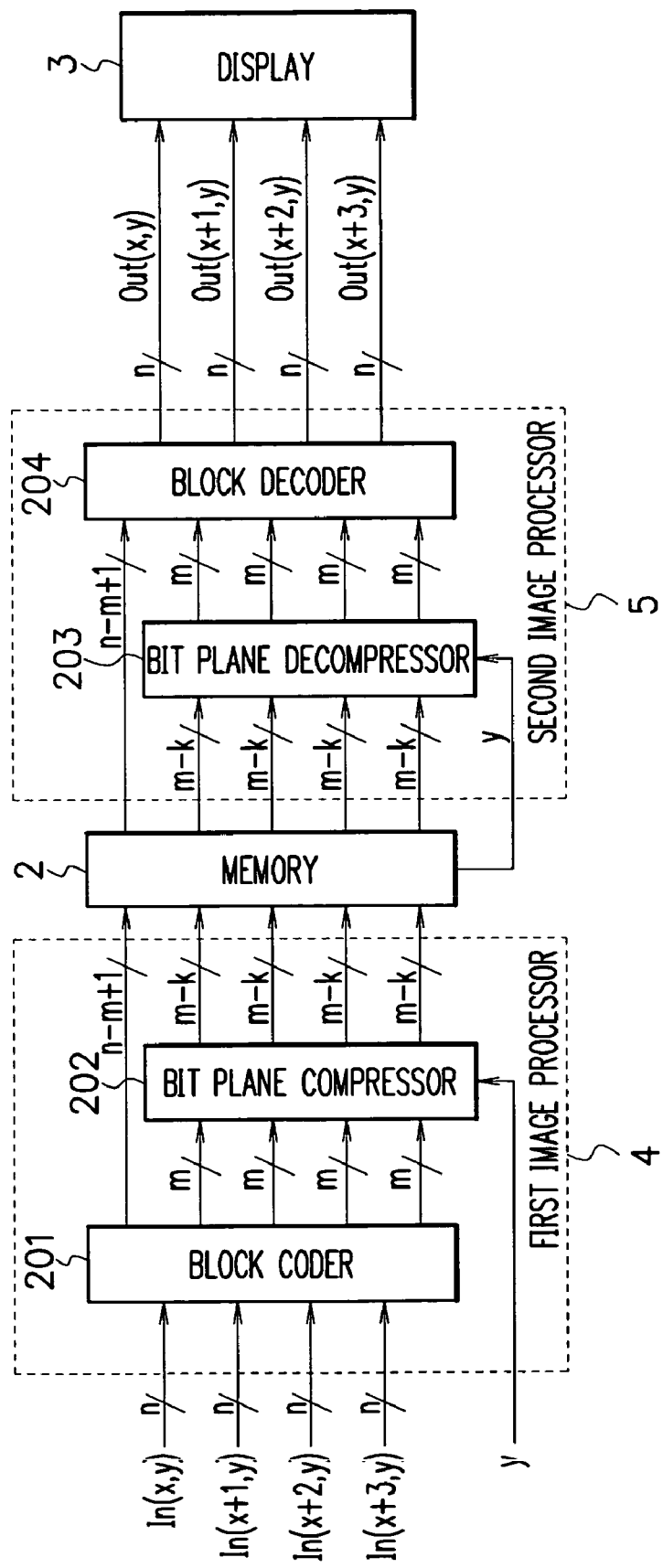
FIG. 14 is a schematic block diagram of an image processing device according to a second embodiment.

A second embodiment of the present invention will be described in detail with reference to FIG. 14. In FIG. 14, there is shown an image processing device according to the second embodiment of the present invention. In this embodiment, a construction of the image processing device is nearly the same as that of the first embodiment shown in FIG. 6, except that a bit number n of input and output image data, a bit number m of difference data and a reduction bit number k of the difference data in a bit plane compressor are variables. That is, in this embodiment, compression rates in a block coder 201 and a bit plane compressor 202 can be optionally determined.

The relationship among the variables is n>m>0 and k>0. In this case, these variables can be optionally determined depending on features of input images and necessary compression rates. For example, when a reversible compression rate of image data of an input image in the block coder 201 is low, a compression rate of the image data in the bit plane compressor 202 can be properly raised. Further, the operation in a first image processor 4 and a second image processor 5 can be properly changed depending on the bit number n of the input and output image data.

In this embodiment, as described above, the first and second processors are constructed to optionally determine the compression rates in the block coding and the bit plane compression and hence to cover a large number of various kinds of images.

Figure 15:
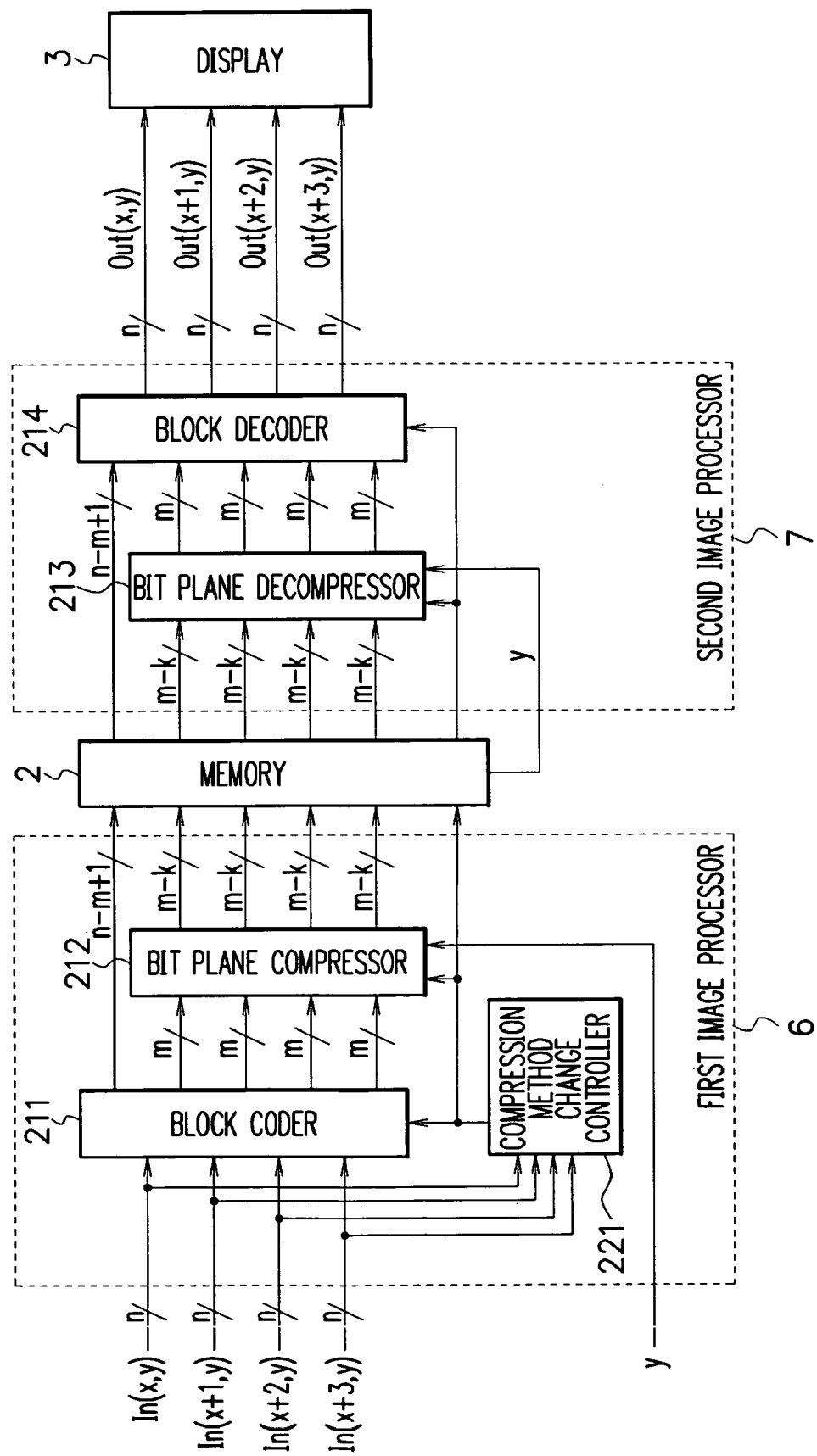
FIG. 15 is a schematic block diagram of an image processing device according to a third embodiment.
Figure 17:
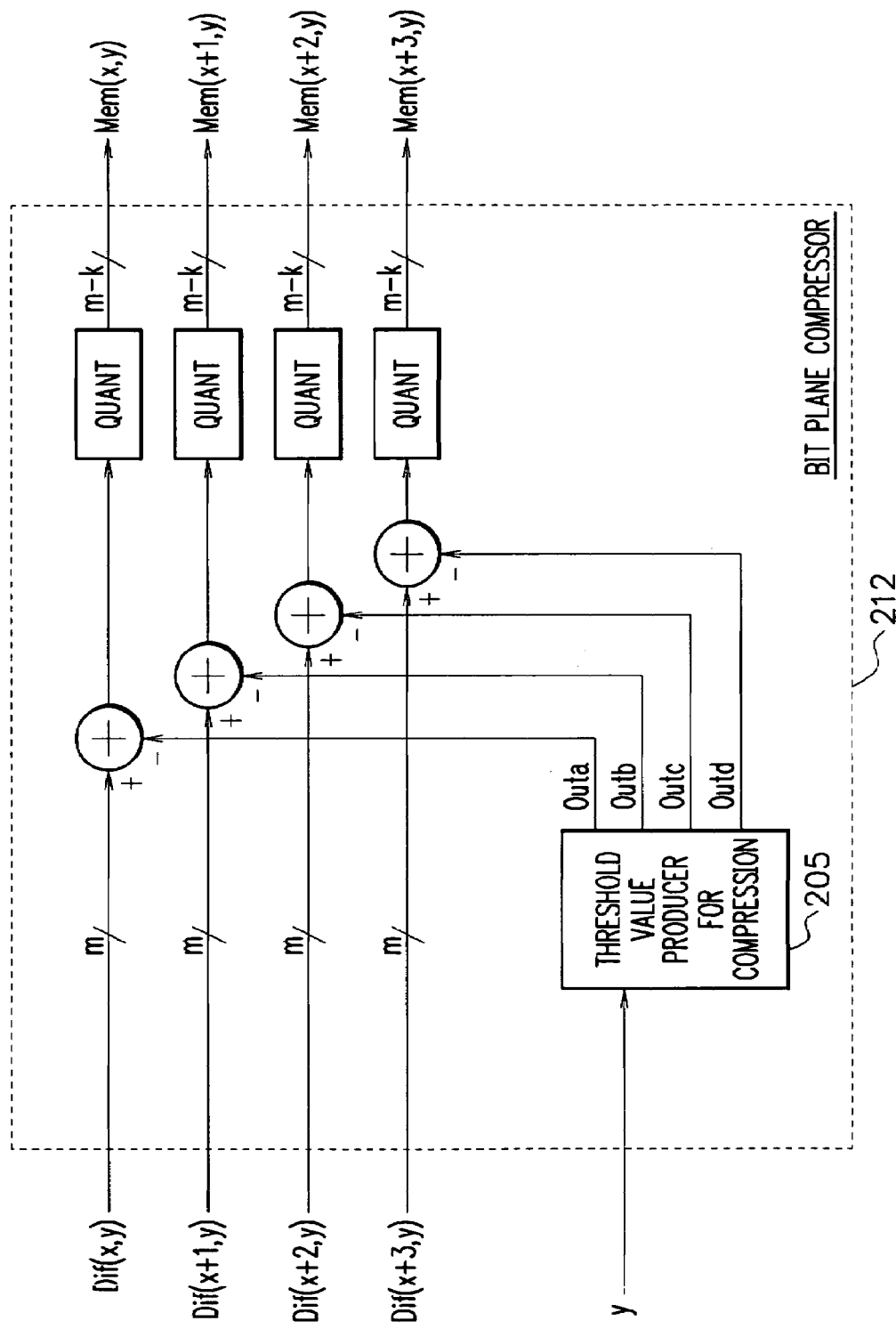
FIG. 17 is a schematic block diagram of one embodiment of a bit plane compressor shown in FIG. 15.
Figure 18:
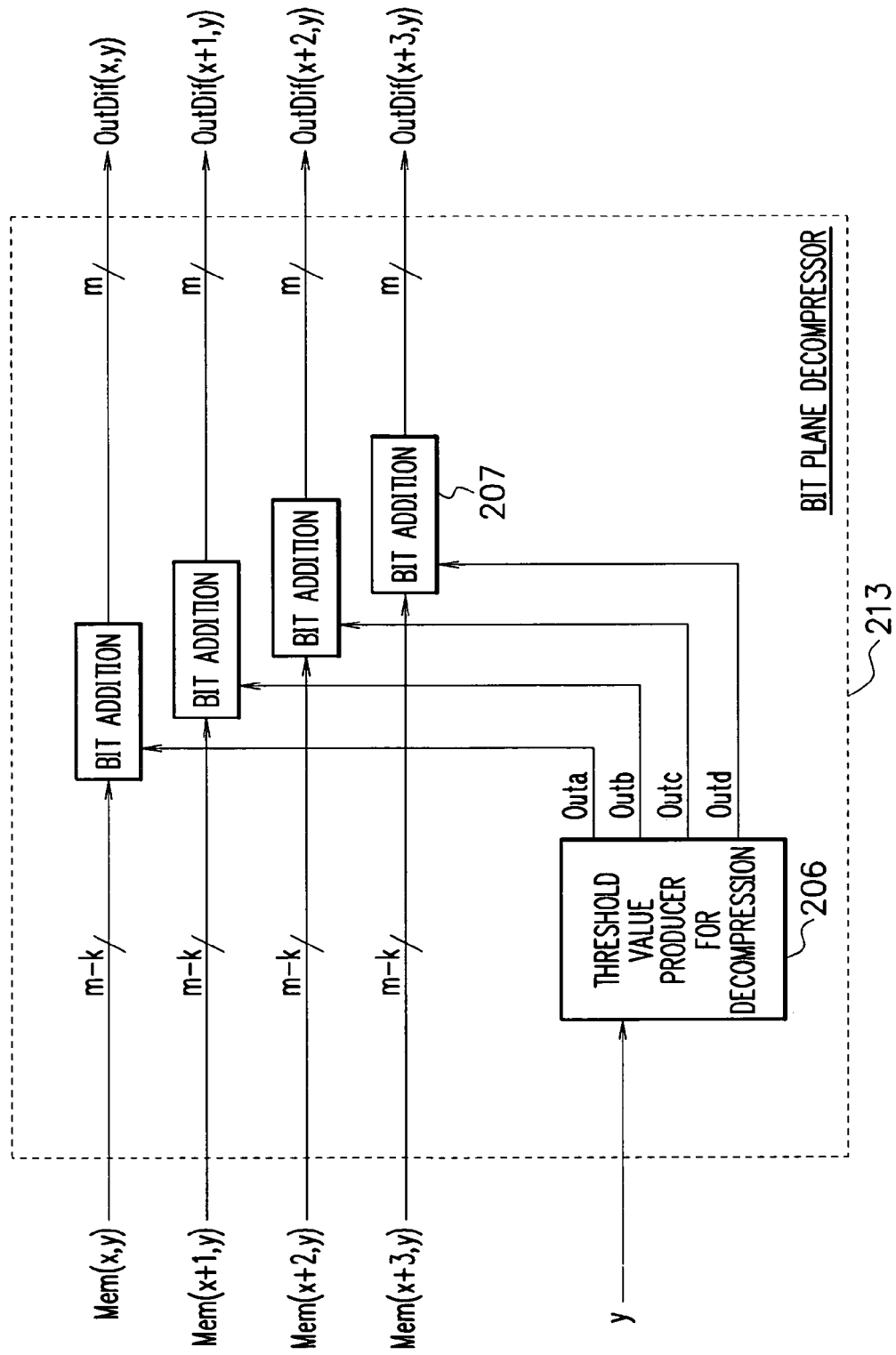
FIG. 18 is a schematic block diagram of one embodiment of a bit plane decompressor shown in FIG. 15.

A third embodiment of the present invention will be described in detail with reference to FIG. 15 to FIG. 22. In FIG. 15, there is shown an image processing device according to the third embodiment of the present invention. In this embodiment, compression rates in a block coder 211 and a bit plane compressor 212 are automatically changed depending on an input image.

As shown in FIG. 15, in the image processing device, input data of a raster image sent out of a computer is divided into a plurality of areas each having 4 pixels. The input image data per one area is 4 pixels×n bits=4n bits. The input data is first processed in a first image processor 6 and is then stored in a memory 2. The image data read out of the memory 2 is converted into n bits data in a second image processor 7 to output the converted n bits data to an image display 3.

In this embodiment, different from the second embodiment shown in FIG. 14, the first image processor 6 further includes a compression method change controller 221, which receives image data, for determining a bit number m of difference data and a reduction bit number k of the difference data in the bit plane compressor 212 and for changing data bit numbers effective for operations in the block coder 211, the bit plane compressor 212, a bit plane decomressor 213 and a block decoder 214 depending on the determined bit number m and reduction bit number k.

An operation of the image processing device according to this embodiment will be described in detail. In this embodiment, the block coder 211 shown in FIG. 16, the bit plane compressor 212 shown in FIG. 17, the bit plane decompressor 213 shown in FIG. 18 and the block decoder 214 shown in FIG. 19 are operated in a similar manner to those of the first embodiment described above except that their effective data bit numbers are variable and hence the detailed description of their operations can be omitted for brevity.

Figure 20:
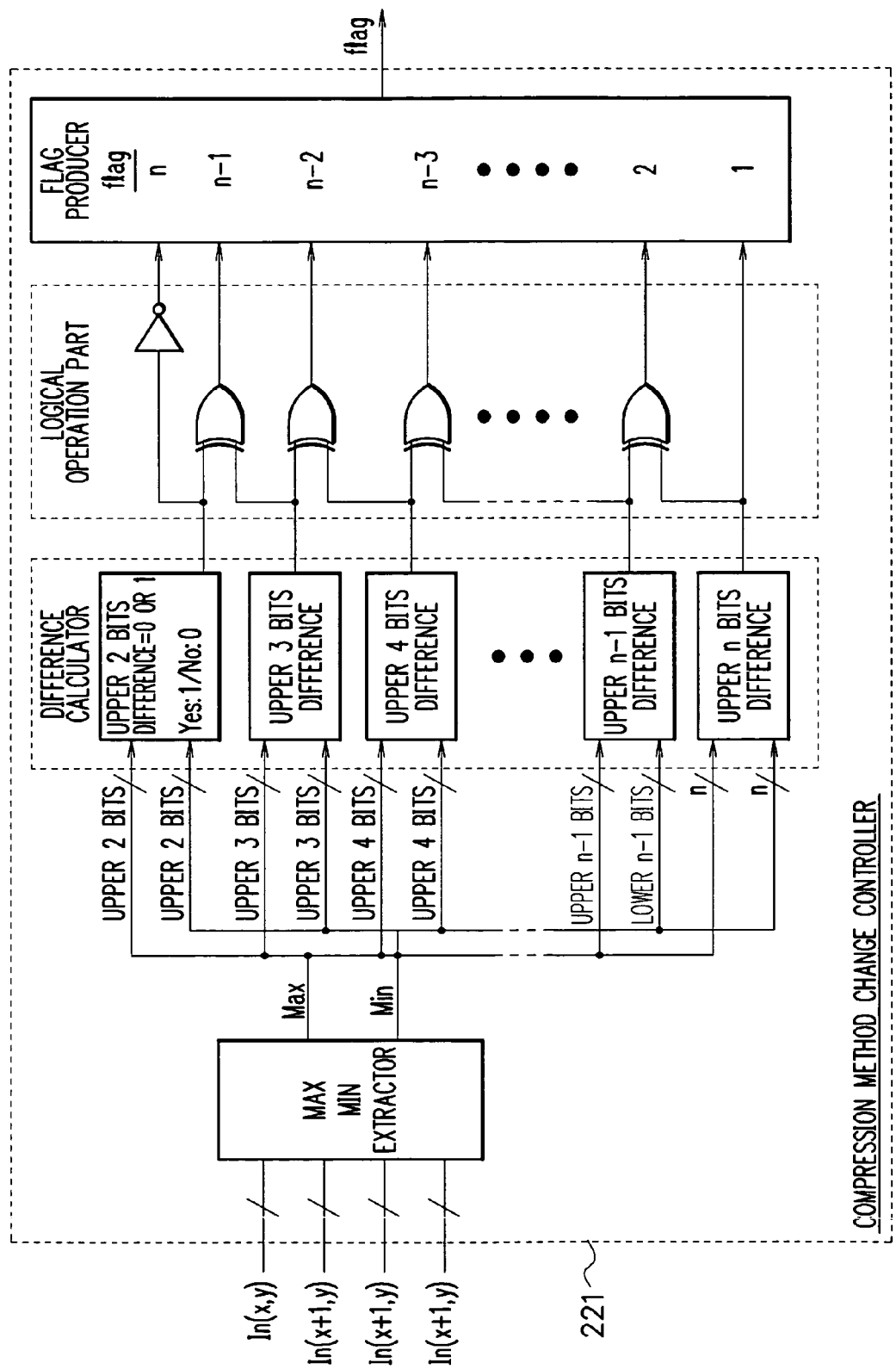
FIG. 20 is a schematic block diagram of a compression method change controller shown in FIG. 15.

FIG. 20 shows one embodiment of the compression method change controller 221 shown in FIG. 15. The compression method change controller 221 determines m under a maximum compression rate of the block coder 211, which is the minimum value of m. This is because by maximizing a compression rate of a reversible compression in the block coder 211, a compression rate in the bit plane compressor 212 is set as low as possible. When the bit number m of the difference data is determined, a reduction bit number k of the difference data in the bit plane compressor 212 can be decided from the necessary compression rate.

The compression method change controller 221 outputs flag values for identifying the values of the bit number m and the reduction bit number k. Hence, when the flag values are determined, the values of the bit number m and the reduction bit number k can be determined.

In FIG. 20, an arithmetic unit for operating the minimum value of the variable m includes a maximum and minimum value extractor, a difference calculator, a logical operation part and a flag producer.

First, the maximum value Max and the minimum value Min of the input image data within the area are extracted in the maximum and minimum value extractor. A difference between the upper p ($2 \leq p \leq n$) bits of the maximum and minimum values is calculated in the difference calculator. When the difference is "0" or "1", since the upper p bits can constitute representative value data, "1" is output as an output value based on this calculation result, otherwise "0" is output.

At this time, if the difference up to the upper 4 bits of the maximum and minimum values is "0" or "1", the difference becomes "0" or "1" when p is 2 or 3. Hence, when p is 2, 3, 4, 5, ..., n+1 or n, the output value becomes 1, 1, 1, 0, ..., 0 or 0, respectively. In the logical operation part, when XORs of respective two adjacent data of the output value sequence and an inverted output of the upper 2-bit difference output value are operated, input values fed to the flag producer become 0, 0, 0, 1, 0, ..., 0, 0, and one of the input values is "1". In this case, when a difference between the upper s bits of the maximum and minimum values of the input image data becomes "0" or "1", "1" is output from the signal line corresponding to the maximum value of the upper bit number s. For instance, when a difference between up to the upper 4 bits of the maximum and minimum values of the input image data is "0" or "1", and a difference between at least the upper 5 bits of the same becomes neither "0" nor "1", "1" is output to the signal line corresponding to 4 among 1 to n signal lines from the logical operation part. In this instance, when a difference between the upper 2 bits of the maximum and minimum values of the input image data becomes neither "0" nor "1", "1" is output from the signal line corresponding to "1" in the logical operation part.

The flag producer includes n flag values corresponding to the n signal lines in the logical operation part. Each flag value is obtained by subtracting the value which is obtained by subtracting "1" from the value corresponding to the signal line of the logical operation part, from "n" (in other words, a value obtained by subtracting the value corresponding to the signal line of the logical operation part from "n+1"). The flag producer outputs the flag value corresponding to the signal line which "1" is input to, as a flag.

For example, it is assumed that, when n=6, the maximum and minimum values of the input image data are 101100 and 100011, respectively. In this case, a difference between the upper 3 bits of the maximum and minimum values is 101−100=001 and hence the output value is 1. A difference between the upper 4 bits of the maximum and minimum values is 1011−1000=0011 and the output value is 0. Hence, it is readily understood that an output value obtained from the upper 2 bits to a difference between the upper 6 bits of the maximum and minimum values become 1, 1, 0, 0, 0. With respect to this signal, an output of the logical operation part is 0, 0, 1, 0, 0, 0 and with this input data, an output flag value is 6−2=4 (100 in binary code). This flag value is equal to m. Since the upper 3 bits can constitute the representative value data, the above-described result is calculated by substituting n=6 into an equation n−m+1=3 to obtain m=4 and this value is equal to the flag value.

When the bit number m of the difference data is obtained, a reduction bit number k of the difference data is to be calculated by using a compression rate c and a bit number n of input image data. FIG. 21a illustrates the relationship among a flag output from the flag producer, a bit number m of difference data and a reduction bit number k of the difference data. In the case of one area including image data of 4 pixels, assuming that the desired compression rate is c, when a total data amount of 4 pixels after compression, representative value data and a flag is smaller than a data amount of original 4 pixels×(1−c), the desired compression rate can be achieved. Therefore, from FIG. 15, it is sufficient to satisfy the following inequality.

$$4(1-c)n > 4(m-k)+(n-m+1)$$

This inequality is solved in terms of k as follows.

$$k > (c-\tfrac{3}{4})n + 3m/4 + \tfrac{1}{4}$$

In this case, when n=m, that is, no block coding is executed, no representative value data is required and the inequality is rewritten as follows.

$$4(1-c)n > 4(m-k)$$

As a result, the inequality is expressed as follows.

$$k > cn$$

In this manner, a table shown in FIG. 21a is obtained.

In the aforementioned operation, when the compression rate is set to c=⅓, a table shown in FIG. 21b can be obtained. In this case, since m=4, by setting k=1, the data amount stored in the memory is calculated as follows.

$$4(m-k)+(n-m+1)=4 \times 3+3=15<16=(1-\tfrac{1}{3}) \times 24$$

It is readily understood that the desired compression rate can be achieved. In this instance, in fact, a memory for storing the data of the flag is required and it is necessary to consider the data of the flag for determining the total compression rate.

Moreover, in the case where when n=6, the maximum and minimum values of the input image data are 111111 and 000000, respectively, since m=6, by setting k=2, the data amount becomes 4×(m−k)=16 and the desired compression rate can be performed.

In this embodiment, as to the block coder 211, the bit plane compressor 212, the bit plane decompressor 213 and the block decoder 214, a threshold value producer 205 for compression and a threshold value producer 206 for decompression are different from those of the first and the second embodiments described above. In this embodiment the threshold values can be properly changed depending on k. In the case of k=1, the threshold values are shown in FIG. 9. In the case of k=2 and k=3, threshold values are shown in FIG. 22. From FIG. 22, it is readily understood that the maximum values of the threshold values for compression and decompression become $2^k$. The threshold values can be properly produced on the basis of the values described in the first embodiment and the values of the prior art and hence the detailed description thereof can be omitted for brevity.

In this embodiment, as described above, even in a steep gradation change image area where it is difficult to execute a reversible compression by a block coding, the data compression can be carried out in the first image processor without problems and hence the image processing of any image can be performed without causing any failure.

On the other hand, in the mild gradation image area and the plain gradation image area, the influence to the image quality by the bit plane compression can be minimized to prevent the granular quality deterioration. As a result, the granular quality deterioration in the mild gradation image area and the plain gradation image area can be largely improved.

In the image processing device according to this embodiment, as described above, the influence to the image quality can be minimized and the chip area reduction and the power consumption reduction can be effectively achieved.

In this embodiment, while n is defined as the maximum number of combinations of m and k, for reducing a circuit scale and the bit number of the flag output from the compression method change controller 221, the number of combinations of m and k may be reduced less than n. In such a case, at least values of m preferably include n. That is the reason why even in the steep gradation change image area in which it is difficult to carry out the reversible compression by the block coding, the data compression can be performed in the first image processor without problems.

Furthermore, for the image data of a plurality of the subtractive colors such as the RGB, although the three colors are separately processed in the three image processing devices, since the data bit number of the flag cannot be reduced to be negligibly small, the flag can be used in common for the RGB of the same pixels. Since color mixing is caused among the RGB colors, when there is a steep gradation change of one color component within a certain area, it can be considered that granular quality deterioration of the other colors becomes not much noticeable.

A fourth embodiment of the present invention will be described in detail with reference to FIG. 23 to FIG. 25. Although the bit number m and the reduction bit number k of the difference data were changed by only the first image processor to meet a plurality of compression processes in the third embodiment described above, in this embodiment, a block coder or a bit plane compressor is arranged in parallel with a first image processor to obtain the same effects as those of the third embodiment.

Figure 23:
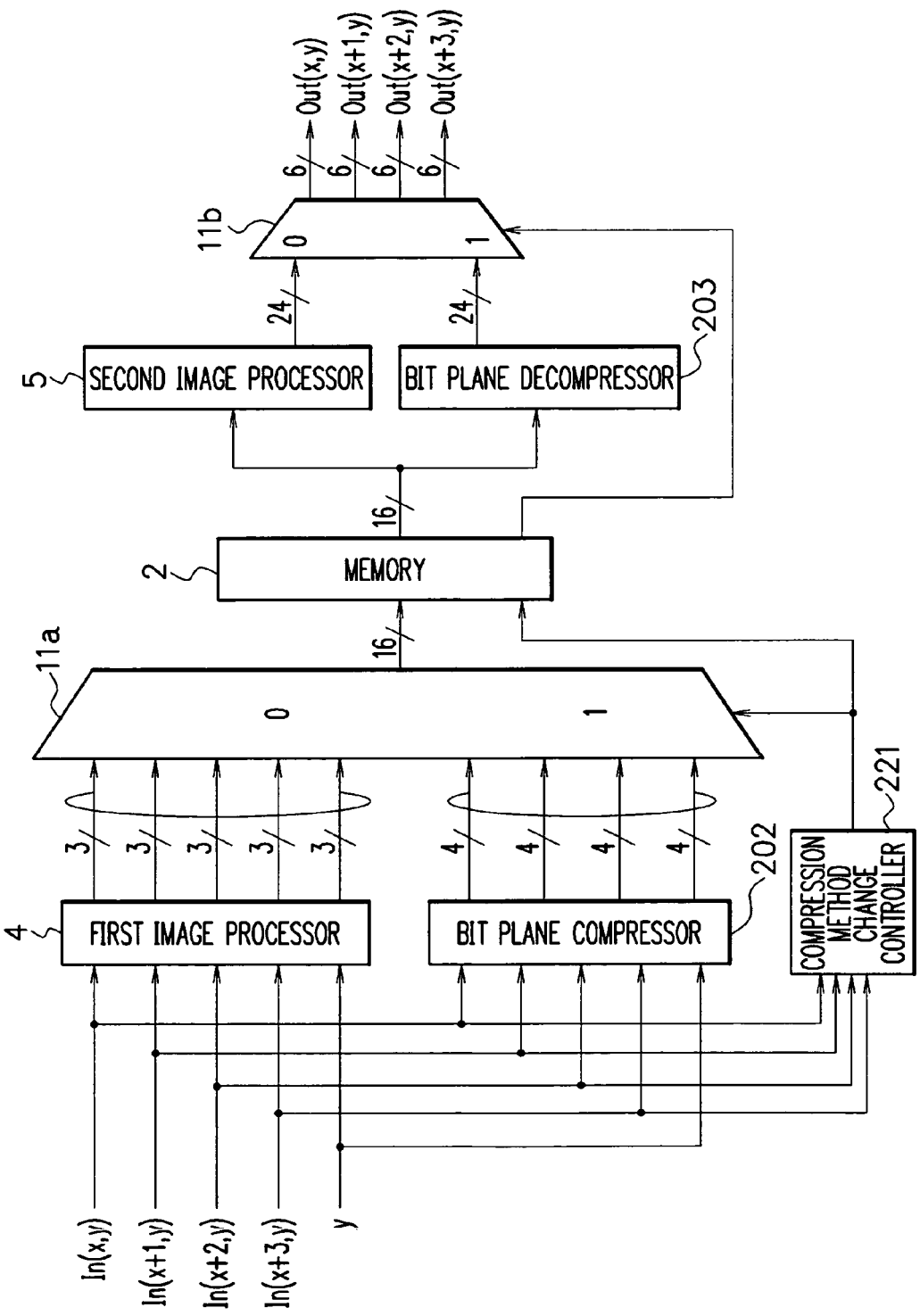
FIG. 23 is a schematic block diagram of an image processing device according to a fourth embodiment.

In FIG. 23, there is shown an image processing device according to the fourth embodiment of the present invention. In this embodiment, a first image processor 4 and a bit plane compressor 202 are arranged in parallel and output their respective data to a selector 11a. The selector 11a is controlled by an output value of a compression method change controller 221 to send the data of either the first image processor 4 or the bit plane compressor 202 to a memory 2 for storing the data. Further, a second image processor 5 and a bit plane decompressor 203 are arranged in parallel and output their respective data to a selector 11b. The selector 11b is controlled by an output value (a flag signal read out of the memory 2) as a selection signal of the compression method change controller 221 to output the data of either the second image processor 5 or the bit plane decompressor 203 as the output image data.

The compression method change controller 221 produces a control signal for selecting the processing of either the first image processor 4 or the bit plane compressor 202 by operating input image data. Since the bit plane compressor 202 does not execute a block coding, the compression method change controller 221 checks whether or not the first image processor 4 can carry out a data compression (a block coding), and outputs "0" when the result is Yes, or "1" when the result is No. In this construction shown in FIG. 23, since the block coding is implemented using representative value data of 3 bits in the first image processor 4, when a difference between the upper 3 bits of the maximum and minimum values of the input image data becomes "0" or "1", "1" is output, otherwise "0" is output. The selector 11a selects the data to be stored into the memory 2.

On the output image data side, the selector 11b outputs the output image data selected by the flag signal sent from the compression method change controller 221.

As described above, in this embodiment, the image compression and decompression of the input image can be performed in the same manner as the aforementioned third embodiment.

In FIG. 23, although the two kinds of compressor and decompressor are arranged in parallel with the first and second image processors respectively, the present invention is not restricted to this construction and at least two proper number of compressors and decomressors can be arranged in parallel.

Figure 24:
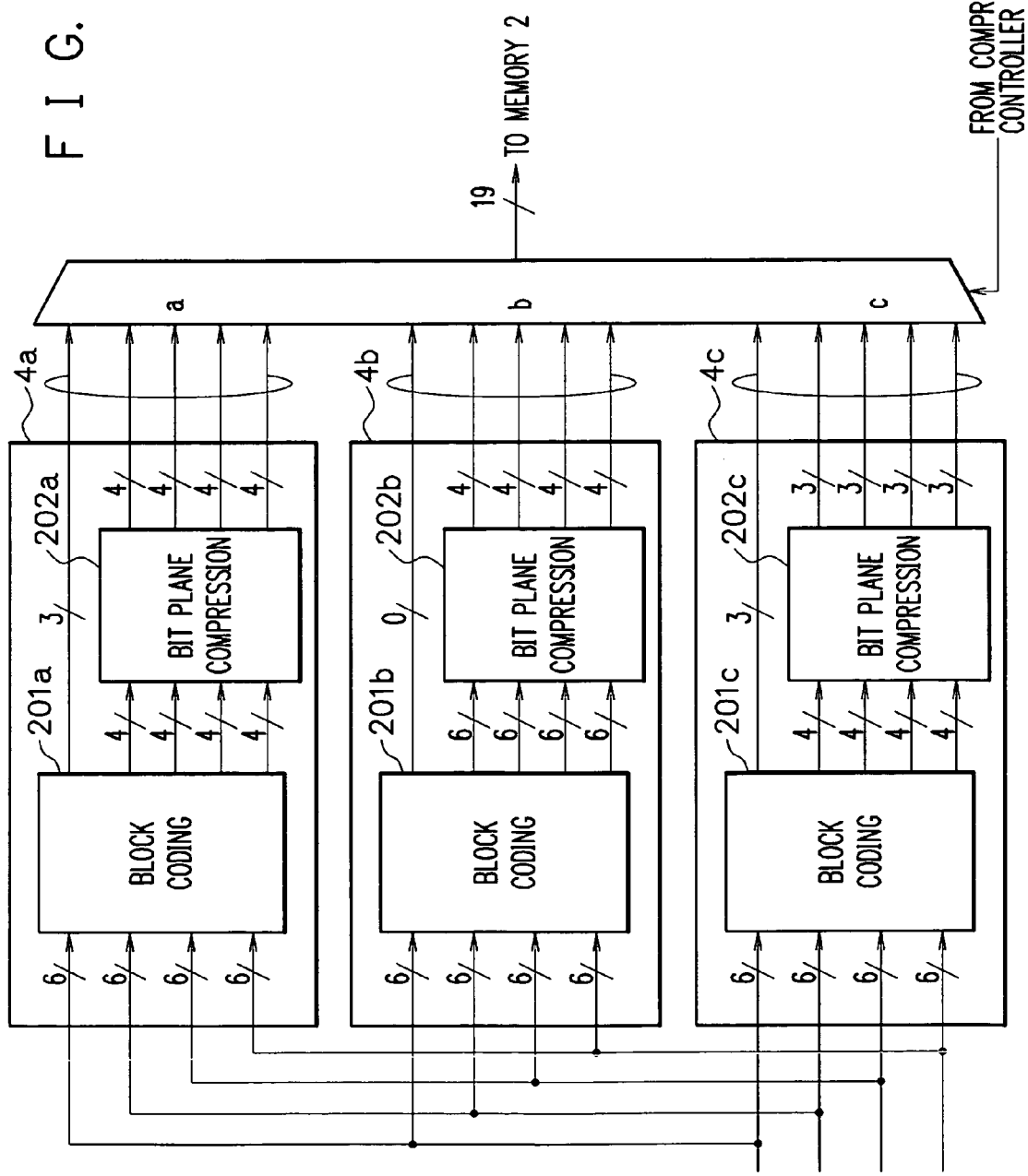
FIG. 24 is a schematic block diagram of one embodiment of three kinds of compression units arranged in parallel on the input side of the image processing device shown in FIG. 23.

One embodiment of this construction is shown in FIG. 24. In FIG. 24, there is shown three kinds of compression units 4a, 4b and 4c arranged in parallel on the input side of the image processing device. Each compression unit 4a, 4b or 4c includes a block coder 201a, 201b or 201c and a bit plane compressor 202a, 202b or 202c. In the first compression unit 4a, when a compression rate of the bit plane compressor 202a is set to 0, substantially only the block coder 201a works. In the second compression unit 4b, when a compression rate of the block coder 201b can be set to 0, substantially only the bit plane compressor 202b functions. For covering the case that the block coding cannot be executed, as described above, the first image processor with the compression rate 0 at the block coding (namely, a bit plane compressor) is an essential component.

In FIG. 24, although only the input side is shown, it is readily understood that the same number of unshown decompression units are arranged in parallel on the output side.

As described above, although the two kinds of compressor and decompressor are arranged in parallel with the first and second image processors, respectively, to carry out the proper image data compression and decompression of the input images, many compression and decompression units can be further arranged in parallel on the input and output sides to execute the more proper image data compression and decompression of the input images.

Hence, one of the image processing devices of the third embodiment and this fourth embodiment can be selected by considering the total conditions such as the purpose, the processing speed, the circuit scale, the memory capacity and the like.

Moreover, the image processing devices of the third and fourth embodiments are the same in their effects such as enabling it to conduct the proper image data compression and decompression of the input images and hence the parts of the third and fourth embodiments can be combined for constructing the image processing device. For example, the input image data is processed up to storing into the memory in the fourth embodiment and the image data read out of the memory is processed up to obtaining the output image data in the third embodiment. And vice versa.

Further, in order to obtain the effect such as optimizing the circuit scale and the bit number of the flag to be stored in the memory, the first and second image processors of the image processing device of the third embodiment can be arranged in parallel.

In addition, although the image data and the flag signal are stored into the memory 2 via the different transmission paths in this embodiment, the flag signal can be stored into the memory via the selector 11a. In this case, the bus width of the transmission paths from the selector 11a to the memory 2 and from the memory 2 to the bit plane decompressor 203 and the block decoder 204 is extended by the bit number of the flag signal.

Furthermore, in the case of a color image processing device for processing the image data of the RGB colors in parallel, one of the flag signals obtained in the different color areas corresponding to the same pixels can be used in common to further reduce the data amount stored in the memory.

Figure 25:
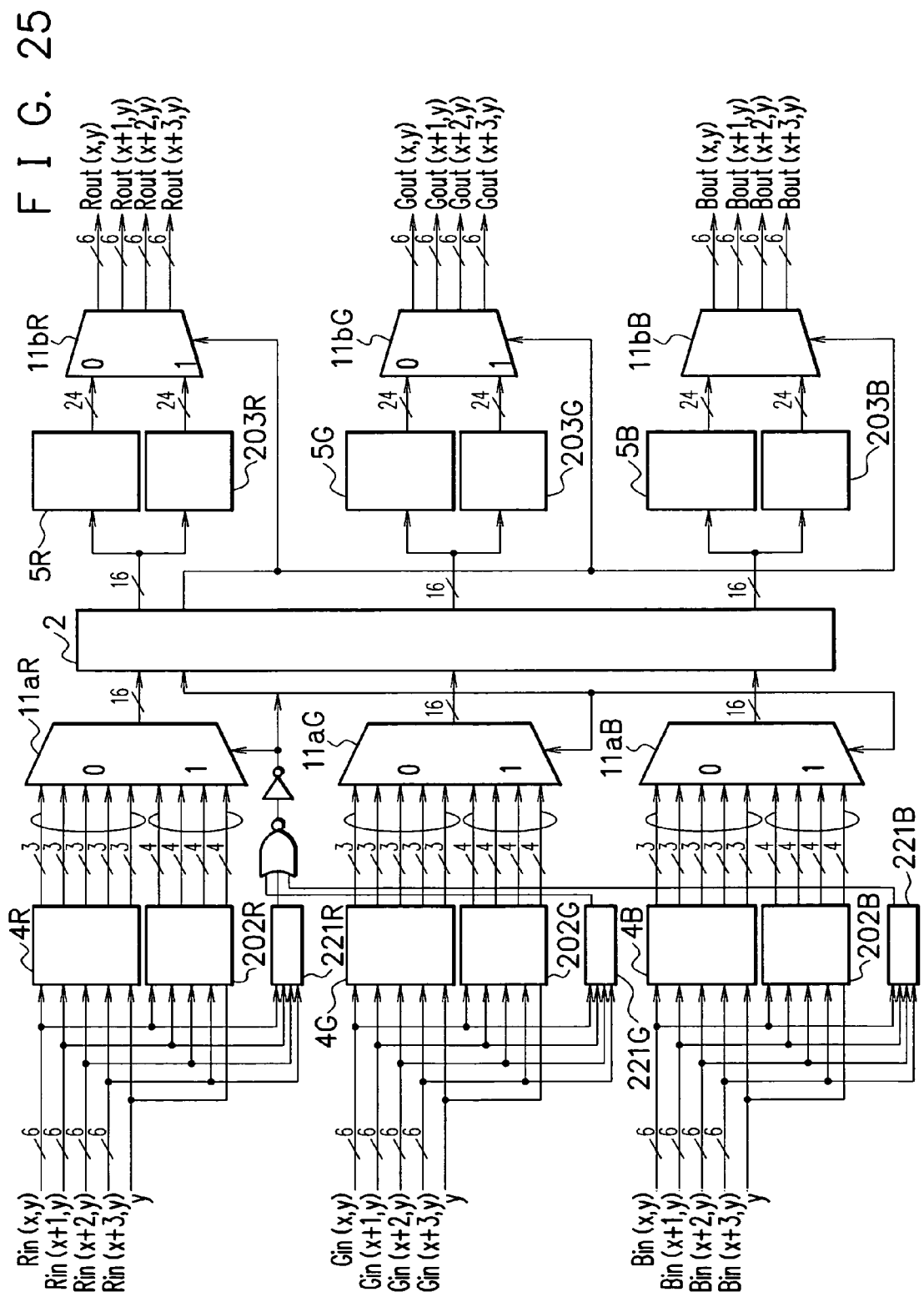
FIG. 25 is a schematic block diagram of one embodiment of an image processing device including three color image processing units in parallel for processing the image data of RGB colors to use a representative flag signal to further reduce a data amount stored in a memory.

In FIG. 25, there is shown one embodiment of an image processing device including three color image processing units in parallel for processing the image data of the RGB color components to use a representative flag signal for further reducing a data amount stored in a memory. In FIG. 25, R, G and B attached to signs represent the RGB (red, green and blue) color components, and the three color image processing units each have substantially the same construction as the image processing device shown in FIG. 23 and separately process the three color image data of the RGB color components, respectively. In the following description, it is sufficient to explain this embodiment with respect to one color component, for example, red (R) and the R, G and B are omitted for brevity.

When a representative flag signal is used, output signals (flag signals) from compression method change controllers 221 for three color components are checked. When there is at least one flag signal indicating that a block coding cannot be executed (there is at least one "1" in data allocation of each selector 11a), "1" as the representative flag signal is output to store it into a memory 2. In this case, as shown in FIG. 25, an OR of three flag signals for three color components is operated to produce the representative flag signal.

By storing the representative flag signal in the memory 2, the data amount of 2 bits can be reduced compared with the case that the three flag signals for three color components are stored in the memory 2.

When compressed image data is decompressed, the representative flag signal read out of the memory 2 is fed to each selector 11b and a data decompression processing for each color component is conducted according to the representative flag signal.

Moreover, the input color image data can be processed by a plurality (e.g. three) of the image processing devices, arranged in parallel, of the third embodiment and similarly the representative flag signal can be used for reducing the data amount stored in the memory. In this case, the flag signal for one color component of which the compression rate of the bit plane compression is set to the highest is used as the representative flag signal. In a construction that a plurality (e.g. three) of the image processing devices shown in FIG. 15 are arranged in parallel, it is enough that the flag signal for one color component of which the bit number "n" of the input image data becomes largest is used as the representative flag signal.

Figure 26:
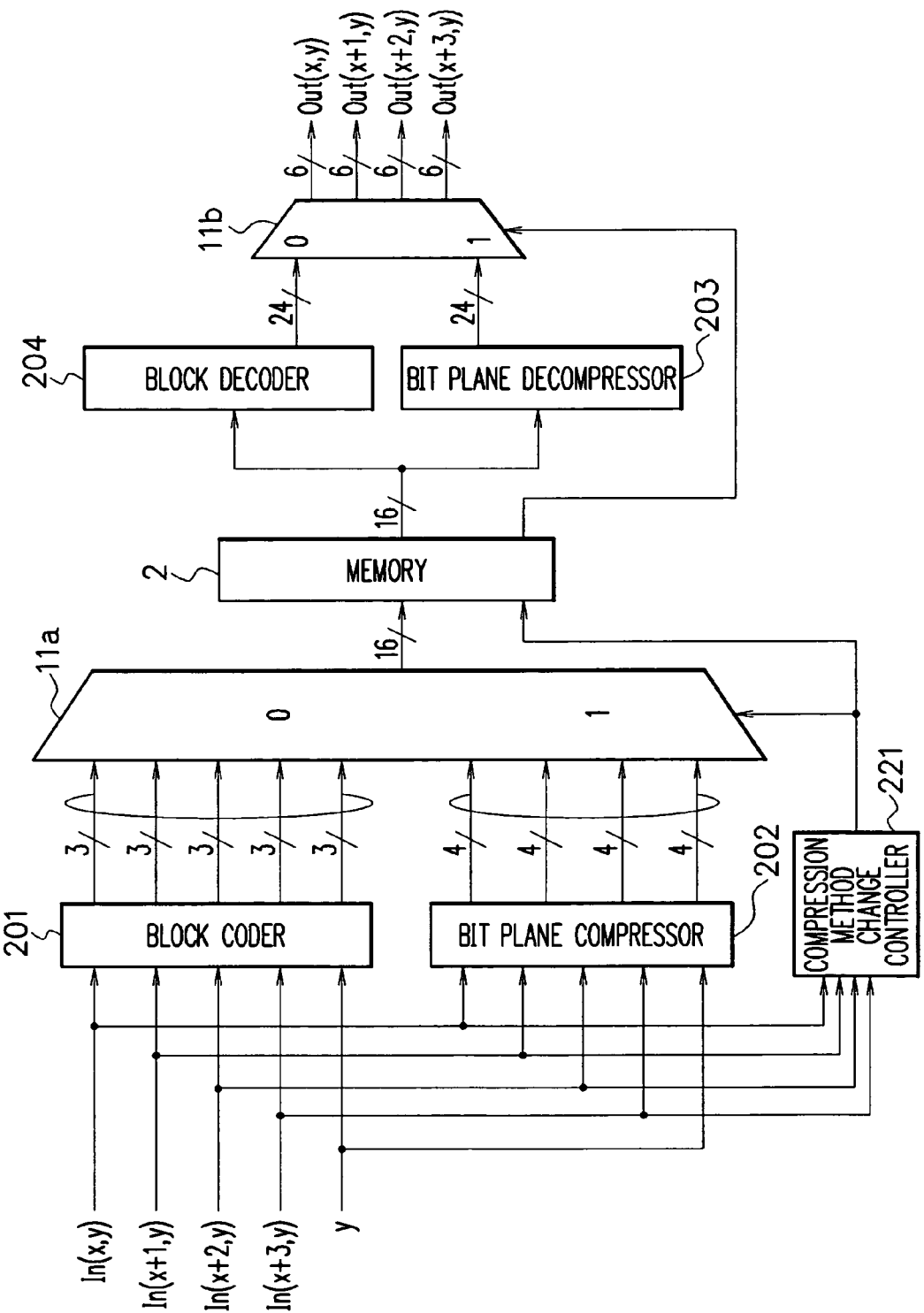
FIG. 26 is a schematic block diagram of an image processing device according to a fifth embodiment.

A fifth embodiment of the present invention will be described in detail with reference to FIG. 26. In FIG. 26, there is shown one embodiment of an image processing device according to a fifth embodiment of the present invention. In this embodiment, the image processing device has almost the same construction as that of the fourth embodiment shown in FIG. 23 except that the first image processor 4 is replaced with a block coder 201 and the second image processor 5 is replaced with a block decoder 204. That is, an image processing block for carrying out only a block coding and an image processing block for implementing only a bit plane compression are arranged in parallel on the input side of the image processing device.

In this embodiment, in the block coder 201, a block coding as a reversible compression of input image data of 6 bits is executed so that representative value data becomes 4 bits and difference data is 3 bits. In this case, an output bit number per one area is 4+3×4=16 bits. On the other hand, in a bit plane compressor 202, the input image data of 6 bits is compressed to image data of 4 bits. An output bit number per one area is 4×4=16 bits. Hence, a data amount to be stored in a memory 2 per one area becomes 16 bits+1 bit for selection data=17 bits.

An operation of this image processing device is substantially the same as that of the fourth embodiment described above and hence the description thereof can be omitted for brevity. In this embodiment, it is readily understood that almost the same effects are obtained as the fourth embodiment. In this instance, it can be considered that the cases that the bit plane compression is conducted increase and hence image quality is largely changed depending on kinds of input images.

In this embodiment, although the image processing block for carrying out only the block coding and the image processing block for implementing only the bit plane compression are arranged in parallel on the input side, the image processing block for executing only the block coding and the first image processor of the fourth embodiment can be arranged in parallel. In this case, an image quality difference depending on the kinds of the input images becomes small.

Further, of course, the first and second image processors in the first to the fifth embodiments can be used as an image compressing device and an image decompressing device, respectively.

Figure 27:
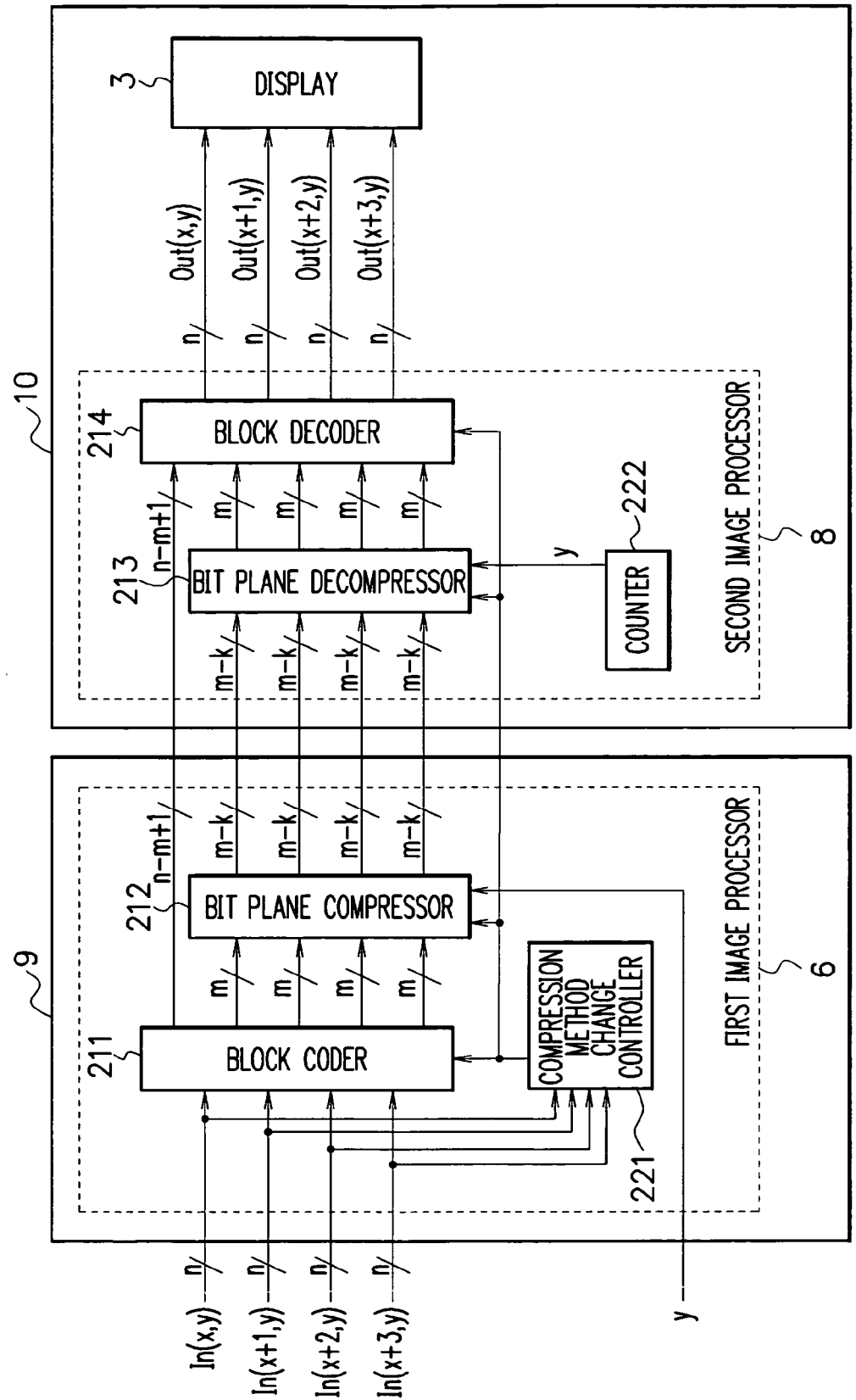
FIG. 27 is a schematic block diagram of an image transmitting device according to a sixth embodiment.

A sixth embodiment of the present invention will be described in detail with reference to FIG. 27. In FIG. 27, there is shown one embodiment of an image transmitting device according to the sixth embodiment of the present invention. In this embodiment, the image transmitting device includes a first processing unit as a transmitter 9 for transmitting a raster image and a second processing unit as a receiver 10 for receiving the raster image transmitted from the transmitter 9. The transmitter 9 includes a first image processor 6, and the receiver includes a second image processor 8 and a display 3. In the transmitter 9, the first image processor 6 compresses the raster image with n-bit gradations to m−k+(n−m+1)/4 bits to transmit the compressed raster image to the receiver 10. In the receiver 10, the second image processor 8 decompresses the compressed raster image to output the decompressed raster image with 6-bit gradations to the display 3.

In this embodiment, the first image processor 6 has the same construction as the above-described first image processor and hence the detailed description thereof can be omitted for brevity.

The second image processor 8 includes a bit plane decompressor 213, a block decoder 214 and a counter 222. The bit plane decompressor 213 and the block decoder 214 have the same constructions as the bit plane decompressor and the block decoder described above and hence the detailed description thereof can be omitted for brevity.

The counter 222 operates in response to image data sent in series from the transmitter 9 and determines XY-coordinates of pixels on the basis of its counted values to output the XY-coordinates (x, y) of the pixels to the bit plane decompressor 213.

The transmitter 9 transmits the image data in the desired order, and hence the counter 222 can determine the XY-coordinates of the pixels on the basis of its counted values.

In this embodiment, when the raster image is transmitted from the transmitter 9 to the receiver 10, the image transmission can be carried out with a small transmission capacity nearly without causing image deterioration. This image transmitting device can be effectively used for the case that an image transmission capacity is short or for reducing buses of a transmission path between the transmitter 9 and the receiver 10.

For example, when a raster image of 8 bits for each color (total 24 bits) is transmitted between two devices via a transmission path having a bus width of only 16 bits for receiving the image, on the transmitting side, a block coding and a bit plane compression are executed for the image data of the raster image to reduce the data amount and the compressed image data of the raster image is transmitted via the transmission path. On the receiving side, the received compressed image data of the raster image is decompressed to obtain the raster image. In this instance, the image data of the color components can be transmitted in parallel to reproduce the image with no inferior image quality compared with the original image.

In this embodiment, although one embodiment of the image transmitting device has been disclosed, of course, various modifications of its construction can be performed with various embodiments of the image processing device according to the first to fifth embodiments.

Further, the first and second image processors of this sixth embodiment can be employed as an image transmitter and an image receiver, respectively.

Figure 28:
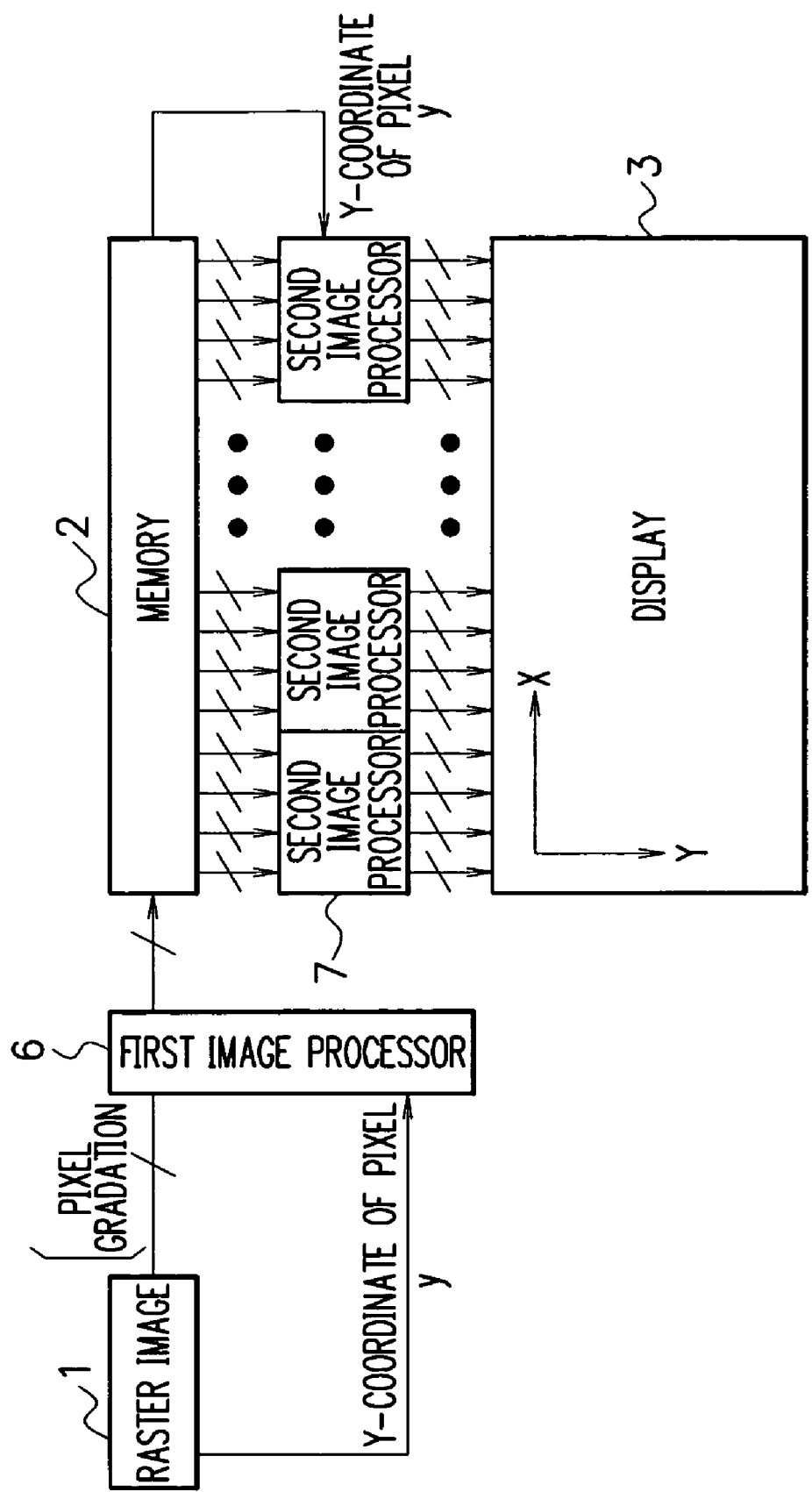
FIG. 28 is a schematic block diagram of a displaying device according to a seventh embodiment.

A seventh embodiment of the present invention will be described in detail with reference to FIG. 28. In FIG. 28, there is shown one embodiment of a displaying device according to the seventh embodiment of the present invention. In this embodiment, n bits of image data of a raster image sent out of a computer is compressed in a first image processor 6 and compressed image data of the raster image is stored in a memory 2. One line of the compressed image data read out of the memory 2 is input to a plurality of second image processors 7 arranged in parallel and the compressed image data is decompressed to output the n bits of the image data of the raster image to the display 3 for displaying the raster image.

In this embodiment, the image data is processed every one line in the main-scanning direction. When one block area is formed extending to the sub-scanning direction (e.g. 2×2 pixels), a line memory is required for conducting the block coding. Therefore, in this embodiment, it is preferable that the block area is formed in one-dimensional shape in the main-scanning direction (that is, one pixel in the sub-scanning direction).

A plurality of the second image processors 7 are arranged in parallel corresponding to the pixels of one line in the main-scanning direction such as one image processor deals with every 4 pixels. For instance, when the display 3 has 240 pixels in the X-direction, 60 second image processors 7 are arranged in parallel. A Y-coordinate value "y" of the pixel is sent from the memory 2 to each second image processor 7.

In this embodiment, a plurality of the second image processors 7 are arranged in parallel to one line of the pixels of the display 3, one line of the image data read out of the memory 2 can be sent to the display 3 without a latch. As a result, there is no need to provide a circuit for latching the image data to reduce a circuit scale.

Figure 31:
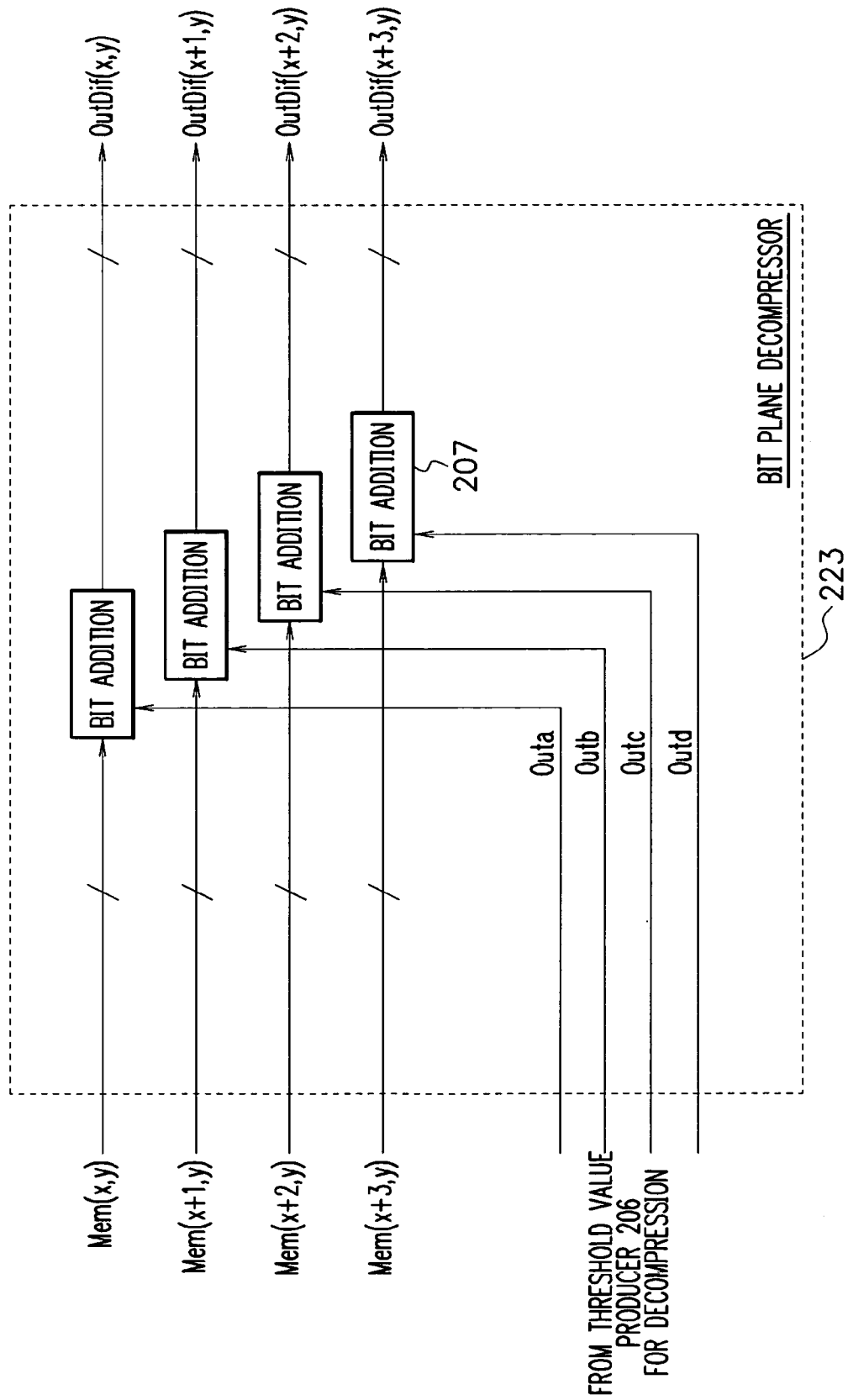
FIG. 31 is a schematic block diagram of a bit plane decompressor shown in FIG. 30.

An eighth embodiment of the present invention will be described in detail with reference to FIG. 29 to FIG. 31. In FIG. 29, there is shown one embodiment of a displaying device according to the eighth embodiment of the present invention. In this embodiment, in almost the same manner as the above-described seventh embodiment, n bits of image data of a raster image sent out of a computer is compressed in a first image processor 6 and compressed image data of the raster image is stored in a memory 2. One line of the compressed image data read out of the memory 2 is input to a plurality of second image processors 12 arranged in parallel and the compressed image data is decompressed to output the n bits of the image data of the raster image to the display 3 for displaying the raster image.

In this embodiment, in the same way as the seventh embodiment, a plurality of second image processors 12 are arranged in parallel corresponding to the pixels of one line in the main-scanning direction. In this case, different from the displaying device of the seventh embodiment, a threshold value producer 206 for decompression included in a bit plane decompressor 213 in each second image processor 7 is mounted outside and is used in common. That is, threshold values produced in this threshold value producer 206 are used in common for all the second image processors 12. The other parts are the same as those of the seventh embodiment and the detailed description thereof can be omitted for brevity.

In FIG. 30, there is shown one embodiment of each second image processor 12 shown in FIG. 29. The second image processor 12 includes a bit plane decompressor 223 and a block decoder 214. FIG. 31 illustrates one embodiment of a bit plane decompressor 223 shown in FIG. 30. The bit plane decompressor 223 includes four bit adders 207. In this embodiment, each bit adder 207 decides whether or not to add a threshold value sent from the threshold value producer 206 to the compressed image data read out of the memory 2 according to a flag signal read out of the memory 2.

In this embodiment, the threshold value producer 223 for decompression is mounted outside to further reduce the circuit scale compared with the case that a plurality of second image processors, each including a threshold value producer for decompression therein, are arranged in parallel.

A ninth embodiment of the present invention will be described in detail with reference to FIG. 32 to FIG. 37. In this embodiment, an image processing method can be executed as a software processing using a computer. In FIG. 32, there is shown a functional construction corresponding to an image processing device for use in the image processing method of the present invention. In this embodiment, as shown in FIG. 32, the image processing method in the image processing device, having the same construction as the fourth embodiment, including a first image processor 4, a second image processor 5, a bit plane compressor 202, a bit plane decompressor 203, selectors 11a and 11b and a compression method change controller 221 surrounded by a broken line can be implemented as the software processing using a computer (CPU100).

Figure 33:
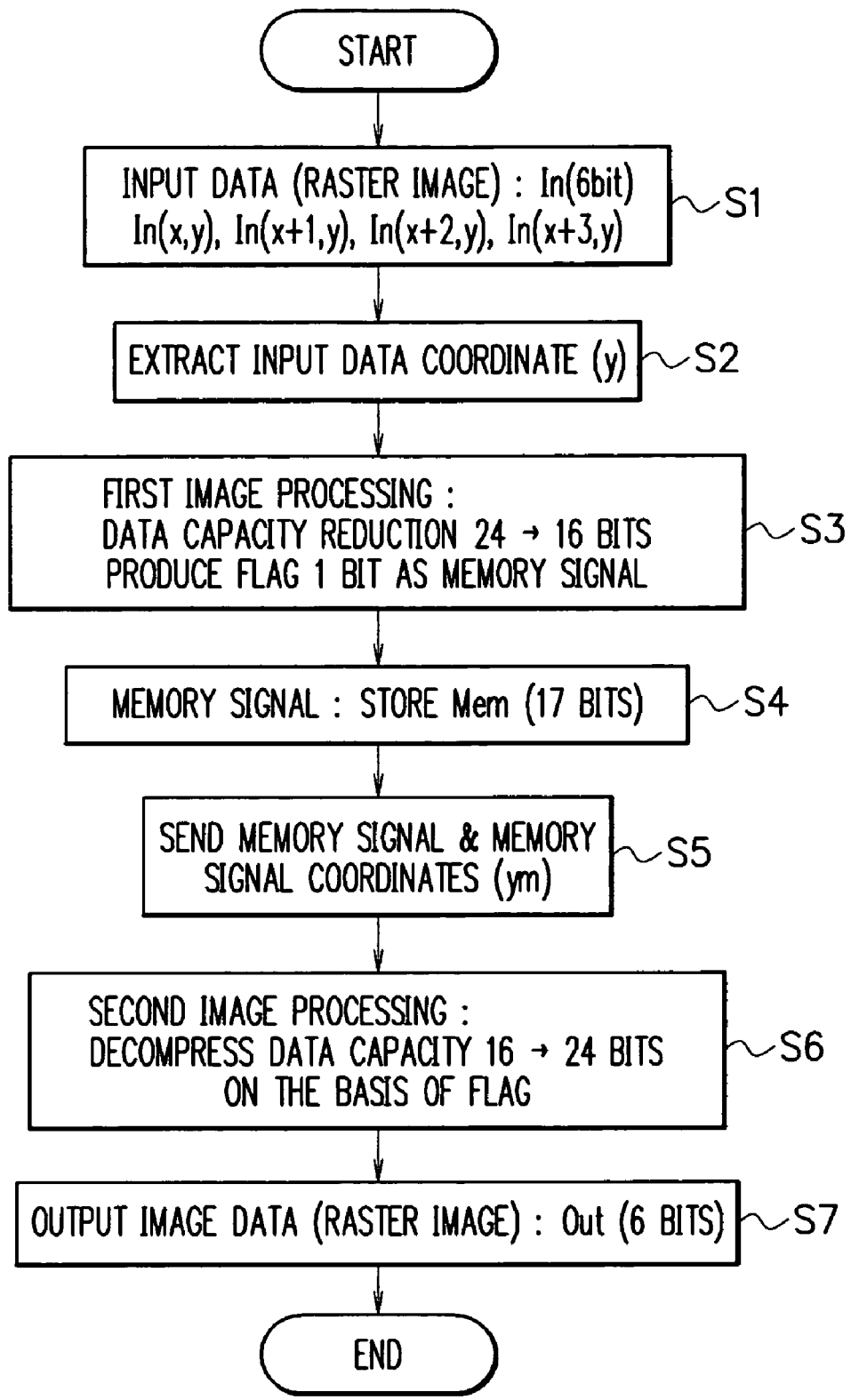
FIG. 33 is a flow chart showing an operation of the image processing method according to the ninth embodiment.

In FIG. 33, there is shown an operation of the image processing method of this embodiment. This operation is the same as that in the image processing device of the fourth embodiment and is realized by the software processing using the CPU100.

Figure 34:
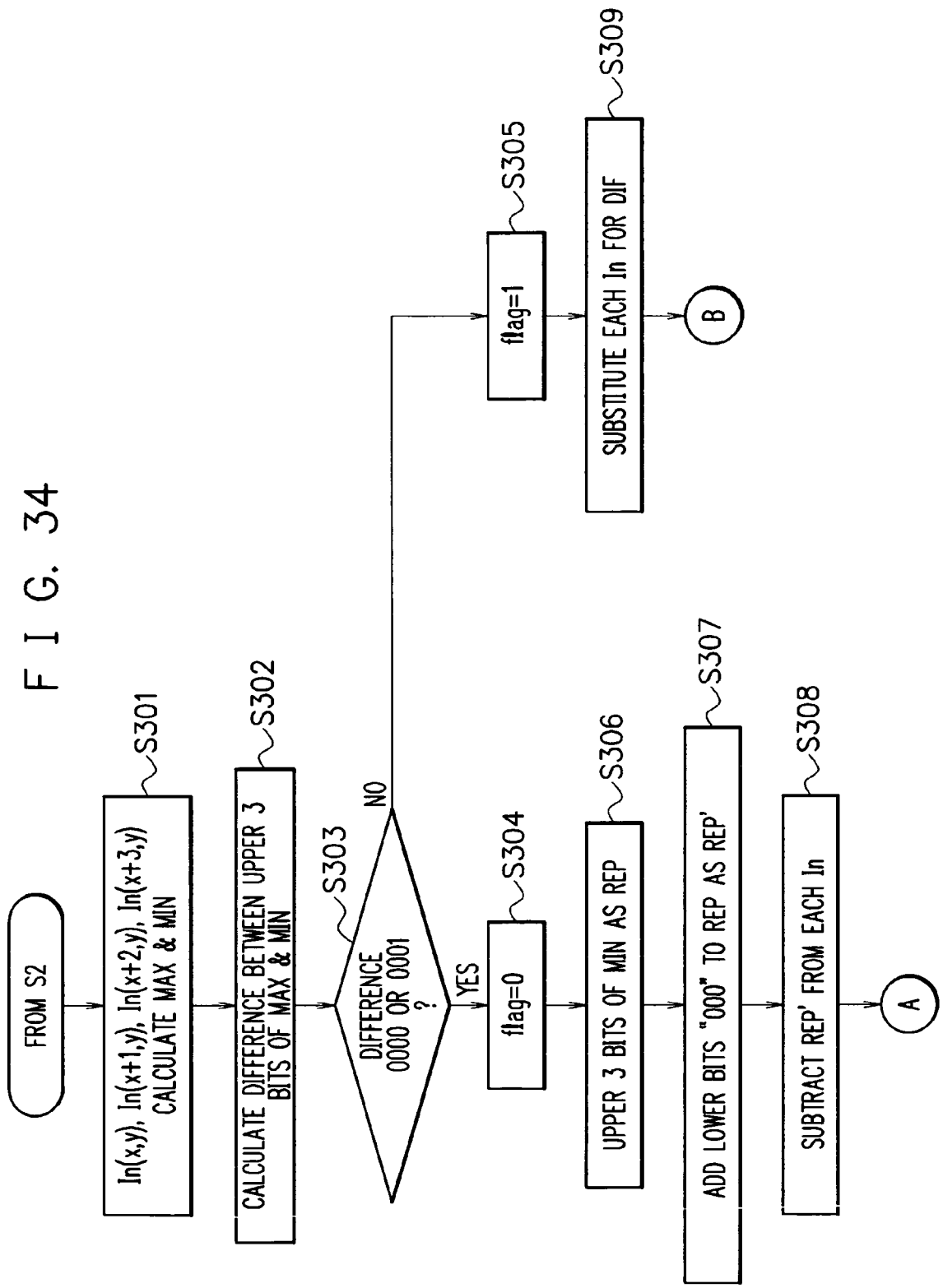
FIG. 34 is a flow chart showing a processing of a first image processor shown in FIG. 32.
Figure 35:
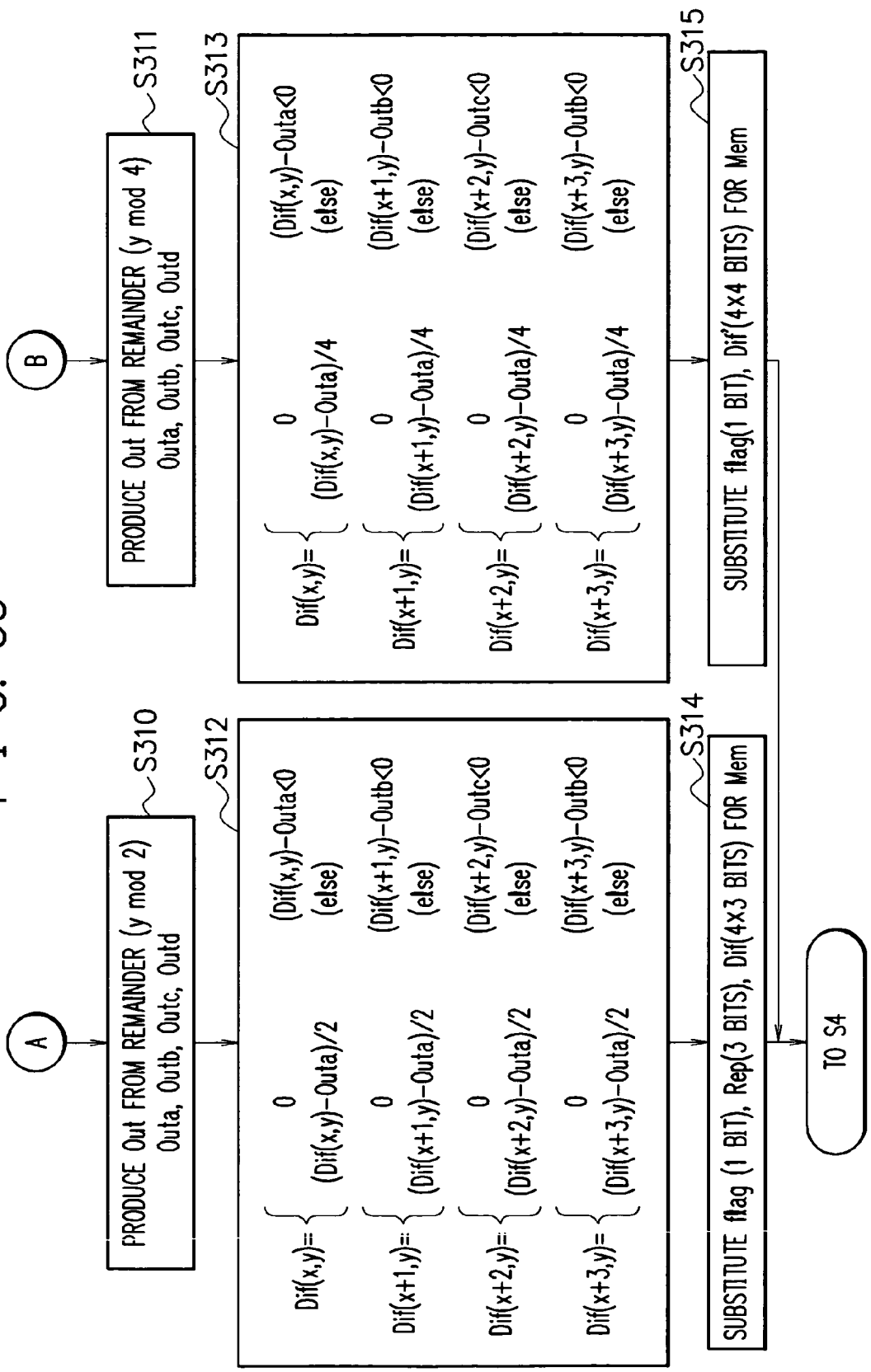
FIG. 35 is a flow chart showing the processing of the first image processor shown in FIG. 32.
Figure 36:
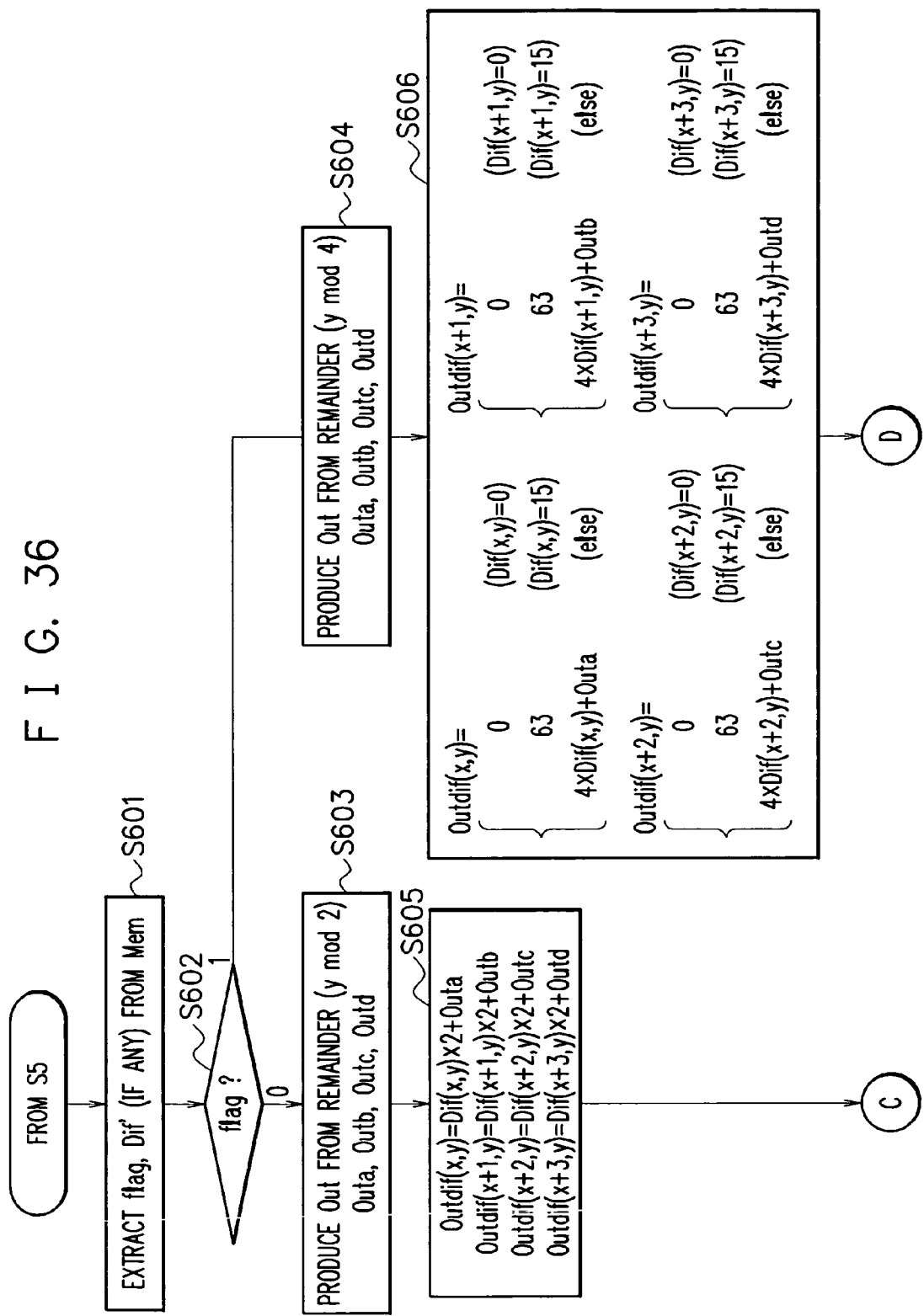
FIG. 36 is a flow chart showing a processing of a second image processor shown in FIG. 32.
Figure 37:
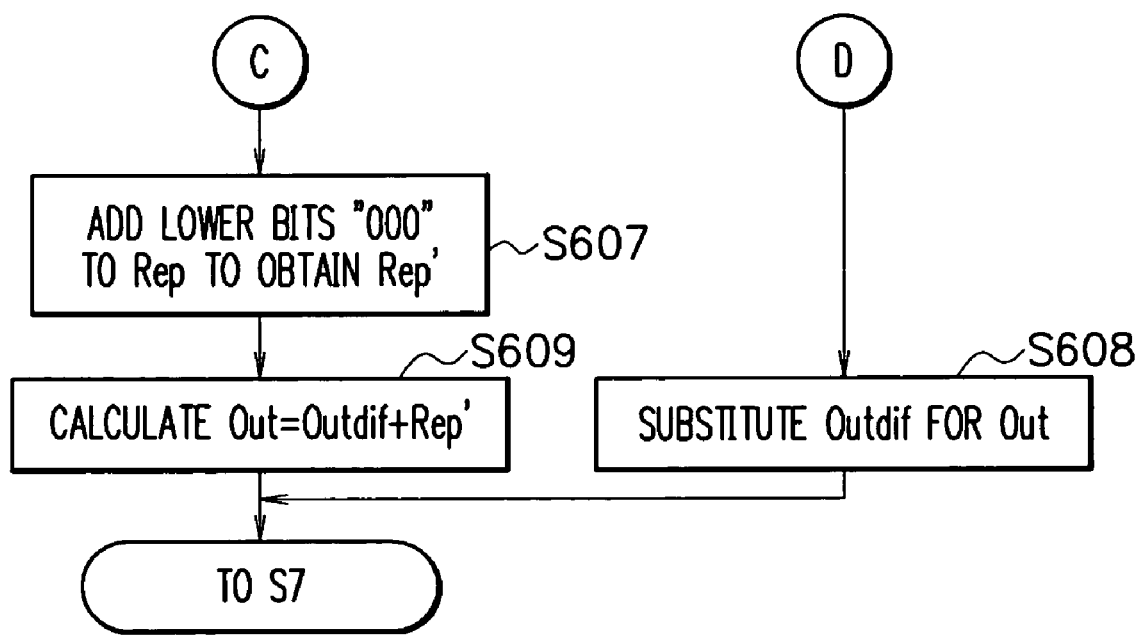
FIG. 37 is a flow chart showing the processing of the second image processor shown in FIG. 32.

In this embodiment, 6 bits of image data of a raster image is processed to reduce its data amount to 17 bits per 4 pixels and the compressed image data is once stored in a memory. The compressed image data read out of the memory is decompressed to output the 6 bits of the image data to a display for displaying the raster image. In step S3, a first image processing such as the processing by the first image processor 4 and the bit plane compressor 202 in the fourth embodiment is carried out. In step 6, a second image processing such as the processing by the second image processor 5 and the bit plane decompressor 203 in the fourth embodiment is implemented. A flow of the first image processing is shown in FIGS. 34 and 35. Further, a flow of the second image processing is shown in FIGS. 36 and 37. The processing is performed by a controller (CPU or the like) of a computer. That is, the controller places a program stored in an unshown ROM (Read Only Memory) or information storage medium on an unshown RAM (Random Access Memory) or the memory 2 and runs the program so that the CPU100 functions as the first image processor 4, the second image processor 5, the bit plane compressor 202, the bit plane decompressor 203, the selectors 11a and 11b and the compression method change controller 221 to carry out the processing.

In FIG. 33, when image data In(6 bits) of a raster image is input in step S1, the CPU100 extracts information (i.e., a Y-coordinate value y of pixels) indicating the pixels corresponding to the input image data in step S2.

The CPU100 determines Mem(17 bits per 4 pixels) to be sent to the memory 2 on the basis of the value y as follows, in step S3.

In FIG. 34, the CPU100 determines the maximum value Max and the minimum value Min of the input image data In(x, y), In(x+1, y), In(x+2, y) and In(x+3, y) in step S301.

The CPU100 calculates a difference between the upper 3 bits of the maximum and minimum values in step S302, and selects either a processing of the first image processor 4 or a processing of the bit plane compressor 202 according to the calculated difference "1" or "0" in step S303.

When the difference is "1" or "0" in step S303, the CPU100 executes the processing of the first image processor 4. The CPU100 sets a flag value indicating the selected processing to "0" in step S304 and conducts the following processing in sequence. That is, the CPU100:

(1) defines the upper 3 bits of the minimum value Min as representative value data Rep in step S306.

(2) adds the lower bits "000" to the representative value data Rep to obtain data Rep' for calculating difference data in step S307.

(3) subtracts the data Rep' from each input image data In to obtain difference data Dif in step S308.

(4) produces output values Outa, Outb, Outc and Outd from the remainder (y mod 2) obtained by dividing y by 2 in step S310, as shown in FIG. 35.

(5) calculates subtraction of the difference data such as Dif(x, y)−Outa, Dif(x+1, y)−Outb, Dif(x+2, y)−Outc and Dif(x+3, y)−Outd and quantizes the subtracted difference data by dividing by 2 in step S312. At this time, when the operated result becomes a negative value, the value is defined as "0". The quantized difference data is designated as Dif'.

(6) substitutes the flag value flag (1 bit), the representative value data Rep(3 bits) and the quantized difference data Dif' (4×3 bits) for compressed difference data Mem in step S314.

On the other hand, in FIG. 34, when the difference is neither "1" nor "0" in step S303, the CPU100 implements the processing of the bit plane compressor 202. The CPU100 sets the flag value indicating the selected processing to "1" in step S305 and conducts the following processing in sequence. That is, the CPU100:

(A) substitutes each input image data In for the difference data Dif in step S309.

(B) produces output values Outa, Outb, Outc and Outd from the remainder (y mod 4) obtained by dividing y by 4 in step S311, as shown in FIG. 35.

(C) calculates subtraction of the difference data such as Dif(x, y)−Outa, Dif(x+1, y)−Outb, Dif(x+2, y)−Outc and Dif(x+3, y)−Outd and quantizes the subtracted difference data by dividing by 4 in step S313. At this time, when the operated result becomes a negative value, the value is defined as "0". The quantized difference data is designated as Dif'.

(D) substitutes the flag value (1 bit) and the quantized difference data Dif'(4×4 bits) for compressed difference data Mem in step S315.

The CPU100 stores the compressed difference data obtained as described above as the memory data Mem in the memory 2 in step S4, as shown in FIG. 33.

In FIG. 33, the CPU100 sends the memory data Mem read out of the memory 2 along with the information (i.e., the Y-coordinate value y of the pixels) indicating the pixels corresponding to the memory data Mem to the second image processor 5 and the bit plane decompressor 203 in step S5.

The CPU100 determines output image data (the raster image) Out(6 bits) to be sent to a display 3 on the basis of XY-coordinates of display pixels as follows, in step S6.

In FIG. 36, the CPU100 extracts the flag value, the quantized difference data Dif and the representative value data Rep (if any) from the memory data Mem in step S601.

The CPU100 selects either a processing of the second image processor 5 or a processing of the bit plane decompressor 203 according to the flag value in step S602.

When the flag value is "0" in step S602, the CPU100 carries out the processing of the second image processor 5 in sequence as follows. That is, the CPU100:

(1) produces the output values Outa, Outb, Outc and Outd from the remainder (y mod 2) obtained by dividing y by 2 in step S603.

(2) calculates output difference data from the quantized difference data Dif' such as Outdif(x, y)=Dif'(x, y)×2+Outa, Outdif(x+1, y)=Dif'(x+1, y)×2+Outb, Outdif(x+2, y)=Dif' (x+2, y)×2+Outc, and Outdif(x+3, y)=Dif'(x+3, y)×2+Outd in step S605.

(3) adds the lower bits "000" to the representative value data Rep to obtain the data Rep' for calculating output image data in step S607, as shown in FIG. 37.

(4) calculates the output image data Out=Outdif+Rep' for all the output difference data Outdif in step S609.

On the other hand, in FIG. 36, when the flag value is "1" in step S602, the CPU100 conducts the processing of the bit plane decompressor 203 in sequence as follows. That is, the CPU100:

(A) produces output values Outa, Outb, Outc and Outd from the remainder (y mod 4) obtained by dividing y by 4 in step S604.

(B) calculates the output difference data from the quantized difference data Dif' such as Outdif(x, y)=Dif'(x, y)×4+Outa, Outdif(x+1, y)=Dif'(x+1, y)×4+Outb, Outdif(x+2, y)=Dif'(x+2, y)×4+Outc, and Outdif(x+3, y)=Dif'(x+3, y)×4+Outd in step S606. At this time, when Dif'="0" (the minimum value), the output difference data Outdif can be "0" and, when Dif'="15". (the maximum value), the output difference data can be "63".

(C) substitutes all the output difference data for the output image data Out in step S608, as shown in FIG. 37.

In FIG. 33, the CPU100 outputs the output image data Out (6 bits) obtained as described above to the display 3 in step S7.

In this embodiment, the processing in step S3, the processing in step S6 and the like can be performed as the software processing using the computer and hence the same image processing method as that executed in the image processing device of the above-described fourth embodiment can be implemented without using the particular hardware.

Although the operation shown in FIG. 33 is the same image processing as that conducted in the image processing device of the fourth embodiment, of course, the same image processing as that executed in the image processing device of the aforementioned third embodiment can be performed in the same manner by the software processing using the computer.

Figure 38:
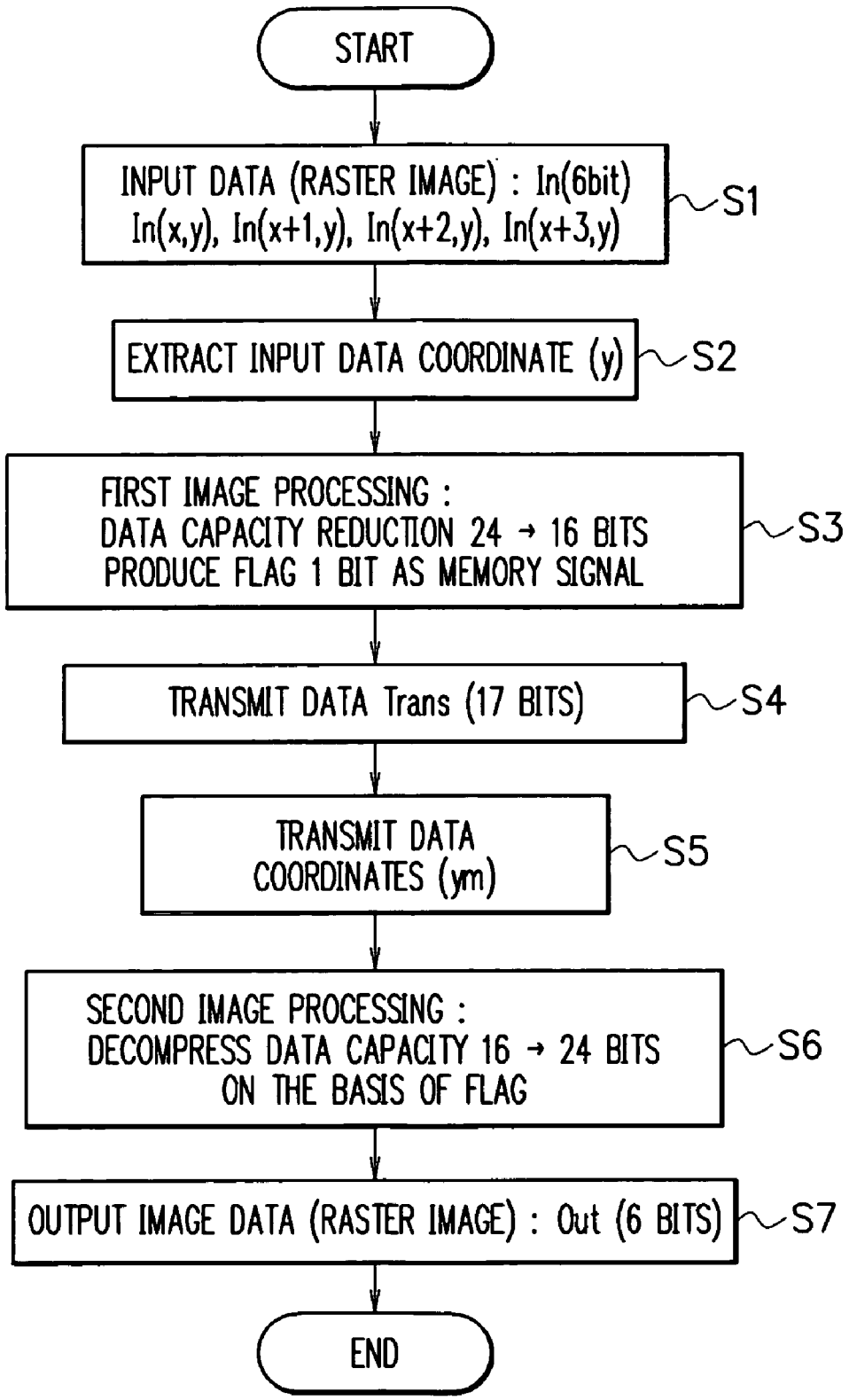
FIG. 38 is a schematic block diagram of an image transmitting method according to a tenth embodiment.

A tenth embodiment of the present invention will be described in detail with reference to FIG. 38. FIG. 38 shows one embodiment of an image transmitting method. In this embodiment, 6 bits of image data of a raster image is processed to reduce its data amount to 17 bits per 4 pixels and the compressed image data is transmitted from a transmitter to a receiver via a transmission path. In the receiver, the transmitted compressed image data is decompressed to output the 6 bits of the image data to a display for displaying the raster image.

In the same manner as the above-described ninth embodiment, the processing is performed by a controller (CPU or the like) of a computer. That is, the controller places a program, which was stored in an unshown ROM or information storage medium, on an unshown RAM and runs the program so that the CPU functions as a first image processor, a second image processor, a bit plane compressor, a bit plane decompressor, two selectors and a compression method change controller to carry out the processing.

In this embodiment, step S3 is a processing for compressing the input image data of the raster image to reduce its data amount and step S6 is a processing for decompressing the transmitted compressed image data to increase its data amount to obtain the image data of 6 bits. The processing in step S3 and the processing in step S6 can be performed in the same manner as steps S3 and S6 of the above-described ninth embodiment.

With this processing, when capacity of the image data is larger than transmission capacity, an image transmitting method capable of carrying out a data transmission without causing granular quality deterioration can be achieved and an image processing method having the same effects as described above can be also implemented.

Figure 39:
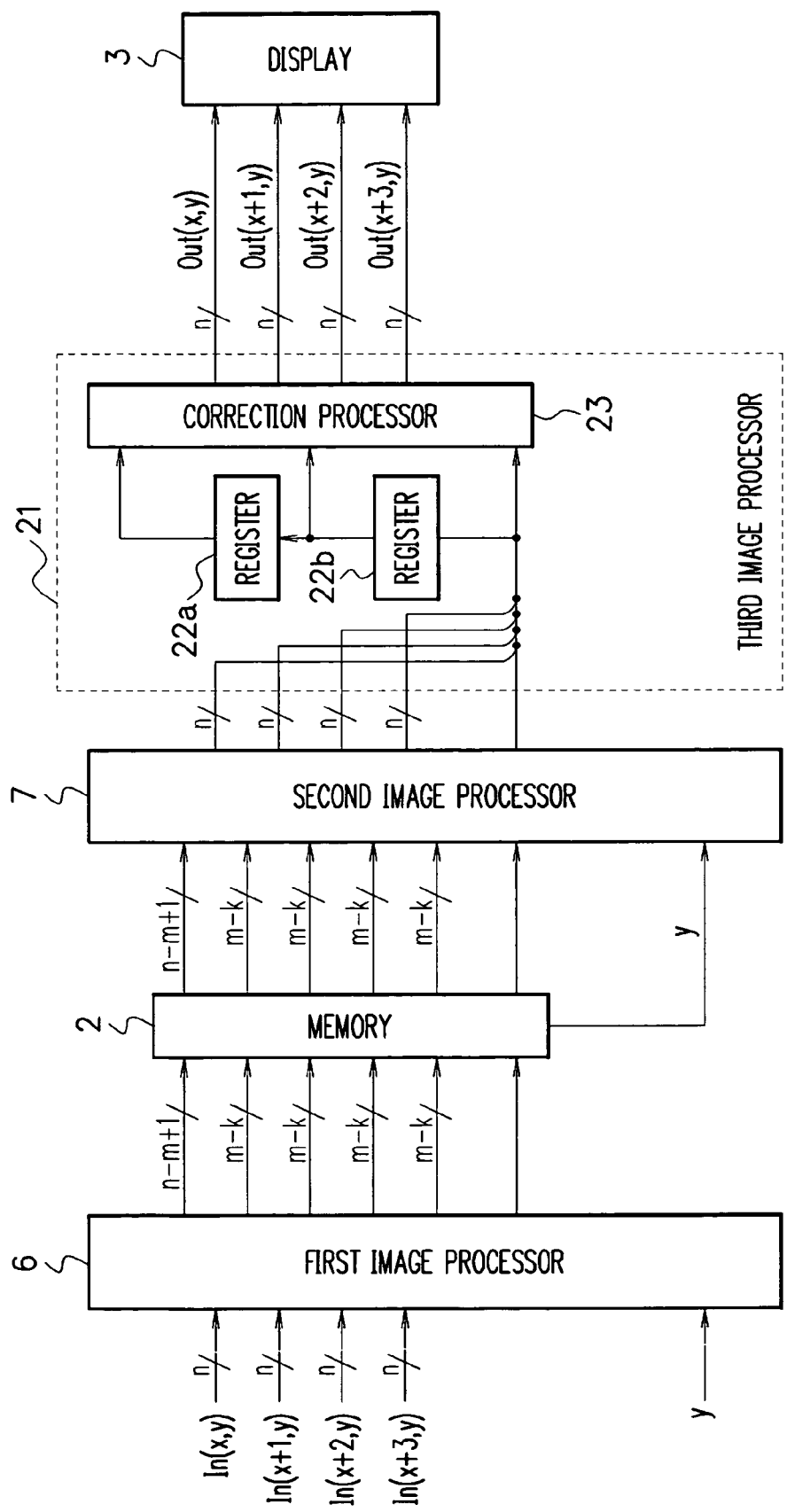
FIG. 39 is a schematic block diagram of an image processing device according to an eleventh embodiment.

An eleventh embodiment of the present invention will be described in detail with reference to FIG. 39 to FIG. 42. FIG. 39 shows one embodiment of an image processing device. In this embodiment, the construction is similar to that of the third embodiment shown in FIG. 15, but different from the third embodiment, a third image processor 21 is added between a second image processor 7 and a display 3. The third image processor 21 inputs pixel data of 4 pixels and a flag signal from the second image processor 7 and outputs pixel data of 4 pixels. The third image processor 21 includes two registers 22a and 22b and a correction processor 23.

Each register 22a or 22b holds the pixel data of 4 pixels and the flag signal. Therefore, the pixel data of 12 pixels of three areas at the maximum is input to the correction processor 23. Further, it is assumed that a reference area is a central area of the output of the register 22b. That is, in the correction processor 23, the central area as an target area X and its adjacent areas X−1 and X+1 are input and a correction processing of the target area X is carried out using the pixel data of both the adjacent areas X−1 and X+1 and the flag signal.

The purpose of the correction and the correction method conducted in the third image processor 21 will now be described. Up to the aforementioned ninth embodiment, a combination of a block coding as a reversible compression and a bit plane compression as a method which can largely improve granular quality of an image in a mild gradation image area or a plain gradation image area has been described in detail. In the third image processor 21, in order to remove a slight granular quality deterioration still existing after conducting a block coding and processing of the combination of the block coding and the bit plane decompression, an auxiliary correction processing is implemented.

In each of the above-described embodiments, when an image is divided into a plurality of areas including a plurality of pixels before executing a block coding and one area includes a mild gradation portion or a plain gradation portion and a steep gradation change portion such as an edge part, since a reversible compression of the block coding cannot be applied, an output image includes many errors and hence granular quality deterioration still remains within the image. In this embodiment, in order to remove the granular quality deterioration within such an area, when two adjacent areas do not include more errors than the target area does after processing, the third image processor 21 conducts a correction processing of the target area on the basis of pixel values of the two adjacent areas.

An operation of the correction processing executed in the third image processor 23 will be described with reference to FIG. 40. A flow of a specific correction processing conducted in the third image processor 21 is illustrated as a certain pixel sequence or string in FIG. 40 wherein a pixel position x is located along the x-axis (in the horizontal direction) and a pixel value f(x) along the y-axis (in the vertical direction). In FIG. 40(a), a graph shows 12 pixel positions x (0 to 11) in three areas (12 pixels) along the x-axis and their pixel values f(x) along the y-axis. One area includes 4 pixels, that is, x=0 to 3 in area 1, 4 to 7 in area 2, and 8 to 11 in area 3. The pixel values are a fixed low value from x=0 to 5, climb steeply (edge) between x=5 and 6, and are a fixed high value from x=6 to 11.

As described above in up to the tenth embodiment, various combinations of the compression and decompression methods can be performed. In this embodiment, two kinds of processing, that is, a processing A executing only a bit plane compression with a high compression rate and a processing B executing a combination of a block coding and a bit plane compression with a low compression rate can be selectively carried out in every area. On this occasion, since variations of the pixel values are small in area 1 and area 3 and the reversible block coding can be conducted, the processing B is employed. On the other hand, in area 2, since the edge is included and a difference between the maximum and minimum values is large, the processing A is applied. FIG. 40(*b*) shows the result of the compression-decompression processing of the three areas on the basis of the aforementioned processing methods. In area 2 including the edge, which the processing A is applied to, the compression rate of the bit plane compression is high and errors are large relative to the input value. In area 1 and area 3, which the processing B is applied to, the compression rate of the bit plane compression is low and the errors is small relative to the input value. At this time, in the three areas x=0 to 11 as a whole, the large errors occur near the edge and as a result, this can be recognized as the granular quality deterioration.

Figure 40:
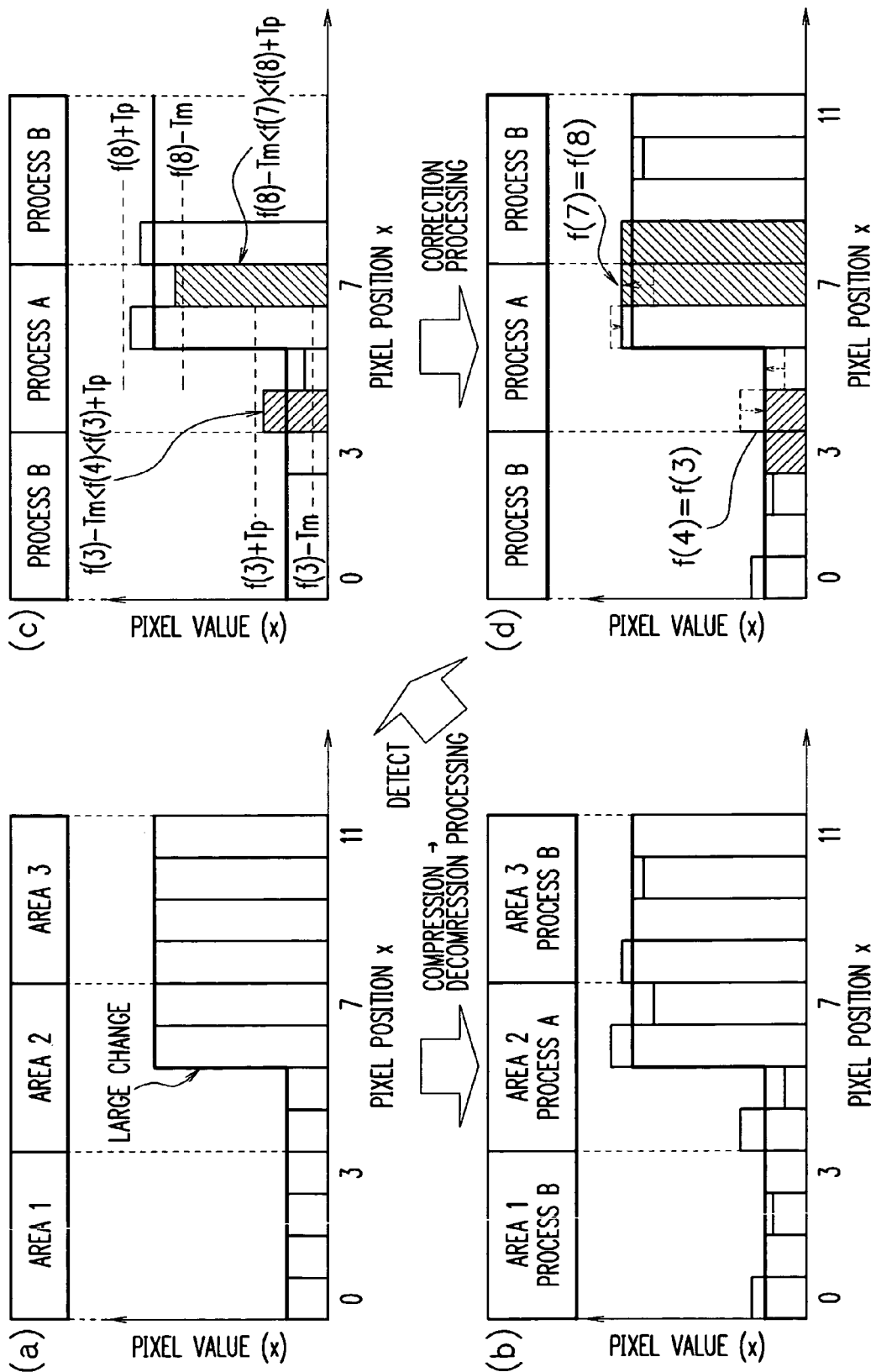
FIG. 40 is a graphical chart showing a flow of a correction processing in a third image processor shown in FIG. 39.

In the third image processor 21, the processing is carried out on the basis of the compression-decompression result obtained in FIG. 40(*b*) and flag signals indicating either the processing A or B executed in the respective areas. This processing is divided into two steps, that is, detection and correction. In FIG. 40(*c*), there is shown one embodiment of a detection processing. In the detection processing, (1) when the processing B (errors are less than the processing A) is applied to the areas adjacent to the area which the processing A is applied to, (2) the values of the pixel data (x=3 and x=8 in FIG. 40(*c*)) closest to the processing A area within the processing B areas are each compared with the pixel data (x=4 to 7) within the processing A area. When the difference of the comparison is within a certain range (for example, f(3)−Tm<f(4)<f(3)+Tp), it is assumed that the value of f(3) after the processing is closer to the value of f(4) before the processing than the value of f(4) after the processing and the correction is executed.

The values Tm and Tp for determining a detection range to conduct the correction are decided by a range of the errors caused by the processing A applied to f(3) and f(8), respectively. For instance, in this embodiment, a bit plane compression by k bits is performed in the processing A. At the compression of k bits, errors of approximately $-2^{(k-1)}$ to $2^{(k-1)}$ are included and in this instance, it can be determined to be $Tm=Tp=2^{(k-1)}$. Of course, the values Tm and Tp can be properly determined according to the error range caused in the processing A. In this case, although the error range is determined according to the reduction bit number k, the error range can also be determined from the values x and y indicating the pixel position or the pixel data itself.

Since the aforementioned comparison and assumption are started from the boundary of an area, the data comparison of f(3) is conducted in order from f(4) to f(7) and is stopped when the above-described comparison formula becomes no more satisfied. Similarly, the data comparison of f(8) is executed from f(7) to f(4) and is stopped when the comparison formula becomes no more satisfied. This is because it is judged that the edge is located in that position and hence the next pixel data is not related to the pixel data such as f(3) or f(8) at the boundary of the processing B area. In FIG. 40(*c*), with the result of the comparison with f(3), in the pixel positions (x=4, 5), f(3)−Tm<f(4)<f(3)+Tp and f(3)−Tm<f(5)<f(3)+Tp are satisfied. In the pixel position (x=6), f(3)−Tm<f(6)<f(3)+Tp is not satisfied. As a result, the correction processing based on the result of the comparison with f(3) is applied to f(4) and f(5) but is not to f(6). Moreover, similarly, the comparison of f(7) to f(4) with f(8) is conducted and the correction processing based on the result of the comparison with f(8) is applied to f(6) and f(7).

In FIG. 40(*d*), a method of the correction processing is shown. The pixel data to be corrected is detected in FIG. 40(*c*). Since f(4) and f(5) are detected as the objects of the correction processing as the result of the comparison with f(3), f(4) and f(5) are respectively substituted with f(3) to perform the correction processing. Similarly, since f(6) and f(7) are detected as the objects of the correction processing as the result of the comparison with f(8), f(6) and f(7) are respectively substituted with f(8).

FIG. 40(*b*) illustrates the output of the second image processor 7 and FIG. 40(*d*) depicts the output of the third image processor 21. It is readily understood that the granular quality around the edge in the pixel positions x=4 to 7 are improved, as shown in FIG. 40(*d*).

In FIG. 41, there is shown one embodiment of the third image processor 21 for specifically carrying out the flow of the correction processing shown in FIG. 40. The third image processor 21 includes a pair of registers 22*a* and 22*b* and a correction processor 23. The correction processor 23 includes four correction processing element circuits 231 corresponding to the four pixels within one area. Although the two registers 22*a* and 22*b* can send flag data of three areas and pixel data of 12 pixels in parallel to the correction processor 23, in fact, four pixel data Out'(4x', y), Out'(4x'+1, y), Out'(4x'+2, y) and Out'(4x'+3, y) and flag data flag(x') of the central area as the target area, and two pixel data Out'(4(x'−1)+3, y) and Out'(4(x'+1), y) and two flag data flag(x'−1) and flag(x'+1) of the two adjacent pixels adjoining both the sides of the target area, that is, the total of the 6 pixel data and the three flag data of the three areas are fed to the correction processor 23. The four pixel data of the target area is input to the respective four correction processing element circuits 231, and the flag data and the two pixel data of the two adjacent pixels are basically sent to all the correction processing element circuits 231. However, as to reproduce the processing of the data comparison in sequence shown in FIG. 40, the two flag data flag(x'−1) and flag(x'+1) of the adjacent pixels is sent to only the two respective correction processing element circuits 231 in their two end positions and the correction processing element circuits 231 transfer the processing results as flagm_out and flagp_out to the adjacent correction processing element circuits 231 in sequence. Further, in this embodiment, for simplifying, the pixel data and the flag data of the two adjacent pixels are not sent to the respective farthest correction processing element circuits 231 from their areas. This is because the same correction processing is not always applied to all the pixel data of the target area. (When all the pixel data of the target area satisfies Out'(4(x'−1)+3, y)−Tm<Out'(4(x'+a), y)<Out'(4(x'−1)+3, y)+Tp (a=0 to 3), there are no pixel variations as the condition for applying the processing A to the area at the very beginning.) The outputs of the correction processing element circuits 231 become the output of the third image processor 21.

Figure 42:
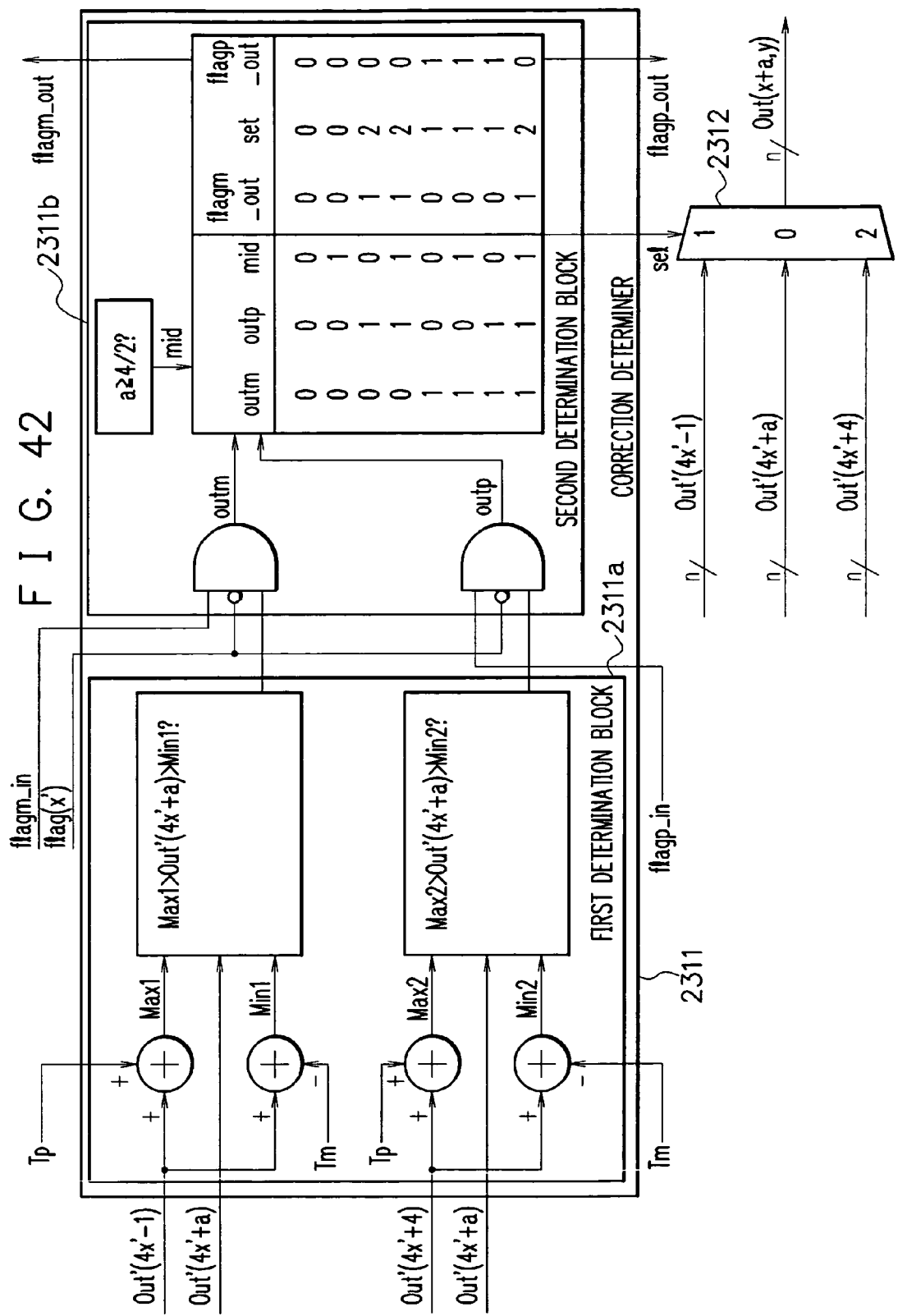
FIG. 42 is a schematic block diagram of each correction processing element circuit shown in FIG. 41.

FIG. 42 shows one embodiment of each correction processing element circuit 231 shown in FIG. 41. The correction processing element circuit 231 includes a correction determiner 2311 for determining whether or not to correct the output image data of the target area and a selector 2312 for conducting the correction processing. The correction determiner 2311 includes a first determining block 2311*a* for determining whether or not the pixel data of the target area is within a correction range by adding Tp or subtracting Tm to or from the pixel data of the adjacent areas, and a second determining block 2311*b* for producing a flag signal and a selector control signal, hereinafter described in detail. In this instance, it is assumed that the processing A is executed when the flag signal is "0", and, the processing B is conducted when the flag signal is "1".

The first determining block 2311*a* first determines whether or not the pixel data of the target area is within the correction range. By using Tp and Tm as range setting parameters, Max1=Out'(4x'−1)+Tp, Min1=Out'(4x'−1)−Tm, Max2=Out'(4x'+4)+Tp and Min2=Out'(4x'+4)−Tm are calculated and then the calculation results are compared with the pixel data Out'(4x'+a) of the target area. That is, Min1<Out'(4x'+a)<Max1 and Min2<Out'(4x'+a)<Max2 are calculated, and, when these inequalities are satisfied, "1" is output, otherwise "0" is output.

The second determining block 2311b first performs a logic operation of the result of the first determining block 2311a and the flag data to obtain Outm and Outp. Outm=(the result of the first determining block 2311a) AND (flagm_in) AND (NOT flag(x')) and Outp=(the result of the first determining block 2311a) AND (flagp_in) AND (NOT flag(x')). This means a processing that, when only the following three conditions are satisfied: flag(x')=0 (that is, the processing A is applied to the target area), flag_in=1 (that is, the processing B is applied to the adjacent areas and the correction operation was done from the adjacent area to the adjacent pixel), and it is the pixel data to be corrected in the first determining block 2311a, "1" is output.

The second determining block 2311b also calculates a mid value. This is determined by the position of the currently target correction processing element circuit 231. This mid value indicates that, when both outm and outp are "1", that is, the correction processing on both sides is applicable, the processing is conducted against the correction value of the closer position;

In FIG. 41, in the correction processing element circuits 231, when a=0 or 1, "0" is output, and when a=2 or 3, "1" is output. This is because there are four correction processing element circuits 231, and it is decided whether the currently target circuit 231 is closer to flagp_in or flagm_in, based on the relationship of a≧4/2 ((the number of the correction processing element circuits)/(the half of the number of the correction processing element circuits)). When the currently target circuit 231 is closer to flagp_in, "1" is output, or when closer to flagm_in, "0" is output.

Further, the second determining block 2311b outputs control signals on the basis of its input-output table, as shown in FIG. 42. For example, when both outm and outp are 0, that is, the correction processing is not executed, the output flag signal is 0 and a sel value is 0. As a result, the pixel data Out'(4x'+a) of the target area is output as it is. When one of outm and outp is 1, the output flag signal and the sel value are selected so that the correction values on the respective sides are applied. When both outm and outp are 1, according to the mid value, the processing is conducted to the correction value in a closer position.

In the selector 2312, the output pixel data is selected on the basis of the sel value sent from the second determining block 2311b.

In this embodiment, as described above, it is readily understood that the image processing device shown in FIGS. 39, 41 and 42 can perform the processing shown in FIG. 40. It is also readily understood that, when an image is divided into a plurality of areas including a plurality of pixels before executing a block coding and one area includes a mild gradation portion or a plain gradation portion and a steep gradation change portion such as an edge part, by using the third image processor, the granular quality deterioration within such an area can be removed.

In this embodiment, although the case of 4 pixels in one area has been described, another case can be carried out in the same manner.

In this embodiment, although the third image processor is applied to the image processing device of the third embodiment, of course, the third image processor can be applied to other aforementioned embodiments with the result of the same effects as this embodiment.

Figure 43:
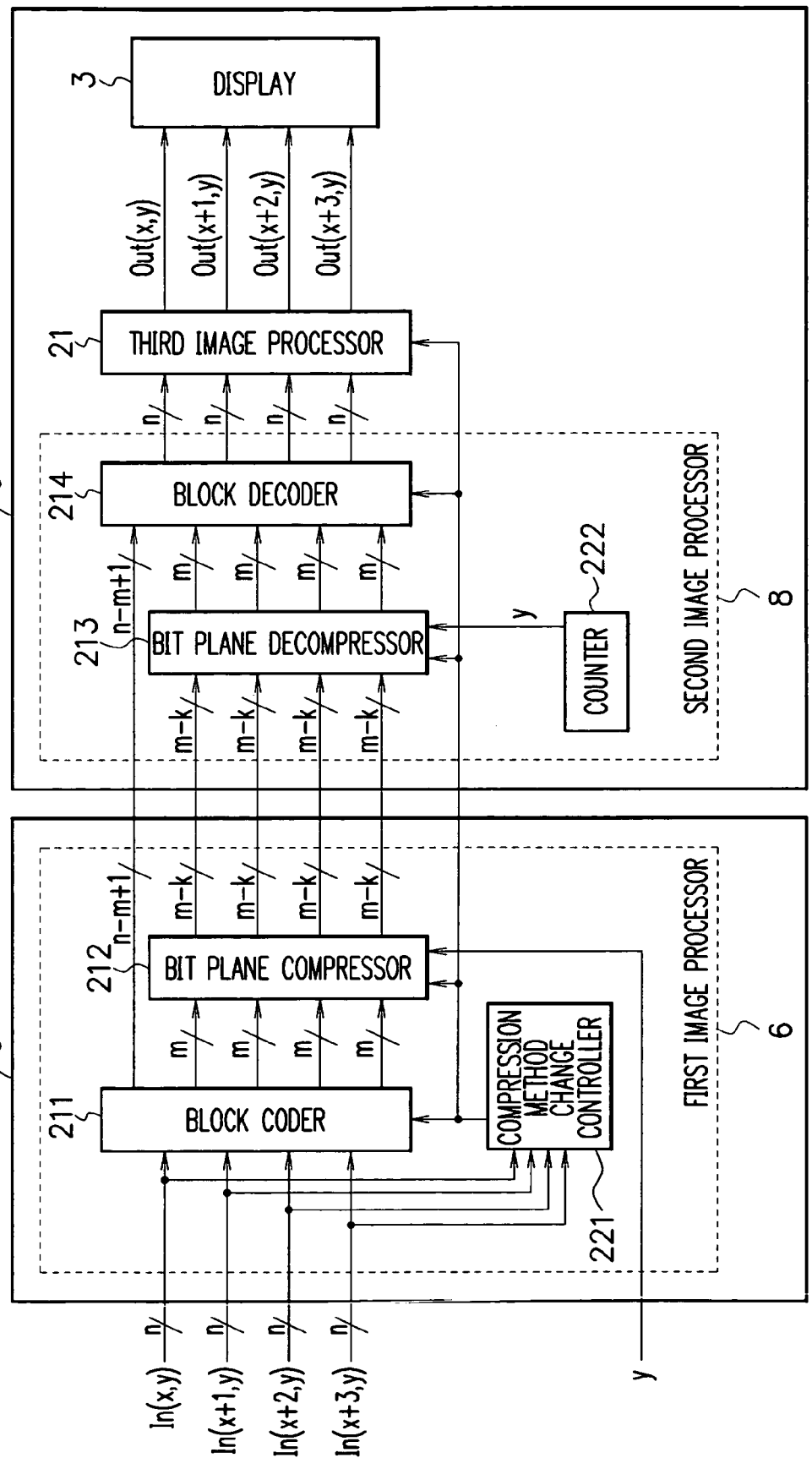
FIG. 43 is a schematic block diagram of an image transmitting device according to a twelfth embodiment.

A twelfth embodiment of the present invention will be described in detail with reference to FIG. 43. FIG. 43 shows one embodiment of an image transmitting device. In this embodiment, the transmitting device has almost the same construction as that of the sixth embodiment shown in FIG. 27, except that a third image processor 21 is added between a second image processor 8 and a display 3. The third image processor 21 receives pixel data of 4 pixels and a flag signal from the second image processor 8 and outputs pixel data of 4 pixels. In this embodiment, the third image processor 21 includes two registers 22a and 22b and a correction processor 23 in the same manner as the eleventh embodiment shown in FIG. 39.

The processing of the third image processor 21 is the same as that of the eleventh embodiment and hence the detailed description thereof can be omitted.

In the image transmitting device of this embodiment, it is readily understood that, when an image is divided into a plurality of areas including a plurality of pixels before executing a block coding and one area includes a mild gradation portion or a plain gradation portion and a steep gradation change portion such as an edge part, by using the third image processor, the granular quality deterioration within such an area can be removed.

Figure 44:
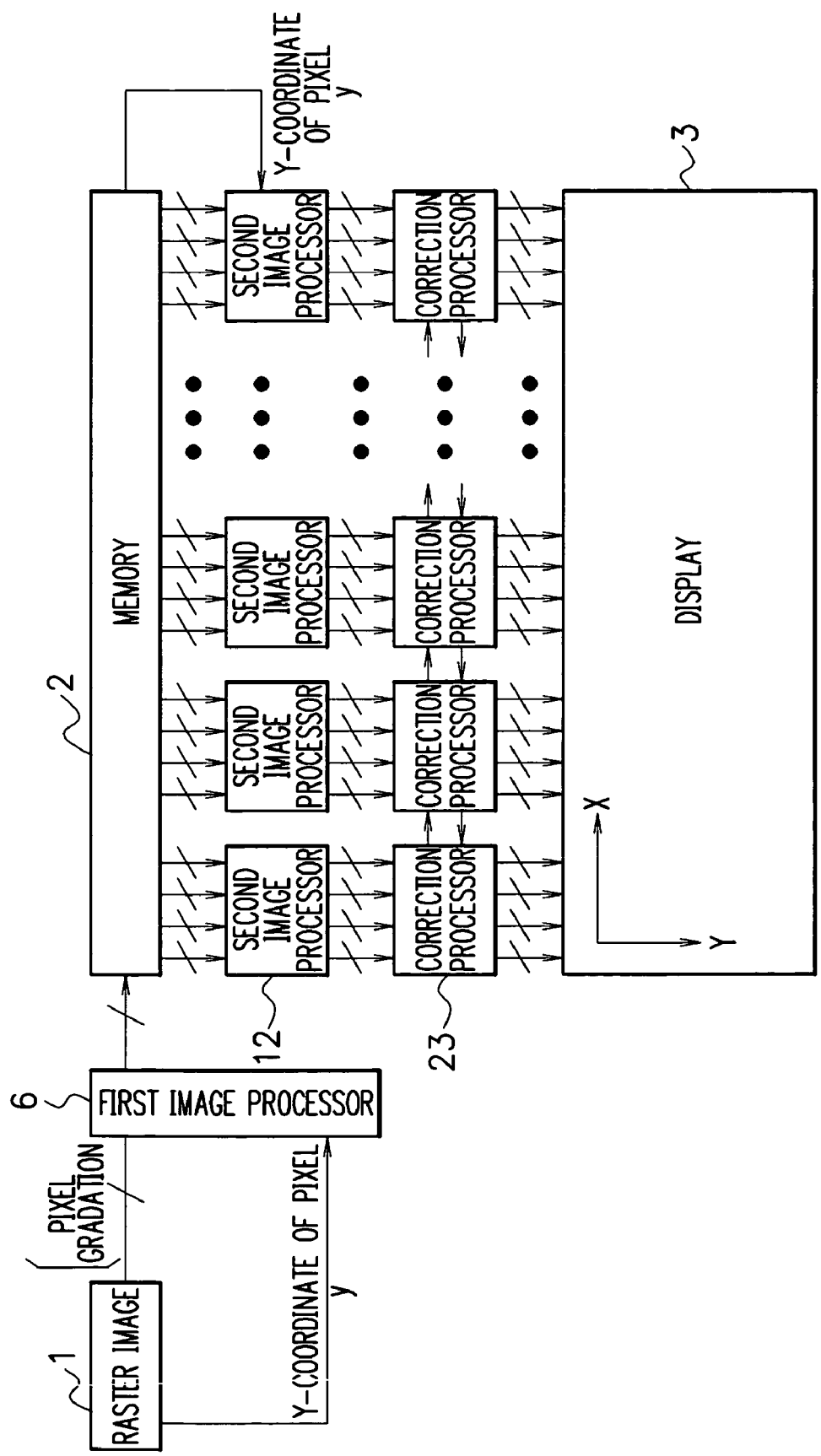
FIG. 44 is a schematic block diagram of a displaying device according to a thirteenth embodiment.

A thirteenth embodiment of the present invention will be described in detail with reference to FIG. 44. FIG. 44 shows one embodiment of a displaying device. In this embodiment, the displaying device has almost the same construction as that of the seventh embodiment shown in FIG. 28, except that a plurality of correction processors 23, each correction processor 23 having the same construction as that of the third image processor 21 of the eleventh embodiment shown in FIG. 39, are arranged in parallel in the X-axis direction (the main scanning direction) between a plurality of the second image processors 12 and a display 3, corresponding to the same number of the second image processors 12, and pixel data and flag signals are communicated with each other between the adjacent correction processors 23.

In this embodiment, since the plural second image processors 12 arranged in parallel can be directly connected to the respective plural correction processors 23 without providing with registers before conducting the correction processing in the same manner as the eleventh and twelfth embodiments described above. In this case, by inputting the pixel data in the border and the flag signals from the adjacent areas, the same correction processing as that of the eleventh embodiment can be performed.

In this embodiment, as described above, it is readily understood that by executing the correction processing, the granular quality deterioration still remaining in an outline portion within the area can be removed.

Figure 45:
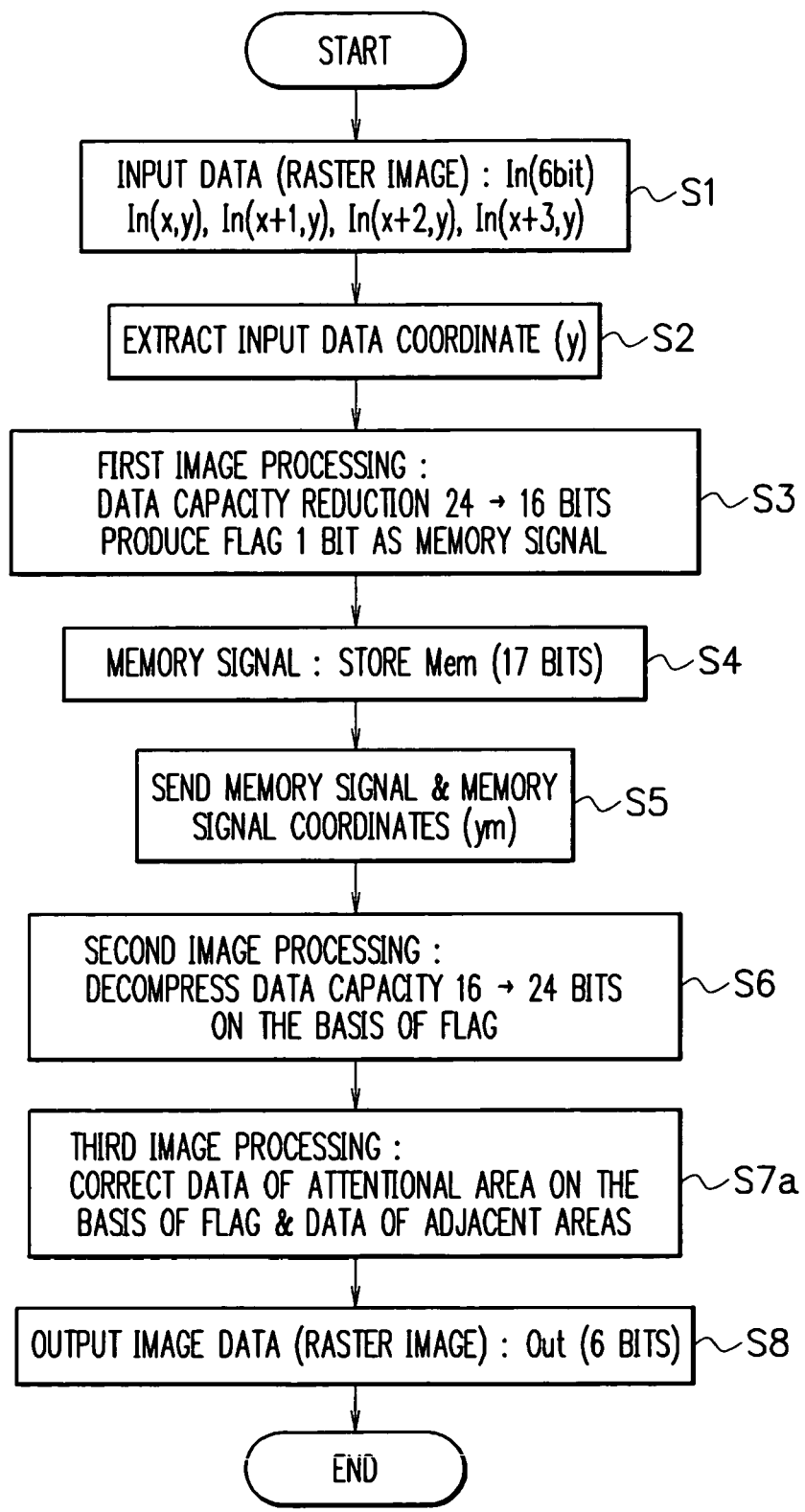
FIG. 45 is a flow chart showing an operation of an image processing method according to a fourteenth embodiment.
Figure 47:
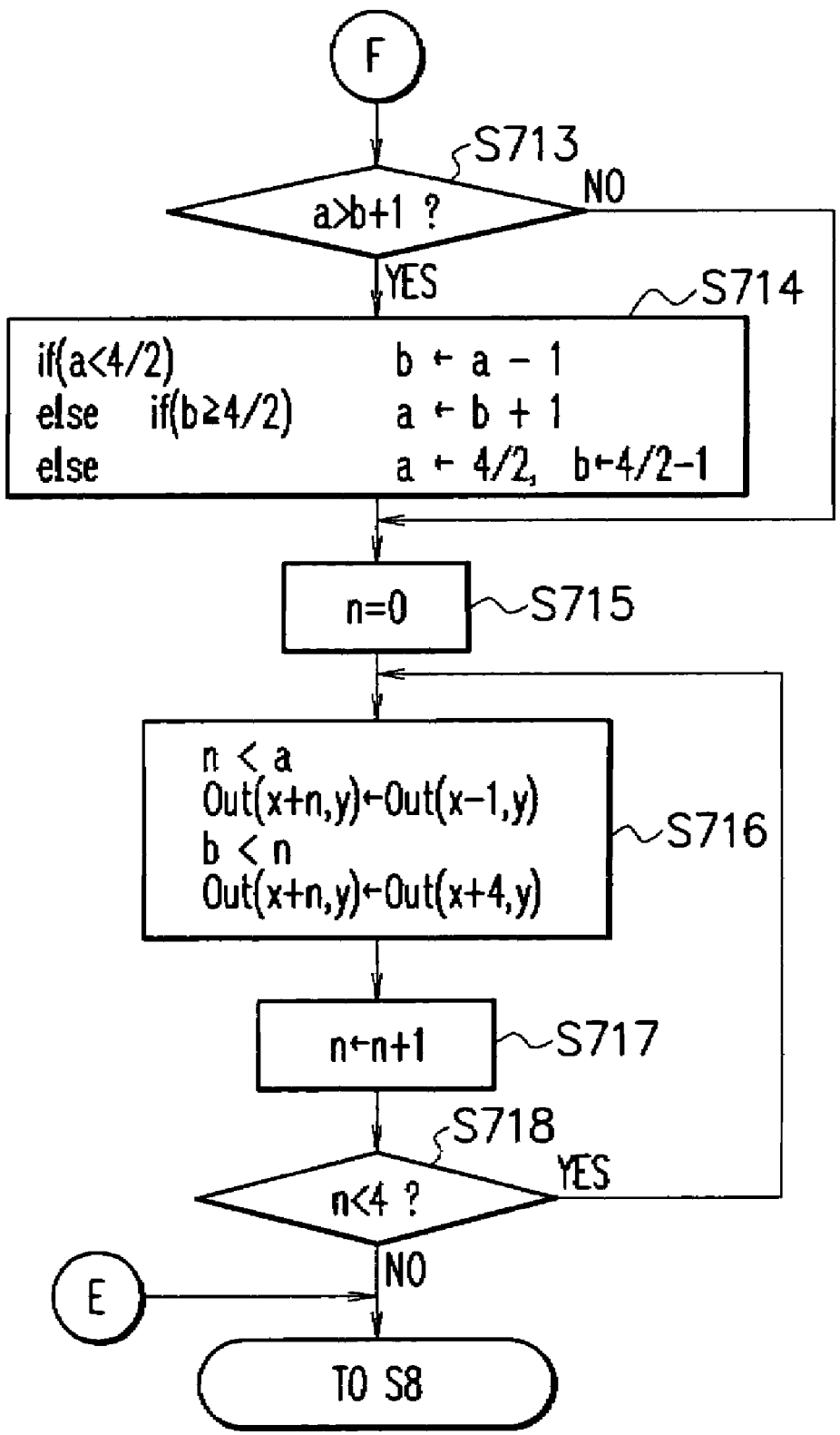
FIG. 47 is a flow chart showing the processing of the third processor for use in the image processing method shown in FIG. 45.

A fourteenth embodiment of the present invention will be described in detail with reference to FIG. 45 to FIG. 47. FIG. 45 shows one embodiment of an image processing method. In this embodiment, the processing in the first image processor 6, the second image processor 7 or the third image processor 21 of the eleventh embodiment shown in FIG. 39 can be executed as software processing using a computer.

In this embodiment, in the same manner as the ninth embodiment, 6 bits of image data of a raster image is processed to reduce its data amount to 17 bits per 4 pixels and the compressed image data is once stored in memory. The compressed image data read out of the memory is decompressed to output the 6 bits of the image data to a display for displaying the raster image. In this embodiment, as shown in FIG. 45, a flow of the image processing method is similar to the flow chart shown in FIG. 33 in the ninth embodiment. However, in this case, step S7a for processing of the third image processor 21 is added after step S6 for processing of the second image processor and hence step S7 of the ninth embodiment is changed to step 8 after step S7a.

In this embodiment, in FIG. 45, the image processing method is the same as that of the ninth embodiment except step 7a and only step 7a will be described in detail with reference to FIGS. 46 and 47 which show a processing of the third image processor 21. In this instance, in step S7a, data correction of an target area is implemented on the basis of flag signals and pixel data of adjacent areas as follows.

Step S701: Output data of step S6 is input, that is, pixel data Out(x, y), Out(x+1, y), Out(x+2, y) and Out(x+3, y) of an target area X and its flag signal flag, pixel data Out(x−1, y) closest to the target area within the adjacent area X−1 and its flag signal flagm, and pixel data Out(x+4, y) closest to the target area within the adjacent area X+1 and its flag signal flagp are input.

Step S702: The value flag is determined and, when the result is "0", move to step S703. On the other hand, when the value is "1" (the target area does not need the correction processing), move to step S8 without conducting the correction processing.

Step S703: A value a for indicating a range of a correction conducted by Out(x−1, y) of the adjacent area X−1 is set to 0.

Step S704: Whether or not the correction is conducted by Out(x−1, y) of the adjacent area X−1 is determined on the basis of the flagm value, and, when the result is "0", move to step S708 (in this case, since still a=0, the correction is not carried out). On the other hand, when the result is "1", move to step S705.

Step S705: Processing for determining a correction range a is conducted. When Out(x−1, y) and Out(x+a, y) satisfy Out(x−1, y)−Tm<Out(x+a, y)<Out(x−1, y)+Tp, move to step S706, otherwise move to step S708.

Step S706: The value a is incremented by 1.

Step S707: The value a is checked. When the value a is smaller than 4, move to step S705 to repeat the above-described operation, otherwise the loop is stopped and move to step S708.

Step S708: A value a for indicating a range of a correction conducted by Out(x+4, y) of the adjacent area X+1 is set to 3 (=4−1).

Step S709: Whether or not the correction is conducted by Out(x+4, y) of the adjacent area X+1 is determined on the basis of the flagp value, and, when the result is "0", move to step S713 (in this case, since still b=3, the correction is not carried out). On the other hand, when the result is "1", move to step S710.

Step S710: A processing for determining a correction range b is conducted. When Out(x+4, y) and Out(x+b, y) satisfy Out(x+4, y)−Tm<Out(x+b, y)<Out(x+4, y)+Tp, move to step S711, otherwise move to step S713.

Step S711: The value b is decremented by 1.

Step S712: The value b is checked. When the value b is larger than −1, move to step S710 to repeat the above-described operation, otherwise the loop is stopped and move to step S713.

Step S713: The values a and b are adjusted when the correction by Out(x−1, y) and the correction by Out(x+4, y) are overlapped. When a>b+1, the adjustment is required and move to step S714, otherwise move to step S715.

Step S714: The values a and b are adjusted depending on the values a and b for the correction processing not to overlap. When a<4/2, b=a−1 and when b≧4/2, a=b+1, otherwise a=4/2 and b=4/2−1.

Step S715: A counter number n is set to 0.

Step S716: When n<a, the pixel values are substituted with Out(x+4, y) and Out(x−1, y) and, when b<n, the pixel values are substituted with Out(x+4, y) to execute the correction processing.

Step S717: The value n is incremented by 1.

Step S718: When n is smaller than 4, move to step S716 to repeat the above-described processing, otherwise the loop is stopped and move to step S8.

In this embodiment, as described above, the processing in step S7a can be performed as the software processing using the computer and hence the image processing method can be carried out without using any particular hardware in the same manner as that of the eleventh embodiment described above.

Figure 48:
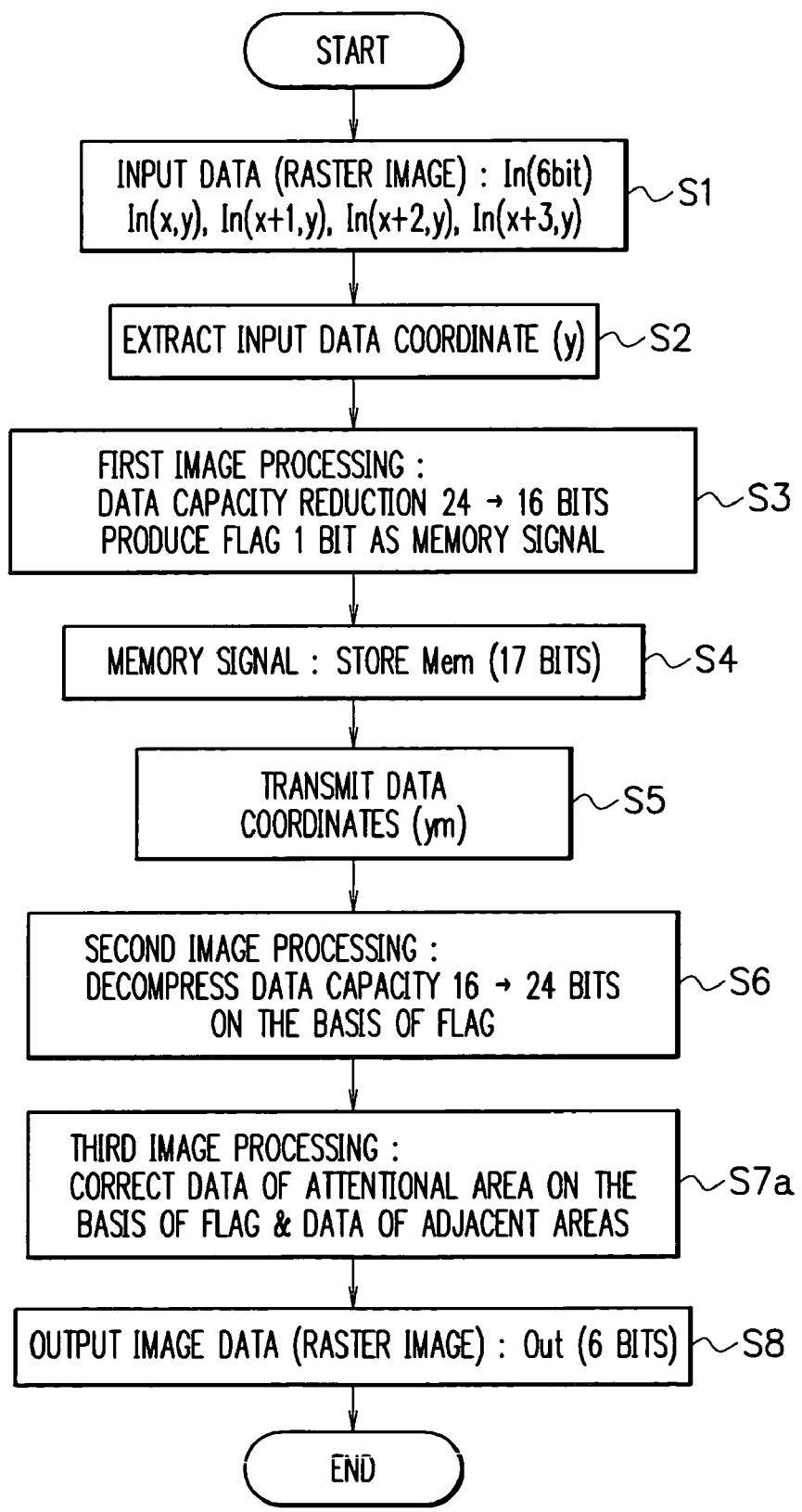
FIG. 48 is a flow chart showing an operation of an image transmitting method according to a fifteenth embodiment.

A fifteenth embodiment of the present invention will be described in detail with reference to FIG. 48. FIG. 48 shows one embodiment of an image transmitting method. In this embodiment, 6 bits of image data of a raster image is processed to reduce its data amount to 17 bits per 4 pixels and the compressed image data is transmitted from a transmitter to a receiver via a transmission path. In the receiver, the transmitted compressed image data is decompressed to output the 6 bits of the image data to a display for displaying the raster image. In this embodiment, the image transmitting method is almost the same as that of the aforementioned tenth embodiment shown in FIG. 38 except step 7a for conducting a processing of a third image processor.

In the same manner as the above-described fourteenth embodiment, the processing is performed by a controller (CPU or the like) of the computer. That is, the controller places a program, which was stored in an ROM (not shown) or information storage medium, on an RAM (not shown) and runs the program so that the CPU functions as a first image processor, a second image processor and a third image processor to carry out the processing.

In this embodiment, the processing in step S3, step S6 or step S7a can be implemented in the same manner as those of the ninth embodiment or the fourteenth embodiment and hence the detailed description thereof can be omitted.

In this embodiment, it is also readily understood that, when an image is divided into a plurality of areas including a plurality of pixels before executing a block coding and one area includes a mild gradation portion or a plain gradation portion and a steep gradation change portion such as an edge part, with the above-described processing, an image transmitting method capable of removing the granular quality deterioration within the area can be performed.

Although both the compression processing of the data capacity of the raster image and the decompression processing of the compressed imaged data to reproduce the image are carried out as the software processing using the computer in the tenth, fourteenth and fifteenth embodiments, only one of the compression and decompression processing can be executed by the software processing using the computer.

Further, although the processing of the image processing device and the image transmitting device is implemented as the software processing using the computer in the ninth and tenth embodiments, similarly as to the image compressing device, the image decompressing device, the image sending device and the image receiving device, the compression processing of the data capacity of the raster image and the decompression processing of the compressed imaged data to reproduce the image are performed as the software processing using the computer.

In the above-described embodiments, although the data amount in the block coding or the bit plane compression can be reduced by the fixed value, the data reduction amount is not restricted to the fixed value and can be optionally determined before and after the processing as long as the data amount of the original image is reduced and the reduced data amount is increased again. For instance, assuming that a data amount of an original image, a data amount of a raster image after compression and a data amount of the raster image after decompression are defined as A, B and C, respectively, the variables can be optionally determined as far as the relationship of A>B and B<C is satisfied.

Further, in the aforementioned embodiments, although for processing the RGB colors, three color processing units having the same construction are arranged in parallel, it is unnecessary that the data reduction amount of the three colors in the bit plane compression is always the same. For instance, in the case of an image signal of the RGB colors, it is preferable that a bit plane number of the blue data is most reduced, the red data is larger and the green is not so large. This is because human eyes are most sensitive to a green color change, more sensitive to a red color change and not so sensitive to a blue color change. In this manner, the image quality deterioration, which is caused by the decompression of the compressed image data after the data amount of the image data is compressed in the bit plane compression as the irreversible compression, becomes unnoticeable by the naked eye.

Furthermore, the data amount of only one of the RGB colors can be reduced and increased. In addition, the raster image is not always limited to a color image composed of image data of plural colors and can be a mono-color image. In other words, it is not always necessary that the three color processing units are arranged in parallel.

Moreover, although the block coding has been described as a typical reversible compression of the image data, of course, the reversible compression is not restricted to the block coding and other reversible compression methods can be employed. For example, the Huffman coding or the like is applied for the reversible compression of the image data. Hence, as long as image data of an input image is linearly related to image data after compression, other methods can be used according to the present invention.

While the present invention has been described with reference to the particular illustrative embodiments, it is not to be restricted by those embodiments but only by the appended claims. It is to be appreciated that those skilled in the art can change and modify the embodiments without departing from the scope and spirit of the present invention.

What is claimed is:

1. An image processing device comprising a first image processor for compressing data capacity of input image data of a raster image to output compressed data of the raster image, a memory for storing the compressed data, and a second image processor for decompressing compressed data read out of the memory to output decompressed output image data, the first image processor including:
a reversible coder for dividing the input image data into a plurality of areas including a plurality of pixels and representing the input image data by representative value data as a gradation component of a common part of the pixels within each area and difference data as a difference between input gradation data of each pixel and the representative value data to execute a data conversion; and
a bit plane compressor for executing a multi-valued dither processing of the difference data on the basis of a two-dimensional dither matrix to reduce a bit plane number of the difference data to obtain compressed difference data, the second image processor including:
a bit plane decompressor for executing a bit addition processing of the compressed difference data read out of the memory on the basis of the two-dimensional dither matrix to obtain output difference data; and
a reversible decoder for adding the representative value data to the output difference data to execute a data conversion to output image data, the compressed data including the representative value data and the compressed difference data.

2. An image processing device of claim 1, further comprising a compression method change controller for determining a compression rate in the reversible coder and a compression rate in the bit plane compressor on the basis of the input image data, the image processing device storing a flag signal as an output signal of the compression method change controller into the memory and determining an image processing of the second image processor on the basis of the flag signal read out of the memory.

3. An image processing device comprising a plurality of first image processors for compressing data capacity of input image data of a raster image to output compressed data of the raster image, a memory for storing the compressed data, and a plurality of second image processors for decompressing compressed data read out of the memory to output decompressed output image data, at least one of the first image processors including:
a reversible coder for dividing the input image data into a plurality of areas including a plurality of pixels and representing the input image data by representative value data as a gradation component of a common part of the pixels within each area and difference data as a difference between input gradation data of each pixel and the representative value data to execute a data conversion; and
a bit plane compressor for executing a multi-valued dither processing of the difference data on the basis of a two-dimensional dither matrix to reduce a bit plane number of the difference data to obtain compressed difference data, at least one of the second image processors including:
a bit plane decompressor for executing a bit addition processing of the compressed difference data read out of the memory on the basis of the two-dimensional dither matrix to obtain output difference data; and
a reversible decoder for adding the representative value data to the output difference data to execute a data conversion to output image data, the compressed data including the representative value data and the compressed difference data, the image processing device further comprising:
a compression method change controller for determining a compression rate in the reversible coder and a compression rate in the bit plane compressor on the basis of the input image data;
a first selector for selecting the compressed data of one first image processor, determined by the compression method change controller, including the reversible coder executing the data compression at the determined compression rate and the bit plane compressor executing the data compression at the determined compression rate, to output the selected compressed data;

first means for storing the compressed data selected by the first selector into the memory;

second means for storing a flag signal as an output signal of the compression method change controller into the memory; and a second selector for selecting the output image data of one second image processor selected on the basis of the flag signal read out of the memory to output the selected output image data.

4. An image processing device of claim 3, further comprising a third image processor for executing a correction processing of the output image data of the second image processor on the basis of the output image data and the flag signal read out of the memory to output corrected output image data, the third image processor including:

a correction determiner for determining whether or not the correction processing of the output image data of an target area is executed on the basis of the output image data of the target area and its flag signal and output image data of adjacent areas adjoining the target area and their flag signals; and a correction processor for executing the correction processing of the output image data of the target area on the basis of a determination result of the correction determiner to output the corrected output image data, the correction determiner determining the execution of the correction processing when available errors of the output image data of the target area is larger than available errors of the output image data of each adjacent area and a difference between the output image data of the target area and the output image data of each adjacent area is within a certain range.

5. An image processing device of claim 1, wherein the bit plane decompressor adds an offset value to the compressed difference data.

6. An image transmitting device comprising a first processing unit including a first image processor for compressing data capacity of input image data of a raster image to transmit compressed data of the raster image from the first processing unit and a second processing unit including a second image processor for decompressing transmitted compressed data to output decompressed output image data, the first image processor including:

a reversible coder for dividing the input image data into a plurality of areas including a plurality of pixels and representing the input image data by representative value data as a gradation component of a common part of the pixels within each area and difference data as a difference between input gradation data of each pixel and the representative value data to execute a data conversion; and a bit plane compressor for executing a multi-valued dither processing of the difference data on the basis of a two-dimensional dither matrix to reduce a bit plane number of the difference data to obtain compressed difference data, the second image processor including:

a bit plane decompressor for executing a bit addition processing of the compressed difference data of the compressed data transmitted from the first processing unit on the basis of the two-dimensional dither matrix to obtain output difference data; and a reversible decoder for adding the representative value data to the output difference data to execute a data conversion to output image data, the compressed data including the representative value data and the compressed difference data.

7. An image transmitting device of claim 6, wherein the first processing unit further includes a compression method change controller for determining a compression rate in the reversible coder and a compression rate in the bit plane compressor on the basis of the input image data and a flag signal as an output signal of the compression method change controller is transmitted from the first processing unit to the second processing unit, and wherein the second processing unit determines an image processing of the second image processor on the basis of the flag signal transmitted from the first processing unit.

8. An image transmitting device of claim 6, wherein the first processing unit further includes a third image processor for executing a correction processing of the output image data of the second image processor on the basis of the output image data and the flag signal transmitted from the first processing unit to output corrected output image data, the third image processor including:

a correction determiner for determining whether or not the correction processing of the output image data of an target area is executed on the basis of the output image data of the target area and its flag signal and output image data of adjacent areas adjoining the target area and their flag signals; and a correction processor for executing the correction processing of the output image data of the target area on the basis of a determination result of the correction determiner to output the corrected output image data, the correction determiner determining the execution of the correction processing when available errors of the output image data of the target area is larger than available errors of the output image data of each adjacent area and a difference between the output image data of the target area and the output image data of each adjacent area is within a certain range.

9. An image transmitting device of claim 6, wherein the bit plane decompressor adds an offset value to the compressed difference data.

10. A displaying device comprising a first image processor for compressing data capacity of input image data of a raster image to output compressed data of the raster image, a memory for storing the compressed data, a second image processor for decompressing compressed data read out of the memory to output decompressed output image data, and a display for displaying an image according to the image data produced by the second image processor, the first image processor including:

a reversible coder for dividing the input image data into a plurality of areas including a plurality of pixels and representing the input image data by representative value data as a gradation component of a common part of the pixels within each area and difference data as a difference between input gradation data of each pixel and the representative value data to execute a data conversion; and a bit plane compressor for executing a multi-valued dither processing of the difference data on the basis of a two-dimensional dither matrix to reduce a bit plane number of the difference data to obtain compressed difference data, the second image processor including:
a bit plane decompressor for executing a bit addition processing of the compressed difference data read out of the memory on the basis of the two-dimensional dither matrix to obtain output difference data; and
a reversible decoder for adding the representative value data to the output difference data to execute a data conversion to output image data,
the compressed data including the representative value data and the compressed difference data.

11. A displaying device of claim 10, further comprising a compression method change controller for determining a compression rate in the reversible coder and a compression rate in the bit plane compressor on the basis of the input image data, the displaying device storing a flag signal as an output signal of the compression method change controller into the memory and determining an image processing of the second image processor on the basis of the flag signal read out of the memory.

12. A displaying device of claim 10, further comprising a third image processor for executing a correction processing of the output image data of the second image processor on the basis of the output image data and the flag signal read out of the memory to output corrected output image data,
the third image processor including:
a correction determiner for determining whether or not the correction processing of the output image data of an target area is executed on the basis of the output image data of the target area and its flag signal and output image data of adjacent areas adjoining the target area and their flag signals; and
a correction processor for executing the correction processing of the output image data of the target area on the basis of a determination result of the correction determiner to output the corrected output image data,
the correction determiner determining the execution of the correction processing when available errors of the output image data of the target area is larger than available errors of the output image data of each adjacent area and a difference between the output image data of the target area and the output image data of each adjacent area is within a certain range, the display displaying an image according to the image data produced by the second image processor.

13. A displaying device of claim 10, wherein the bit plane decompressor adds an offset value to the compressed difference data.

14. A displaying device of claim 10, wherein the second image processors are arranged every one line of areas in a main-scanning direction of the display, and one line of the image data in the main-scanning direction of the display is sent as one set from the memory to the second image processors corresponding to pixels.

15. A displaying device of claim 14, further comprising a threshold value producer for decompression for producing threshold values to be used for the bit addition processing of all the second image processors and for sending the threshold values to the respective second image processors.

16. An image processing method comprising a first image processing step for compressing data capacity of input image data of a raster image to output compressed data of the raster image, a storing step for storing the compressed data into a memory, and a second image processing step for decompressing compressed data read out of the memory to output decompressed output image data,
the first image processing step for data compression including:

a reversible coding process for dividing the input image data into a plurality of areas including a plurality of pixels and representing the input image data by representative value data as a gradation component of a common part of the pixels within each area and difference data as a difference between input gradation data of each pixel and the representative value data to execute a data conversion; and
a bit plane compressing process for executing a multi-valued dither processing of the difference data on the basis of a two-dimensional dither matrix to reduce a bit plane number of the difference data to obtain compressed difference data,
the second image processing step for data decompression including:
a bit plane decompressing process for executing a bit addition processing of the compressed difference data read out of the memory on the basis of the two-dimensional dither matrix to obtain output difference data; and
a reversible decoding process for adding the representative value data to the output difference data to execute a data conversion to output image data,
the compressed data including the representative value data and the compressed difference data.

17. An image processing method of claim 16, further comprising a compression method change controlling step for determining a compression rate in the reversible coding process and a compression rate in the bit plane compressing process on the basis of the input image data, wherein a flag signal as an output signal of the compression method change controlling step is stored into the memory and an image processing of the second image processing step is determined on the basis of the flag signal read out of the memory.

18. An image processing method of claim 16, further comprising a third image processing step for executing a correction processing of the output image data of the second image processing step on the basis of the output image data and the flag signal read out of the memory to output corrected output image data,
the third image processing step including:
a correction determining process for determining whether or not the correction processing of the output image data of an target area is executed on the basis of the output image data of the target area and its flag signal and output image data of adjacent areas adjoining the target area and their flag signals; and
a correction process for obtaining the corrected output image data on the basis of a determination result of the correction determining process,
wherein the execution of the correction processing is determined in the correction determining process when available errors of the output image data of the target area is larger than available errors of the output image data of each adjacent area and a difference between the output image data of the target area and the output image data of each adjacent area is within a certain range.

19. An image processing method of claim 16, wherein an offset value is added to the compressed difference data in the bit plane decompressing process.

20. An image transmitting method comprising a first image processing step for compressing data capacity of input image data of a raster image, a transmitting step for transmitting compressed data of the raster image from a first processing unit to a second processing unit and a second image processing step for decompressing transmitted compressed data to output decompressed output image data, the first image processing step for data compression including:
- a reversible coding process for dividing the input image data into a plurality of areas including a plurality of pixels and representing the input image data by representative value data as a gradation component of a common part of the pixels within each area and difference data as a difference between input gradation data of each pixel and the representative value data to execute a data conversion; and
- a bit plane compressing process for executing a multi-valued dither processing of the difference data on the basis of a two-dimensional dither matrix to reduce a bit plane number of the difference data to obtain compressed difference data, the second image processing step for data decompression including:
- a bit plane decompressing process for executing a bit addition processing of the compressed difference data of the compressed data transmitted from the first processing unit on the basis of the two-dimensional dither matrix to obtain output difference data; and
- a reversible decoding process for adding the representative value data to the output difference data to execute a data conversion to output image data, the compressed data including the representative value data and the compressed difference data.

21. An image transmitting method of claim 20, further comprising a compression method change controlling step for determining a compression rate in the reversible coding process and a compression rate in the bit plane compressing process on the basis of the input image data, wherein a flag signal as an output signal of the compression method change controlling step is transmitted from the first processing unit to the second processing unit, and the second processing unit determines an image processing of the second image processing step on the basis of the flag signal transmitted from the first processing unit.

22. An image transmitting method of claim 20, further comprising a third image processing step for executing a correction processing of the output image data of the second image processing step on the basis of the output image data and the flag signal transmitted from the first processing unit to output corrected output image data, the third image processing step including:
- a correction determining process for determining whether or not the correction processing of the output image data of an target area is executed on the basis of the output image data of the target area and its flag signal and output image data of adjacent areas adjoining the target area and their flag signals; and
- a correction process for obtaining the corrected output image data on the basis of a determination result of the correction determining process, wherein the execution of the correction process is determined in the correction determining process when available errors of the output image data of the target area is larger than available errors of the output image data of each adjacent area and a difference between the output image data of the target area and the output image data of each adjacent area is within a certain range.

23. An image transmitting method of claim 20, wherein an offset value is added to the compressed difference data in the bit plane decompressing process.

24. A computer readable storage medium storing a program for executing an image processing method of claim 16 using a computer.

25. A computer readable storage medium storing a program for executing an image transmitting method of claim 20 using a computer.

* * * * *

UNITED STATES PATENT AND TRADEMARK OFFICE
CERTIFICATE OF CORRECTION

PATENT NO. : 7,668,383 B2
APPLICATION NO. : 11/391385
DATED : February 23, 2010
INVENTOR(S) : Daigo Miyasaka It is certified that error appears in the above-identified patent and that said Letters Patent is hereby corrected as shown below:

Column 21, Line 53, delete "n + 1 or n" and insert --n - 1 or n--.

Signed and Sealed this

Twenty-eighth Day of September, 2010

David J. Kappos
*Director of the United States Patent and Trademark Office*